(12) United States Patent
Guissin et al.

(10) Patent No.: US 8,937,651 B2
(45) Date of Patent: Jan. 20, 2015

(54) IMAGING SYSTEM AND METHOD FOR USE IN MONITORING A FIELD OF REGARD

(75) Inventors: Rami Guissin, Beit Yanai (IL); Eitan Lavi, Hadera (IL)

(73) Assignee: DVP Technologies Ltd., Tel Aviv (IL)

( * ) Notice: Subject to any disclaimer, the term of this patent is extended or adjusted under 35 U.S.C. 154(b) by 960 days.

(21) Appl. No.: 12/596,241

(22) PCT Filed: Apr. 27, 2008

(86) PCT No.: PCT/IL2008/000554
§ 371 (c)(1),
(2), (4) Date: Jul. 27, 2010

(87) PCT Pub. No.: WO2008/129552
PCT Pub. Date: Oct. 30, 2008

(65) Prior Publication Data
US 2010/0283842 A1  Nov. 11, 2010

(30) Foreign Application Priority Data

Apr. 19, 2007 (IL) .......................................... 182672
Feb. 28, 2008 (IL) .......................................... 189832

(51) Int. Cl.
*A61B 1/04* (2006.01)
*A61B 1/06* (2006.01)
*H04N 7/00* (2011.01)
(Continued)

(52) U.S. Cl.
CPC ............ *G02B 13/06* (2013.01); *G02B 26/0816* (2013.01); *G02B 27/1066* (2013.01); *G02B 27/144* (2013.01); *G02B 27/145* (2013.01); *H04N 5/2254* (2013.01); *H04N 5/2259* (2013.01); *H04N 5/23238* (2013.01)
USPC .................. 348/68; 348/65; 348/39; 348/239

(58) Field of Classification Search
None
See application file for complete search history.

(56) References Cited

U.S. PATENT DOCUMENTS 5,049,740 A    9/1991 Pines et al.
5,172,235 A   12/1992 Wilm et al.
(Continued)

FOREIGN PATENT DOCUMENTS

DE    42 17 430 A1   12/1993
GB    1 523 721       9/1978
(Continued)

OTHER PUBLICATIONS

Israeli Office Action for corresponding Israeli patent application, mailed May 8, 2012, one page.
(Continued)

*Primary Examiner* — Joseph Ustaris
*Assistant Examiner* — Ellyar Y Barazesh
(74) *Attorney, Agent, or Firm* — Browdy and Neimark, PLLC

(57) ABSTRACT

A method and system are presented for monitoring a field of regard. At least a part of a field of regard is imaged by concurrently collecting a plurality of light components propagating from a plurality of zones, respectively, located within the field of regard, a combined collected light beam is produced, and corresponding data is generated being indicative of a combined image of the at least part of the field of regard formed by the collected light components. This image data indicative of the combined image data is processed and analyzed, and if existence of a certain condition or event is identified in the image data, a corresponding control signal is generated.

35 Claims, 50 Drawing Sheets

(51) Int. Cl.
*A62B 1/04* (2006.01)
*H04N 5/262* (2006.01)
*G02B 13/06* (2006.01)
*G02B 26/08* (2006.01)
*G02B 27/10* (2006.01)
*G02B 27/14* (2006.01)
*H04N 5/225* (2006.01)
*H04N 5/232* (2006.01)

(56) References Cited

U.S. PATENT DOCUMENTS

| | | | |
|---|---|---|---|
| 5,418,364 A | | 5/1995 | Hale et al. |
| 5,485,306 A | | 1/1996 | Kiunke et al. |
| 5,752,446 A | | 5/1998 | Squibb |
| 5,836,869 A | * | 11/1998 | Kudo et al. ............. 600/173 |
| 6,239,424 B1 | * | 5/2001 | Kuo ............. 250/221 |
| 6,495,827 B2 | | 12/2002 | Metcalf et al. |
| 6,734,911 B1 | | 5/2004 | Lyons |
| 7,847,817 B2 | * | 12/2010 | Negishi ............. 348/70 |
| 7,965,314 B1 | * | 6/2011 | Miller et al. ............. 348/164 |
| 2001/0038414 A1 | * | 11/2001 | Hofer et al. ............. 348/207 |
| 2001/0043264 A1 | * | 11/2001 | Sinclair et al. ............. 348/36 |
| 2002/0035330 A1 | * | 3/2002 | Cline et al. ............. 600/476 |
| 2002/0080248 A1 | * | 6/2002 | Adair et al. ............. 348/230 |
| 2002/0126479 A1 | * | 9/2002 | Zhai et al. ............. 362/244 |
| 2003/0071891 A1 | * | 4/2003 | Geng ............. 348/39 |
| 2003/0193562 A1 | | 10/2003 | Corzillus |
| 2004/0186351 A1 | * | 9/2004 | Imaizumi et al. ............. 600/160 |
| 2006/0175549 A1 | | 8/2006 | Miller et al. |
| 2006/0187322 A1 | * | 8/2006 | Janson et al. ............. 348/240.99 |
| 2007/0023799 A1 | * | 2/2007 | Boettiger ............. 257/292 |
| 2007/0024756 A1 | * | 2/2007 | Matusik et al. ............. 348/590 |

FOREIGN PATENT DOCUMENTS

| | | |
|---|---|---|
| JP | 8-111799 A | 4/1996 |
| WO | 2007/047769 A2 | 4/2007 |

OTHER PUBLICATIONS

Israeli Office Action mailed on Dec. 25, 2012, for a corresponding Israeli Application, first page only.

* cited by examiner

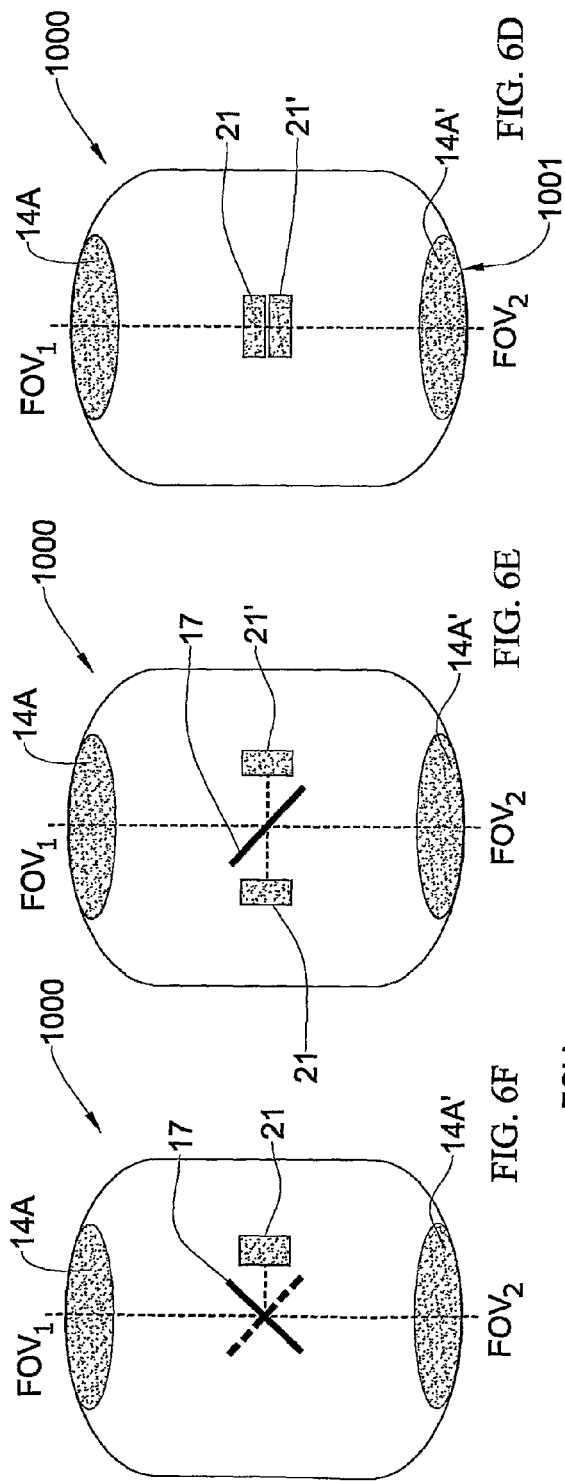

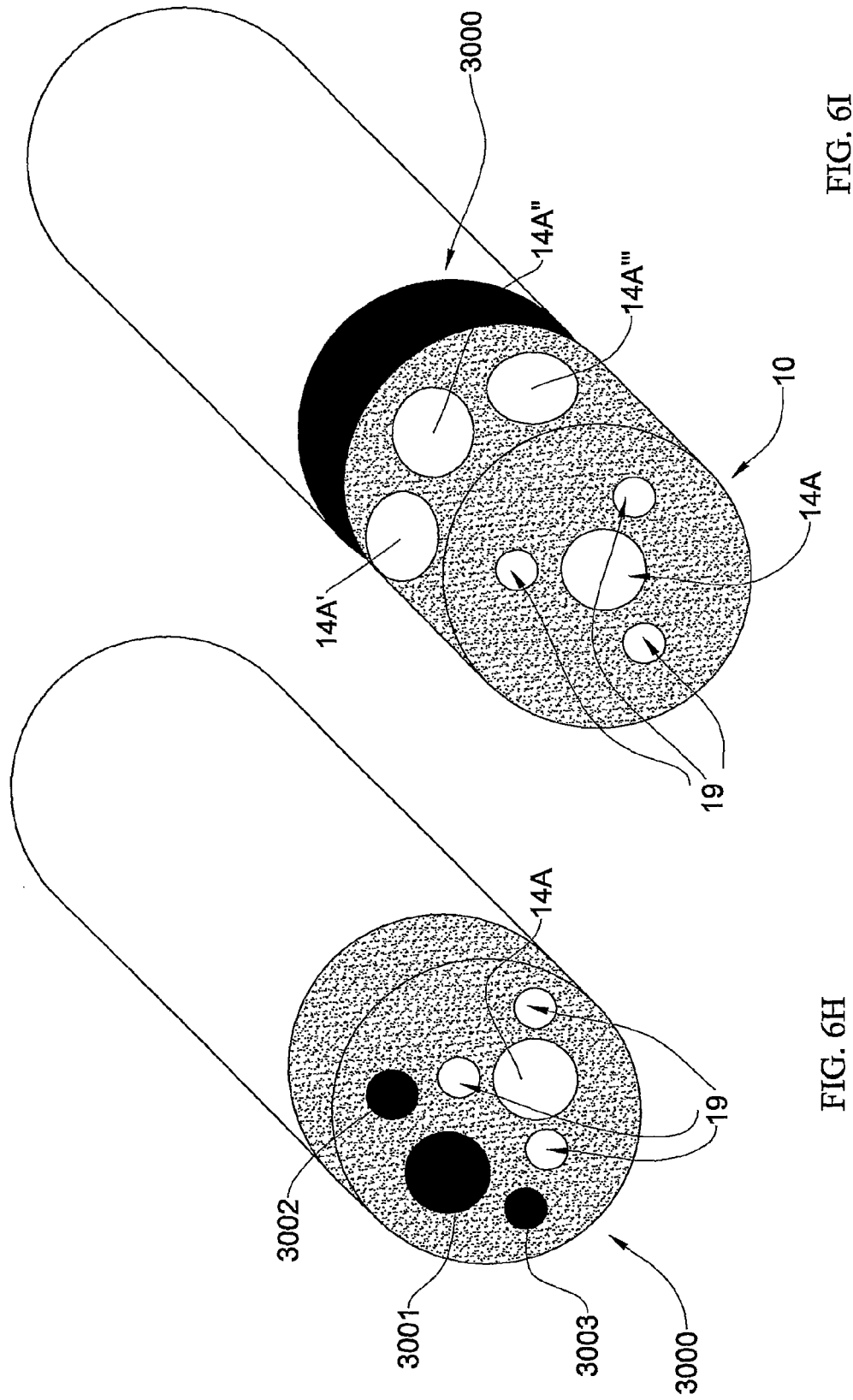

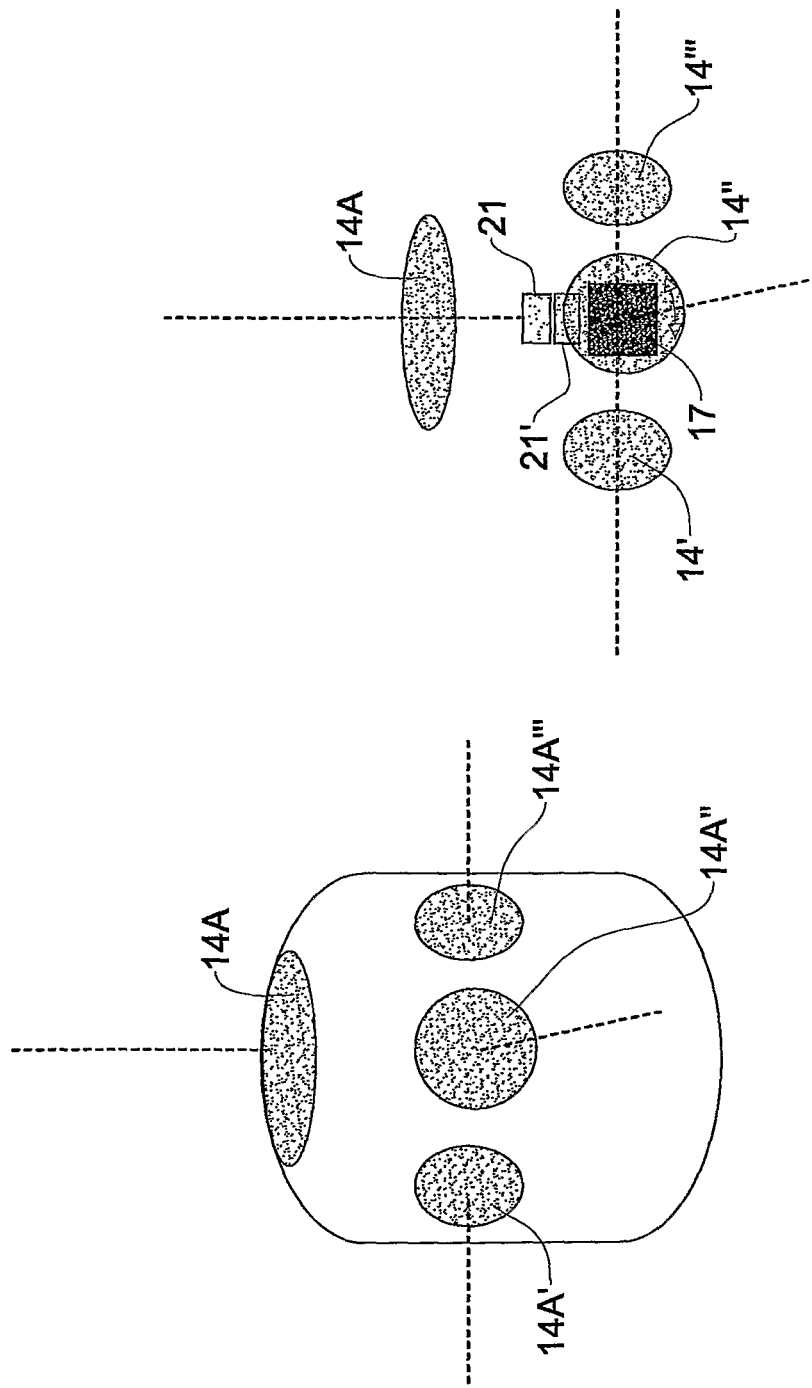

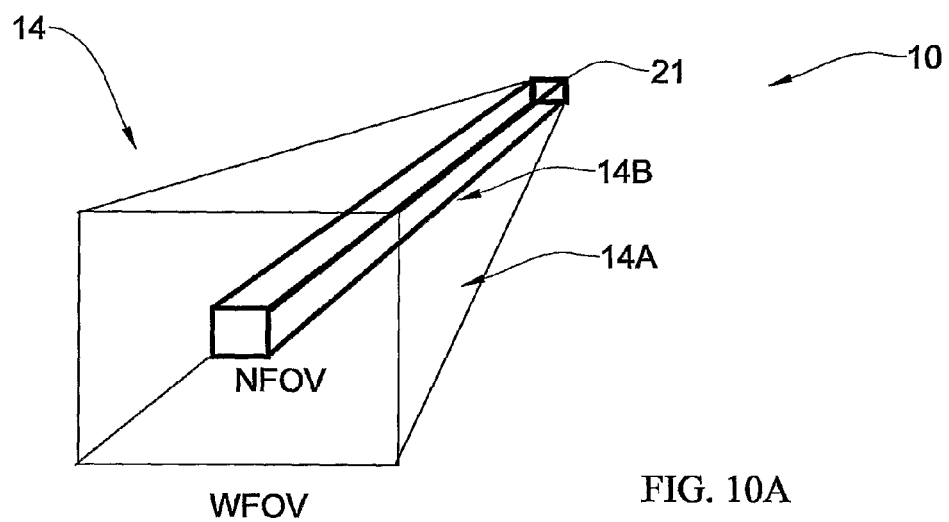
FIG. 10A
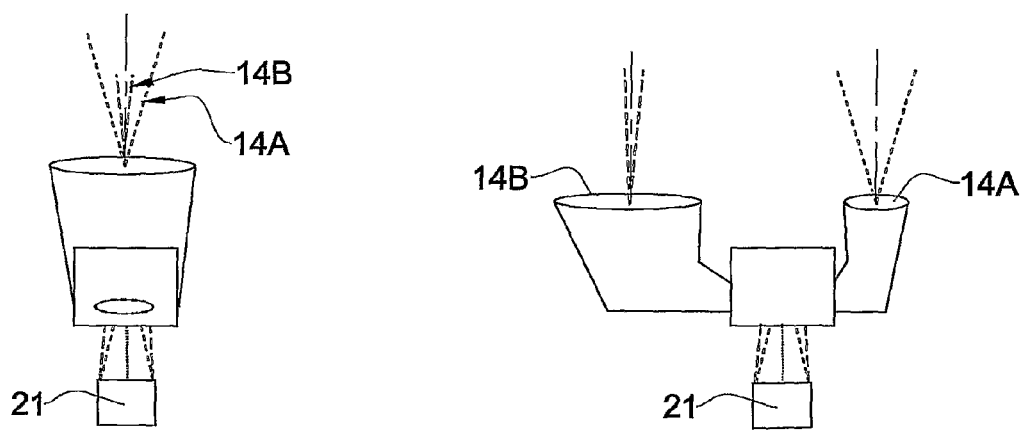
FIG. 10B
FIG. 10C

FIG. 16B

WF=wide field; NF=narrow field

| | WF imaging mode | NF imaging mode | WF scan mode | WF track mode | NF slew mode | NF track mode | NF retarget mode |
|---|---|---|---|---|---|---|---|
| WF imaging command | | NF imaging mode | WF scan command | | | | |
| WF imaging command | | NF imaging command | WF scan command | | WF track command | | |
| WF imaging command | | NF imaging command | WF scan mode | WF auto detect state | WF manual designate state | | |
| WF imaging command | | NF imaging command | | WF track mode | WF classify state | | |
| WF imaging command | | NF imaging command | | | NF slew mode | NF detect state | |
| WF imaging command | | NF imaging command | | | | NF track mode | NF classify state |
| WF imaging command | | NF imaging command | WF track cue state = 0 | | WF track cue state > 0 | | NF retarget mode |

IMAGING SYSTEM AND METHOD FOR USE IN MONITORING A FIELD OF REGARD

This is a National Phase Application filed under 35 U.S.C. §371 as a national stage of PCT/IL2008/000554, filed on Apr. 27, 2008, claiming the benefit of Israeli Patent Application 182672, filed on Apr. 19, 2007, and claiming the benefit of Israeli Patent Application 189832, filed on Feb. 28, 2008, the content of each of which is hereby incorporated by reference in its entirety.

FIELD OF THE INVENTION

This invention relates to an imaging system and method. The invention is particularly useful in applications requiring viewing of a region of interest with different imaging resolutions.

BACKGROUND OF THE INVENTION

There are many applications requiring imaging of a certain region of interest with different resolutions or fields of view. The ability to maintain high optical resolution (i.e., small instantaneous field of view) while performing wide angle optical coverage is a driving parameter of electro-optical detection systems, especially when effects and objects which are to be detected are very small spatially, or weak temporally. The ability to maintain concurrently low resolution wide area coverage and high resolution selective object investigation is required, for example, when an observer is required to monitor continuously a wide field of view coverage area when performing, for example, target detection, while at the same time (or at minimum loss of such wide field of view coverage time) performing high resolution candidate target investigation, for example visual classification (or recognition) of such suspect detections, using a narrow field of view with higher resolution.

In medical applications, and more specifically in the human visual system, the above problem is resolved by utilizing higher resolution, narrow field of view within a sensing region located in the central part of the field of view of the optics used for object recognition, and lower resolution, wide field of view peripheral sensing for spatial and temporal object detection, such as for example scene change and motion detection, and visual navigation analysis.

Various optical systems aimed at solving the above problems are described for example in the following patent publications: U.S. Pat. No. 5,172,235; U.S. Pat. No. 5,418,364; U.S. Pat. No. 6,734,911; U.S. Pat. No. 6,495,827; US 2003/01933562; US 2006/0175549.

SUMMARY OF THE INVENTION

There is a need in the art in a novel imaging system and method enabling effective monitoring of a field of regard for identifying and, if needed, locating a certain condition or event occurring within the field of regard.

The invention provides for utilizing imaging a field of regard with multiple fields of view (FOVs) and appropriately selecting one or more FOVs images projection onto imaging detector(s). More specifically, in some embodiments of the invention, multiple light components are collected from different zones (or different FOVs), respectively, of the field of regard (e.g. with the same numerical apertures of light collection). The selection of the FOV or multiple FOVs to be projected onto an imaging detector consists of combining the multiple light components into a combined light beam, and data indicative of a combined image formed by these multiple collected light components is generated. A control unit processes and analyses this data in order to detect whether a certain condition or event (or effect) exists in such combined image data. Upon detecting the existence of this condition or event, the control unit generates a control signal, which can be used to initiate separate imaging of the zone(s) thus detecting with which zone(s) said condition is associated, e.g. in which zone(s) certain event of interest exists. One or more parts of the selected zone can be then imaged with a lower numerical aperture of light collection and the same image resolution, e.g. the larger and lower numerical aperture images for the entire zone and the part thereof, respectively, are imaged onto the same-size light sensitive surfaces, either concurrently onto the light sensitive surface of different light detectors or sequentially onto the same light detector. In some other embodiments of the invention, the selection of the FOV or FOVs to be projected onto an imaging detector includes switching between the light components so as to allow one of them to be projected onto the detector, while prevent the other from being projected onto the detector. In yet further embodiments, the selection of the FOV or FOVs to be projected onto an imaging detector includes projection of different light components onto different imaging detectors.

Thus according to one broad aspect of the present invention, there is provided a method for monitoring a field of regard. The method comprises:

imaging at least a part of a field of regard by concurrently collecting a plurality of light components propagating from a plurality of zones, respectively, located within said field of regard, producing a combined collected light beam, and generating data indicative of a combined image of said at least part of the field of regard formed by said collected light components;

processing and analyzing said image data indicative of the combined image, and upon identifying existence of a certain condition or event in said image data, generating a corresponding control signal.

In some embodiments, the data indicative of the combined image may be generated by a single imaging detector.

The control signal may be used to operate the light collection to produce data indicative of one or more separate images of one or more of said zones, thereby enabling to identify one or more zones of the field of regard with which said condition or event is associated. Said one or more separate images may be visually represented (displayed).

In some embodiments of the invention, the data indicative of the separate images of the zones may be produced concurrently, e.g. by projecting said collected light components onto a plurality of light sensing regions, which may be light sensing regions of the same imaging detector.

In some other embodiments of the invention, the data indicative of the separate images of the zones are sequentially produced until identifying one or more of the zones with which said condition or event is associated. To this end, projection of at least one of said light components onto an imaging detector is selectively allowed, while the other light components are prevented from being projected onto the detector.

Some embodiments of the invention may additionally utilize imaging of at least a part of at least one of said zones with a second numerical aperture of light collection higher or lower than a first numerical aperture of light collection used for producing said combined collected light beam. For example, at least one of said zones is scanned to collect light from successive parts of the field of regard with said second numerical aperture.

Imaging with the second numerical aperture of the light collection may be actuated selectively upon identifying said certain condition or event in said image data indicative of the combined image. For example, said imaging with the second numerical aperture is applied to the at least one zone, that has been identified as that with which said condition or event is associated.

Alternatively, the combined light beam corresponding to the first numerical aperture of light collection and one or more light components collected with the second numerical aperture are selectively projected onto the same light sensing surface of the imaging detector.

In some embodiments of the invention, each of the light components is separately collected and focused onto a common beam combiner, the combined light beam is projected onto an imaging detector, and said processing and analyzing is applied to the output of said detector. The separate collection and focusing may be performed concurrently for the multiple light components, or selectively.

In some embodiments of the invention, the combined light beam is focused onto an imaging detector, and data indicative of output of said detector is then processed and analyzed.

In some embodiments of the invention, the multiple light components are deflected from multiple regions, respectively, of a curved reflective surface. Each of the multiple regions of the reflective surface reflects the respective light component along a different optical path.

In some embodiments of the invention, the light components from different zones are collected with overlapping solid angles of collection.

An optical system may be configured such that the combined light beam contains the same relative flux for each of the light components being combined.

In some embodiments of the invention, beam combining is a multi-stage procedure: At least two groups of the light components are separately combined, thereby producing at least two combined light portions. Then, these at least two light portions are further combined into said combined light beam.

In some embodiments of the invention, the entire field of regard can be independently imaged (e.g. by a separate optical system) with a third numerical aperture of light collection, higher than a first numerical aperture of light collection used for producing said combined collected light beam. In this case, imaging of the multiple zones of the field of regard with the combined light beam with the first numerical aperture and imaging of the entire field of regard with higher numerical aperture can be carried out using two different light sensitive surfaces, respectively, of imaging detector(s). For example, the control signal indicative of the certain condition or event in the combined image can be used to actuate image processing of said image of the entire field of regard to search for the zone therein with which said condition or event is associated.

In some embodiments of the invention, first and second images are acquired sequentially with the first and second numerical apertures of light collection, where the first image is the image of the zone and the second image is the image of a selected part of said zone. Such first image of the zone and the second image of the part of said zone, acquired with the respectively higher and lower numerical apertures of light collection, can be displayed onto the same display, i.e. with the same image resolution. The first and second images may be displayed concurrently, being concurrently acquired by two different imaging detectors, or displayed sequentially, being sequentially acquired using the same imaging detector, by sequentially switching between first and second light collection paths of the different numerical apertures of light collection. The sequential switching may be implemented using selective deflection of the collected light to thereby either allow or prevent its propagation to the detector.

In some embodiments of the invention, the field of regard is scanned, each scan including a plurality of zones forming a part of the field of regard.

In some embodiments of the invention, the plurality of light components are collected with a first numerical aperture from different directions of light propagation associated with the zones of different angular segments of a 360° space of the field of regard. The field of regard may be scanned such that each scan includes the plurality of said different angular segments. At least a part of the zone may be imaged with a second lower or higher) numerical aperture. Imaging with the second numerical aperture may be carried out selectively, upon identifying the certain condition or event in the first combined image data.

According to another broad aspect of the invention, there is provided a method for monitoring a field of regard, the method comprising:

concurrently collecting, with a first numerical aperture of light collection, a plurality of light components propagating from a plurality of zones, respectively, located within the field of regard, and selectively allowing one of the collected light components to propagate towards a common light detector to generate data indicative of an image of the respective zone;

processing and analyzing the images obtained with the first numerical aperture of light collection, and upon identifying existence of a certain condition in the first numerical aperture image of the zone, initiating light collection from at least one part of said zone with a second lower numerical aperture to be imaged with the same resolution as the first numerical aperture image of the entire zone.

According to yet further broad aspect of the invention, there is provided a method for monitoring a field of regard, the method comprising:

concurrently collecting, with a first numerical aperture of light collection, a plurality of light components from different directions of light propagation associated with a corresponding plurality of zones of different angular segments of a 360° space of the field of regard;

selectively allowing one of the collected light components to propagate towards a common light detector to generate data indicative of an image of the respective zone.

According to yet another broad aspect of the invention, there is provided a monitoring system for monitoring a region of regard. The monitoring system comprises an optical system comprising: a light collection arrangement for collecting a plurality of light component coming from different zones, respectively, of a field of regard; a light combiner arrangement for combining the collected light components and producing a combined light beam; a light detection unit comprising at least one light sensitive surface and capable of receiving said combined light beam and generating data indicative of a combined image of at least a part of the field of regard formed by the collected light components; and a control unit connectable to said optical system, and configured and operable for receiving said data indicative of the combined image, and processing and analyzing said data so as to, upon detecting that said data is indicative of a certain condition or event in said at least part of the field of regard, generating a control signal.

In some embodiments of the invention, separate, optionally boresighted, light collecting units (or FOV optics), are combined and such optical FOVs are projected onto a single imaging detector. In such a manner, the immediate FOV remains small while the angular field of regard coverage increases by using increasingly more optical FOVs. The separate optical FOVs may be projected onto a single imaging detector, optionally via beam splitters/switches. The small immediate FOV provides improved detection sensitivity of resolved and sub-pixel objects and changes in the image, albeit not knowing where exactly in the field of regard the effects (events) took place.

In some other embodiments of the invention, an optical switch such as a mechanical or electro-optical shutter (e.g. spatial light modulator) is used, such that the separate FOVs can be respectively, separately and sequentially switched thereby enabling imaging of each FOV over time. The sequentially switched imagery is then processed by detection, tracking and classification algorithms for continuous and rapid monitoring of large fields of regard. The invention provides for short switching times between the FOVs for rapid target classification and investigation while maintaining continuous field of regard coverage. Different FOVs may also be spectrally filtered thereby providing multi-spectral coverage of FOVs. Spectra may include the visible range (VIS), near IR range (NIR), short wave IR (SWIR), mid wave IR (MWIR), long wave IR (LWIR).

In yet further embodiments of the invention, two or more of such multiple FOV imagers are used for stereoscopic triangulation of such detections for determining their distance from the imager, as well as their trajectories. For example, in case two such multiple FOV imagers are used, the switching capability may be used to locate the changing effects or objects in question.

Also, the invention provides using adaptive change detection algorithms which can be tailored to the effects and objects of interest. The processing engine provides for parametrically tunable detection of large as well as small effects and objects.

The invention provides for maintaining concurrently or in multiplexed fashion, multiple electro-optic wide FOVs (high numerical aperture of light collection) and narrow FOVs (low numerical aperture of light collection). Such ability is required, for example, when an observer is required to monitor continuously a wide FOV coverage area while performing, for example, target detection, while at the same time (or at minimum loss of such wide FOV coverage time) performing high resolution candidate target investigation, for example visual classification (or recognition) of such suspect detections, using a narrow FOV with higher resolution. In order to achieve larger coverage areas using the respective wide FOV and narrow FOV imagers, the imagers can be slewed or scanned across larger coverage areas, thereby creating larger narrow FOV fields of regard and larger wide FOV fields of regard.

The present invention, in some of its aspects provides for effectively combining wide FOVs, narrow FOVs, wide fields of regard and narrow fields of regard, such that their respective advantages may be utilized concurrently by an observer and by related image and video processing and analysis systems.

In some embodiment of the invention, separate, preferably boresighted wide FOVs and narrow FOVs imagers, in an image or video display configuration which combines the outputs of the two imagers thereby providing a combined wide FOV—narrow FOV display, whereby the center part of the display is occupied by the narrow FOV, and the peripheral part of the display is occupied by an interpolated and improved version of the wide FOV. The interpolation factor is preferably the magnification ratio of the wide FOV and narrow FOV imagers.

In another embodiment, an optical switch is used which projects sequentially over time separate optical trains properly focused on a single detector element such as a 1D or 2D focal plane array. The separate optical trains are preferably boresighted. The separate optical trains may be wide FOV and narrow FOV imagers (or for example imagers of different or similar FOVs but of differing spectral bands). The sequentially switched imagery are then combined digitally in an image or video display configuration, which combines the outputs of the two imagers thereby providing a combined wide FOV—narrow FOV display, whereby the center part of the display is occupied by the narrow FOV, and the peripheral part of the display is occupied by an interpolated and improved version of the WFOV, the interpolation factor being preferably the magnification ratio of the wide FOV and narrow FOV imagers. This is particularly important in imaging applications where the detector is an expensive and complex device which may also require extensive system resources.

In yet another embodiment, an optical switch is used which projects sequentially over time separate optical trains properly focused on a single detector element where one or more optical FOVs may be scanned with an additional scanning provision thereby resulting in large wide or narrow field of regard. The wide FOV scanner may support high scanning rates due to its relatively small dimensions, and the narrow FOV scanner with its typically larger dimensions may be scanned at slower rates with minimal loss of wide field of regard coverage times. This is typically true due to the fact that the narrow FOV optic typically uses longer focal lengths and in order to maintain a low F# figure for improved sensitivity and resolution, its aperture will increase in proportion with the focal length. When using mirrors for scanning purposes, and especially in situations of increased angular scanning rates and angular coverage fields of regard, it is of interest to minimize the dimensions of the scanning mirrors and their respective optical apertures. It is also of interest to minimize the optical window dimensions, if such are required depending on the operating environment of the system. In such embodiment, the typical operation of the system is rapid wide FOV scanning, followed by suspected detection processing of such wide FOV imagery, thereby and slewing the narrow FOV imager to designated suspect azimuth and elevation coordinates for further investigation, acquiring said designated objects in a sequential manner and applying classification processing to each, and finally returning to the rapid wide FOV scanning mode.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 6D to 6G show four examples, respectively, of an imaging capsule equipped with a monitoring system of the present invention;

FIGS. 6H and 6I illustrate respectively, the conventional endoscope and an endoscope equipped with the monitoring system of the present invention;

FIGS. 6J and 6K show more specifically the capsule or the endoscope carrying with the monitoring system of the present invention;

FIGS. 10A to 10C illustrate an example of the optical system of the present invention for imaging a zone (field of regard) and a part thereof onto the same detector (with the same resolution) with respectively higher and lower numerical apertures of light collection (wider and narrower fields of view);

FIG. 16B describes a typical and exemplary state transition matrix provided by the present invention.

DETAILED DESCRIPTION OF EMBODIMENTS

Figure 1A:
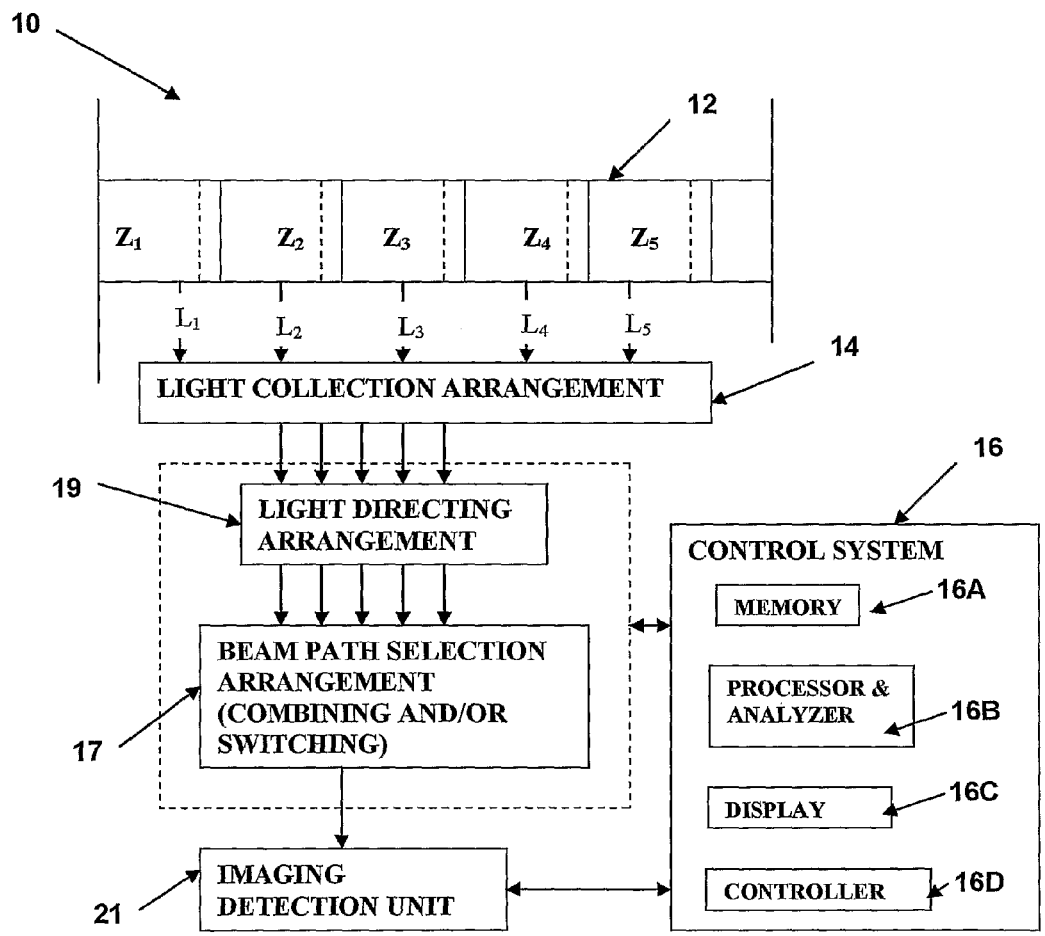
FIG. 1A is a block diagram of a monitoring system according to an example of the invention for monitoring a field of regard.

Referring to FIG. 1A, there is illustrated, by way of a block diagram, an example of a monitoring system, generally designated 10, of the present invention for monitoring a field of regard 12 to enable detection of a certain condition or event in the field of regard. The monitoring system 10 includes an optical system 14 which is connectable (via wires or wireless signal transmission) to a control system 16.

The optical system 14 includes a light collection arrangement 15. The latter may include one or more light collecting units (e.g. lenses and/or mirrors). Generally, the light collection arrangement is configured to define a plurality of n light collecting regions for collecting a corresponding plurality of light components $L_1, \ldots L_n$, five such light components being exemplified in the figure. These n light components propagate along different paths from different zones $Z_1, \ldots Z_n$ or regions of the field of regard 12 (or a part thereof). Preferably the light collection arrangement is configured to provide certain overlap between the adjacent fields of view. All the light collecting regions of the light collection arrangement 15 collect light with a certain numerical aperture of light collection, preferably being the same for all the light collecting regions. It should be noted, and will be exemplified further below, that the light collection arrangement may be additionally configured to collect light from a part of the zone with a second, lower or higher numerical aperture.

Further provided in the optical system 10 is a light combiner arrangement 17 for combining the multiple light components $L_1, \ldots L_n$ into a combined light beam $L_{com}$; and a light detection unit 21 (including one or more light detectors each having a light sensitive surface) for receiving light and generating data indicative thereof, e.g. receiving the combined light beam and generating a combined image of at least a part of the field of regard formed by the collected light components. Also provided in the optical system is a light directing arrangement 19 which is configured for directing the collected light components to the combiner arrangement 17 and/or directing the combined light beam to a detection unit.

It should be noted that the light directing and combining arrangements may include or may be constituted by common optical elements, as will be exemplified further below. Also, the light combining arrangement may include beam combiner(s) and/or splitter(s) and/or optical switching element(s).

The control system 16 is typically a computer system including inter alia a memory utility 16A, a data processing and analyzing utility 16B, a data presentation utility (display) 16C, and preferably also includes a controller utility 16D for operating the optical system. The control system 16 is configured and operable for receiving data indicative of the combined image, and processing and analyzing this data to detect whether it is indicative of existence of a certain condition or event somewhere in the field of regard (or part thereof) from which the light has been collected. Upon detecting the existence of such condition or event, the control system (its data processing and analyzing utility 16C) generates a corresponding control signal. The latter can be used by the controller utility 16D to appropriately operate the optical system as will be exemplified further below.

The present invention provides for combining light indicative of multiple fields of view images resulting in coverage of a larger field of regard. In some embodiments of the invention, the multiple fields of view images are projected onto a single light detector. This technique allows for retaining a sufficiently high resolution (i.e. small instantaneous FOV or small numerical aperture of light collection of each of the collected light components) for the detection of changes (such as small effects and moving objects) in the combined image. Some embodiments of the present invention are particularly suitable for applications in which such detection is required, but there is no need in determining the exact location of the detection in the field of regard. This for example may be sufficient for providing an alarm (control signal) indicative of that certain effect (or condition or event) has been detected in the field of regard.

Figure 1B:
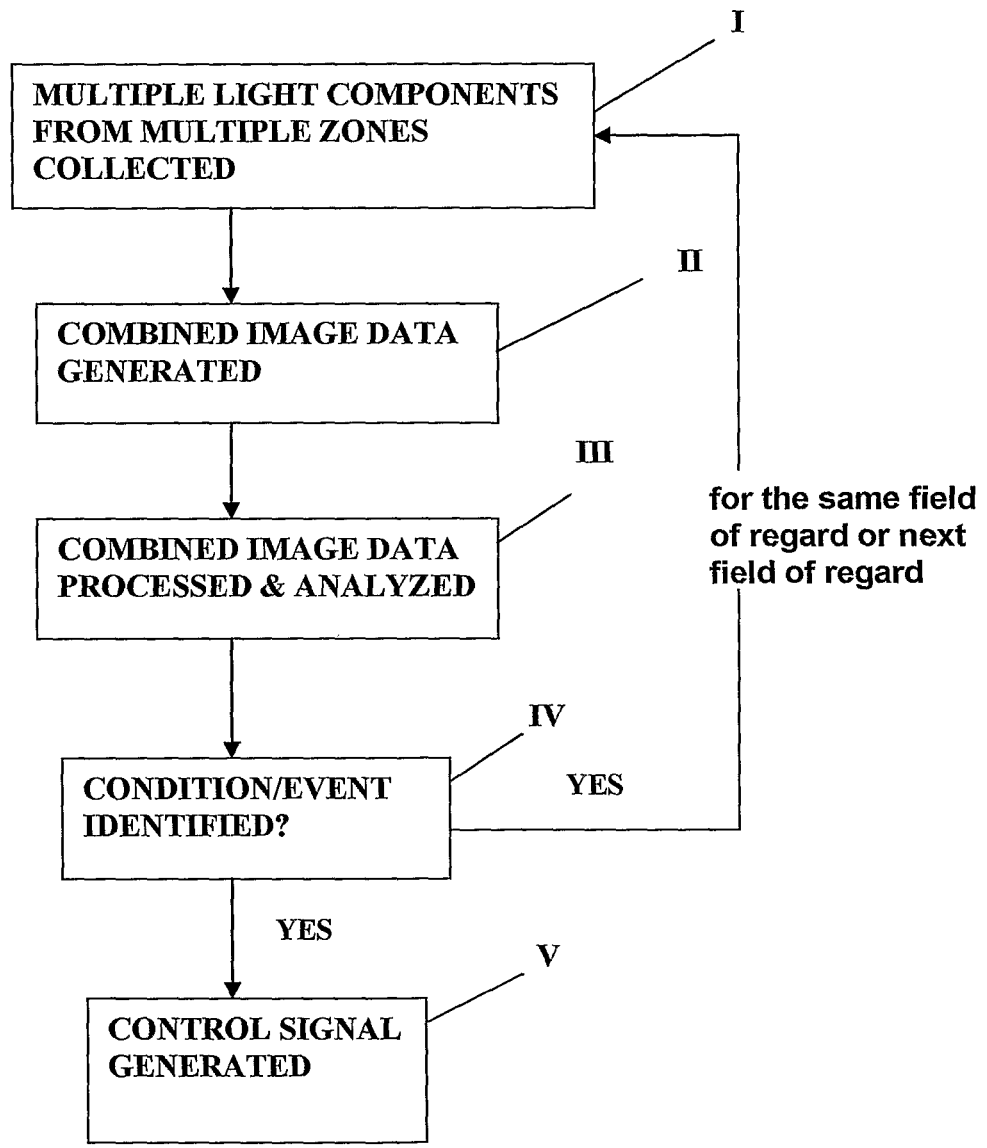
FIG. 1B is a flow chart exemplifying a method of the present invention for monitoring a field of regard.

Reference is made to FIG. 1B exemplifying a method of the present invention for monitoring a field of regard. The light collection arrangement is continuously or periodically operated to collect light from multiple zones of a field of regard (step I). The collected light is combined into a combined light beam and data indicative thereof is generated (step II). This data is appropriately processed (step III) to detect existence of a certain effect (condition or event) in the combined image data (step IV), and, if detected, generate a control signal (step V) or if not, continue light connection for the same field of regard or the next one (step I). To this end, the control system utilizes certain reference data and runs a suitable image processing algorithm. The latter may be of any known suitable type capable of "searching" for predefined features.

For example, such algorithm is adapted to carry out the following: artifact removal, spatial and/or temporal matched filtering (which might require temporal registration and differencing), thresholding, spatio-temporal discrimination. Camera artifacts, such as fixed pattern noises, are corrected and "bad" pixels are replaced or interpolated with their neighbors. Spatial matched filters can be applied in various dimensions and geometries such that all objects at varying distances and orientations may be detected. Temporal matched filtering is based on the knowledge of how the object or the image change of interest behaves over time. Thresholding may include spatio-temporal threshold application for achieving constant false alarm rate detection, such that areas in the image with high levels of clutter will utilize respectively higher thresholds. Spatio-temporal discrimination of candidate objects over time generates tracks that are then examined in terms of their likelihood of being the object or image change of interest for final detection. When the line of sight of the imaging system is moving, the background information (clutter) will be changing temporally thereby introducing false alarms into the temporal matched filtering. In such cases, it might be necessary to add an additional processing stage that performs temporal image registration and temporal differencing of consecutive imagery. Alternatively or in addition, different spectral bands can be used as multiple inputs into the processing method. Also, pyramidal image representations can be used thereby locating candidate objects of various dimensions utilizing a single sized matched filter. The spatial matched filtering may be implemented using a spatial difference of Gaussians (SDOG) filter matched to the dimensions of the object in question, and also including a morphological blobbing provision for determining connectivity and dimensions of blobs which are then analyzed in terms of the a-priori knowledge of the object in question. For example, if typically objects or image changes of dimensions up to 3×3 pixels are of interest, then the blobbing will reject any candidate blobs which are larger than 3×3 in any dimension. Temporal matched filtering may be implemented using a temporal difference of Gaussians (TDOG) filter matched to the temporal behavior of the object in question, e.g. if the object is a brief temporal effect having a typically temporal Gaussian distribution, then the first TDOG Gaussian is typically the shape of the temporal effect, while the second Gaussian is longer in time thereby providing a background rejection.

As indicated above, in some application, generation of the control (alarm) signal is sufficient to classify the specific field of regard as "dangerous", "defective", "abnormal", etc. In some other applications, the control signal is further used for appropriately operating the optical system to locate the zone associated with the specific condition or event, as will be described further below.

Figure 2:
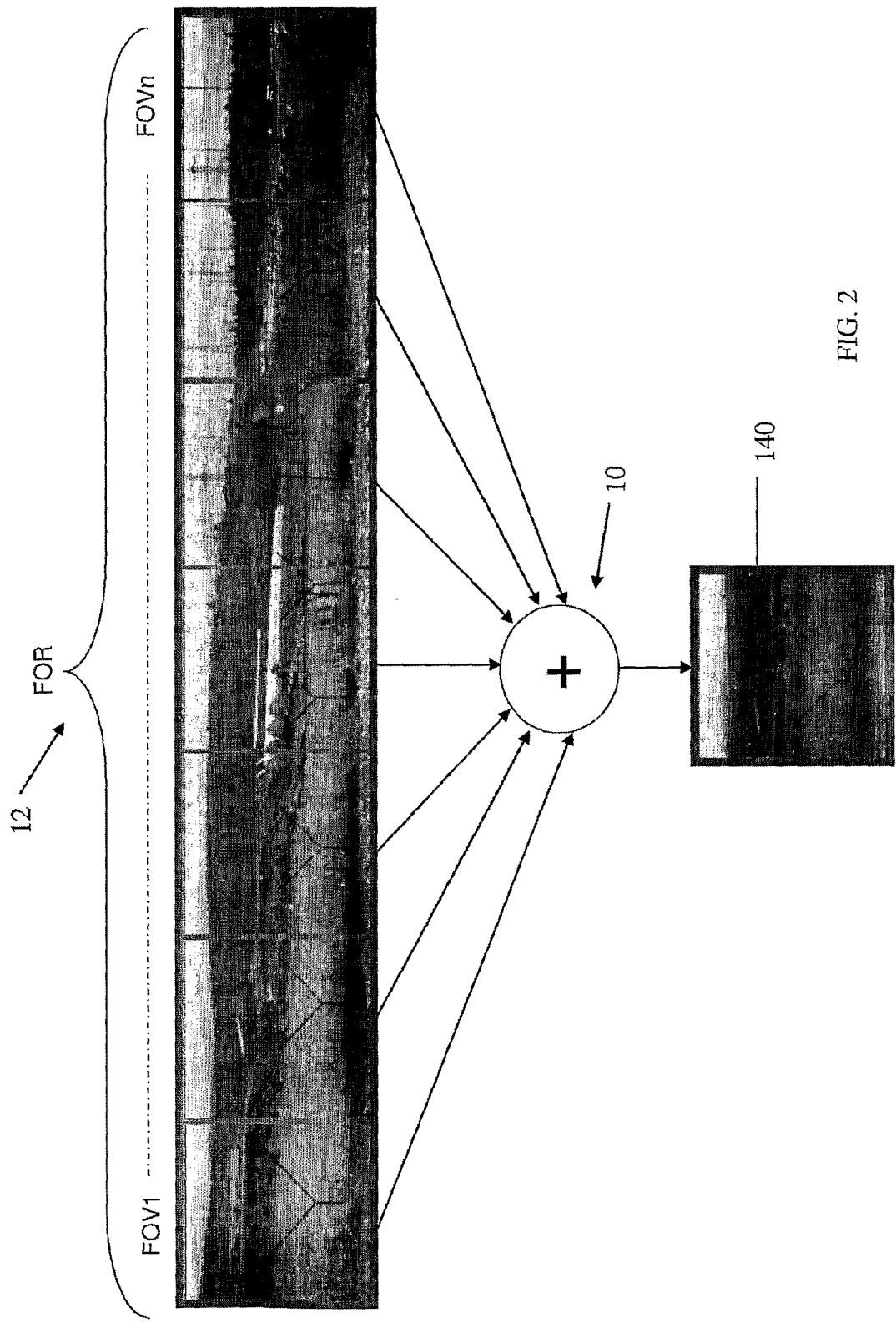
FIG. 2 is an example of, the operation of the monitoring system of the present invention, using the single imaging detector.

Reference is made to FIG. 2 exemplifying images obtainable with the above-described system. A field of regard (FOR) 12 is formed by several zones (seven zones in the present example) generally at Z, corresponding to different fields of view (FOVs). The optical system operates to project these FOVs in an additive manner onto a single image detector (light sensitive surface), thereby generating composite image data 140 which may or may not be displayed. Such composite image 140 now represents the field of regard at an n-fold improvement with respect to the image detector pixel count, n being the number of FOVs employed to cover the field of regard.

It should be understood that multiple FOVs' images may be acquired by optics configured as panoramic imagers distributed at a distance from each other, depending on the specific application (e.g. over a larger geographical region for covering a large urban region, or integrated onto a platform which may have to be potentially protected from potential threats), thereby providing sufficient overlapping for redundancy and providing possible additional triangulation of the detected effects. Triangulation of the detections can be determined by the control system.

Figure 3A:
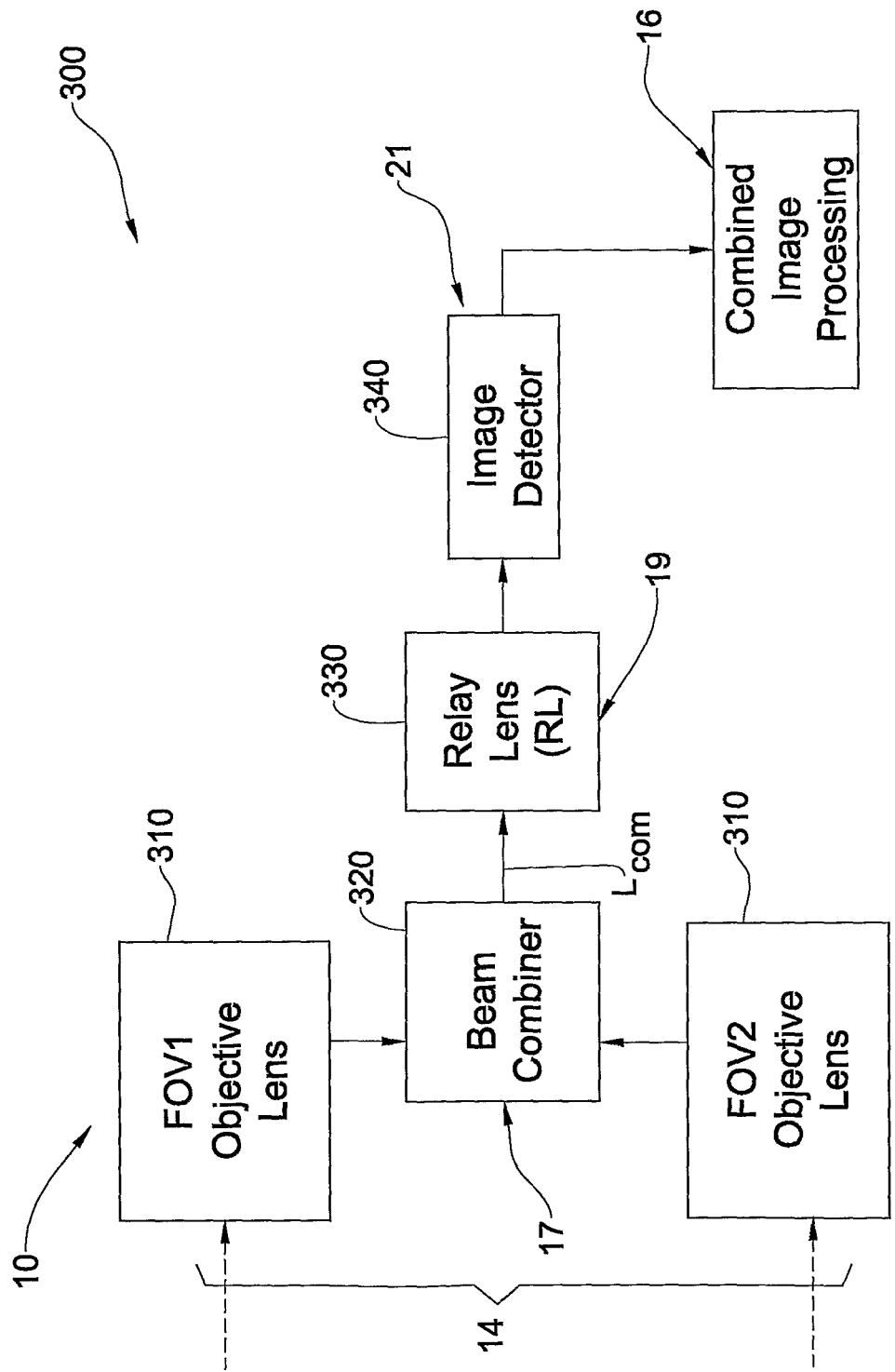
FIG. 3A is a block diagram of an example of the monitoring system of the present invention, where two light components collected by separate focusing optics with the similar numerical aperture of light collection (or fields of view) are combined by a beam combiner and projected onto a light detector.
Figure 3B:
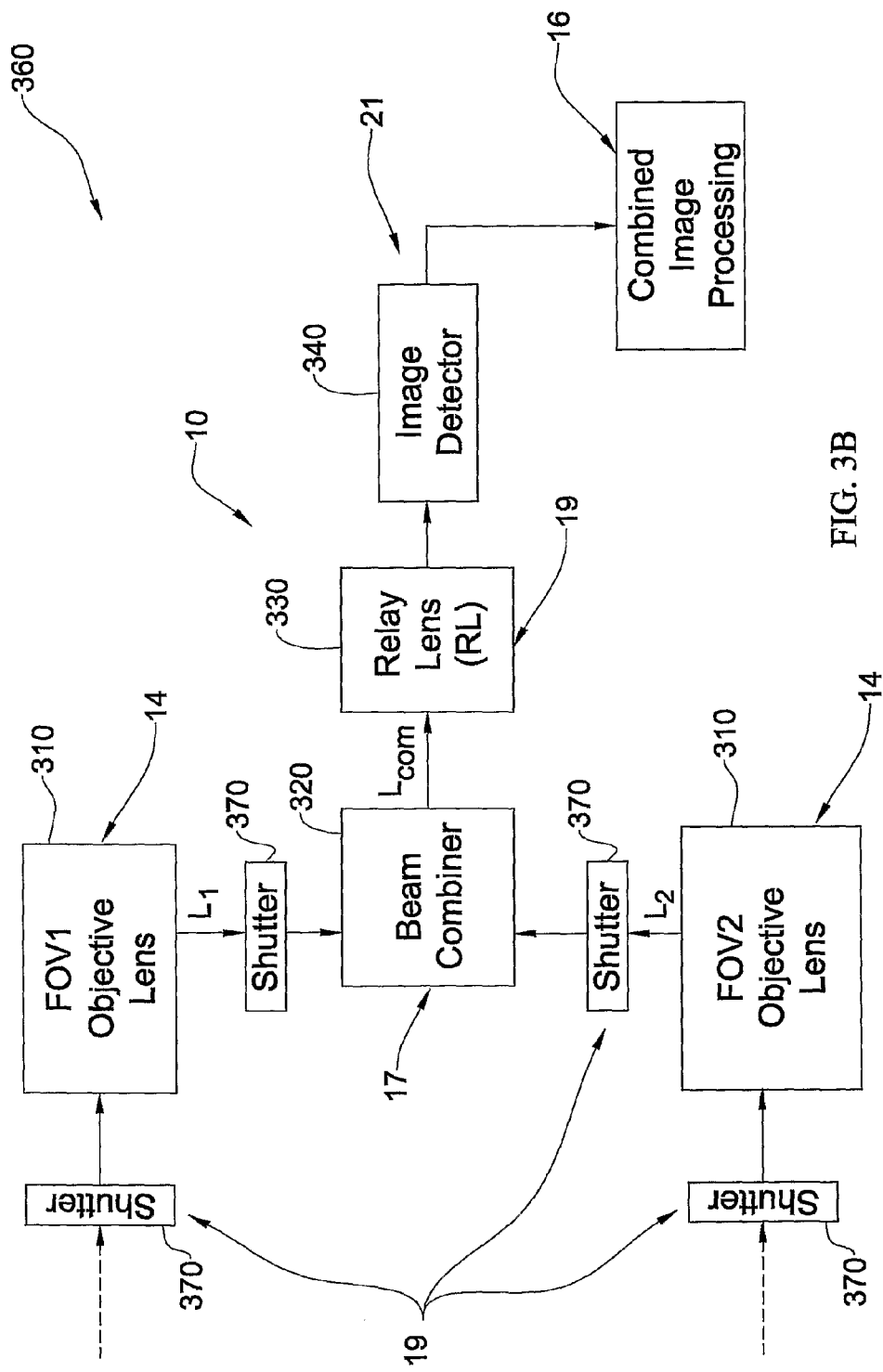
FIG. 3B is a block diagram of an example of the monitoring system of the present invention, where two light components collectable by separate focusing optics with the similar numerical aperture of light collection are selectively projected onto an imaging detector.
Figure 3C:
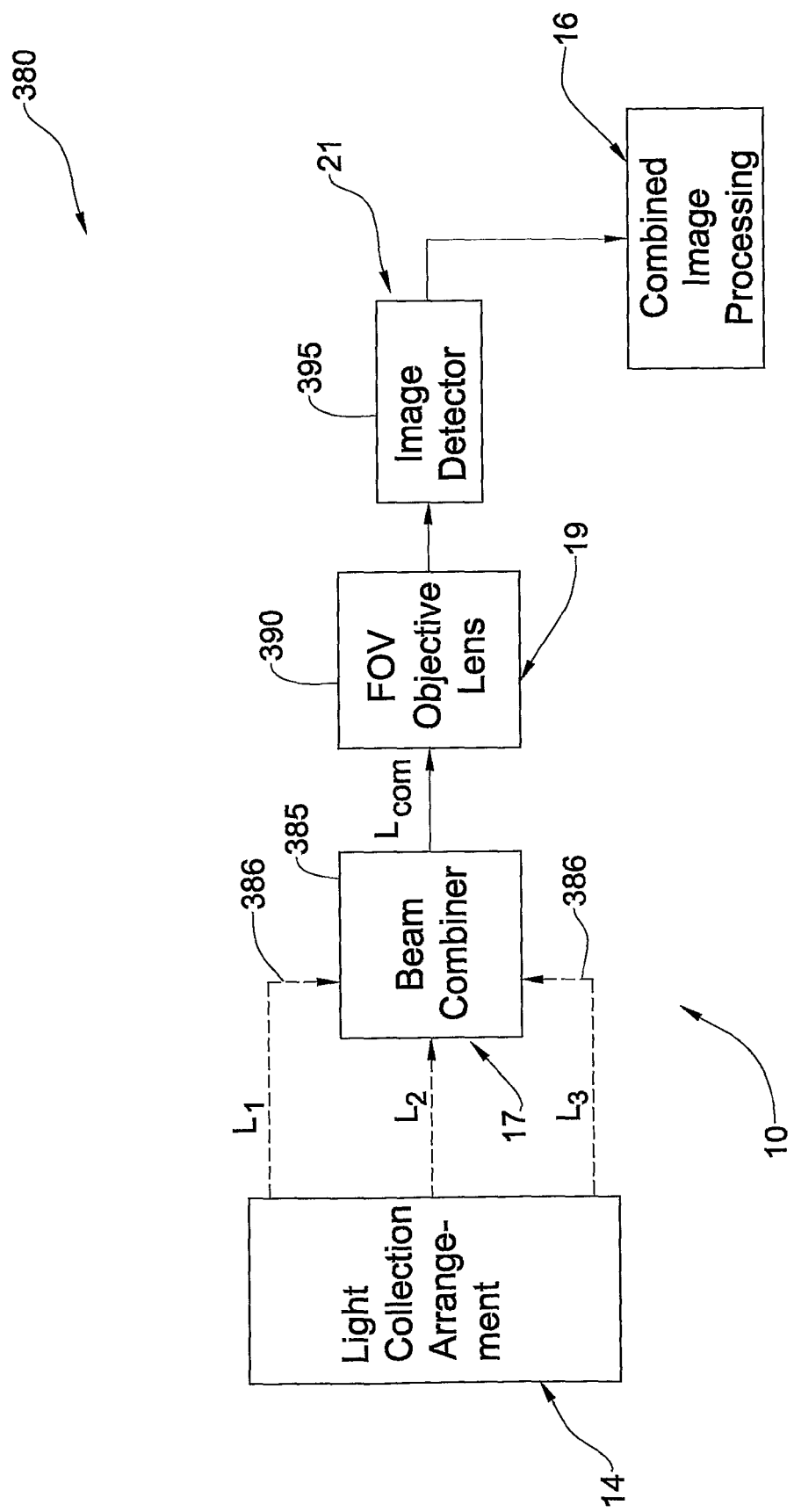
FIG. 3C is a block diagram of an example of the monitoring system of the present invention, where three light components are collected and combined into a combined light beam, which is focused onto an imaging detector.

Reference is made to FIGS. 3A-3C showing, by way of a block diagram, some examples of the configuration of the monitoring system of the present invention.

The light sensitive surface is generally located in a back focal plane of the collecting lens (objective lens). The beam combining elements generally preserve the diverging angles of light rays. In order to accommodate different effective focal lengths of the objective lenses while enabling the incorporation of the beam combining elements (e.g. prisms, coated surfaces) along the back focal distance of the collecting (objective) lenses, a relay lens may be used for generating sufficient distances for placement of the light sensitive surface or camera element while maintaining the focus. FIG. 3A shows a monitoring system 300 including an optical system 10 connectable to a control system 16. The optical system includes a light collection arrangement 14 which in this specific example is shown as including two (or more) objective lens units 310, a beam combiner arrangement 17 which in this example is formed by a single beam combiner 320, a detection unit 21 which in this example includes a single light detector 340. Here, a light directing arrangement 19 includes relay optics (e.g. relay lens) located in the optical path of a combined light beam, and possibly also includes some light directing elements (not shown) in the optical path of light components propagating towards the beam combiner. It should be noted that the relay lens or objective lens in front of the light sensitive surface of the detector may be a constructional part of the detector.

In the example of FIG. 3B, a monitoring system 360 is shown, in which an optical system 10 includes a light collection arrangement 14 formed by two objective lens units 310, a beam combining arrangement 17 including a beam combiner 320, a light detection unit 21 including a single light detector 340, and a light directing arrangement 19. The latter includes light directing elements 370 in the optical paths of light propagating towards the beam combiner, and a relay lens unit 330 in the optical path of the combined light beam. Each of the light directing elements 370 is configured and operable to selectively allow or prevent inclusion of a respective FOV in a combined image data of the field of regard. This can be implemented by accommodating such element 370 in an optical path of light propagating towards the respective light collecting unit 310 (objective lens) and/or in an optical path of the collected light component propagating towards the beam combiner.

Such light directing element 370 may be mechanically switched between its operative and inoperative positions being respectively in and out of the optical path. This may be a shiftable (rotatable) light deflector (mirror). Alternatively, the light directing element 370 may be stationary accommodated in the respective optical path and electronically switcheable between its operative and inoperative states in which it transmits/reflects the light component or blocks it. This may be an electro-optical element, e.g. a spatial light modulator (e.g. liquid crystal based modulator).

A monitoring system 380 shown in FIG. 3C has an optical system 10 including a light collection arrangement 14 (single- or multi-unit arrangement), a beam combining arrangement 17 including a beam combiner 385, a light detection unit 21 including a single light detector 395, and a light directing arrangement 19 including an objective lens unit 390 in the optical path of a combined light beam. As indicated above, the objective lens 390 may be integral with the detector.

The following are some specific but not limiting examples of the configuration of the optical system 10 suitable to be used in the present invention.

Figure 4:
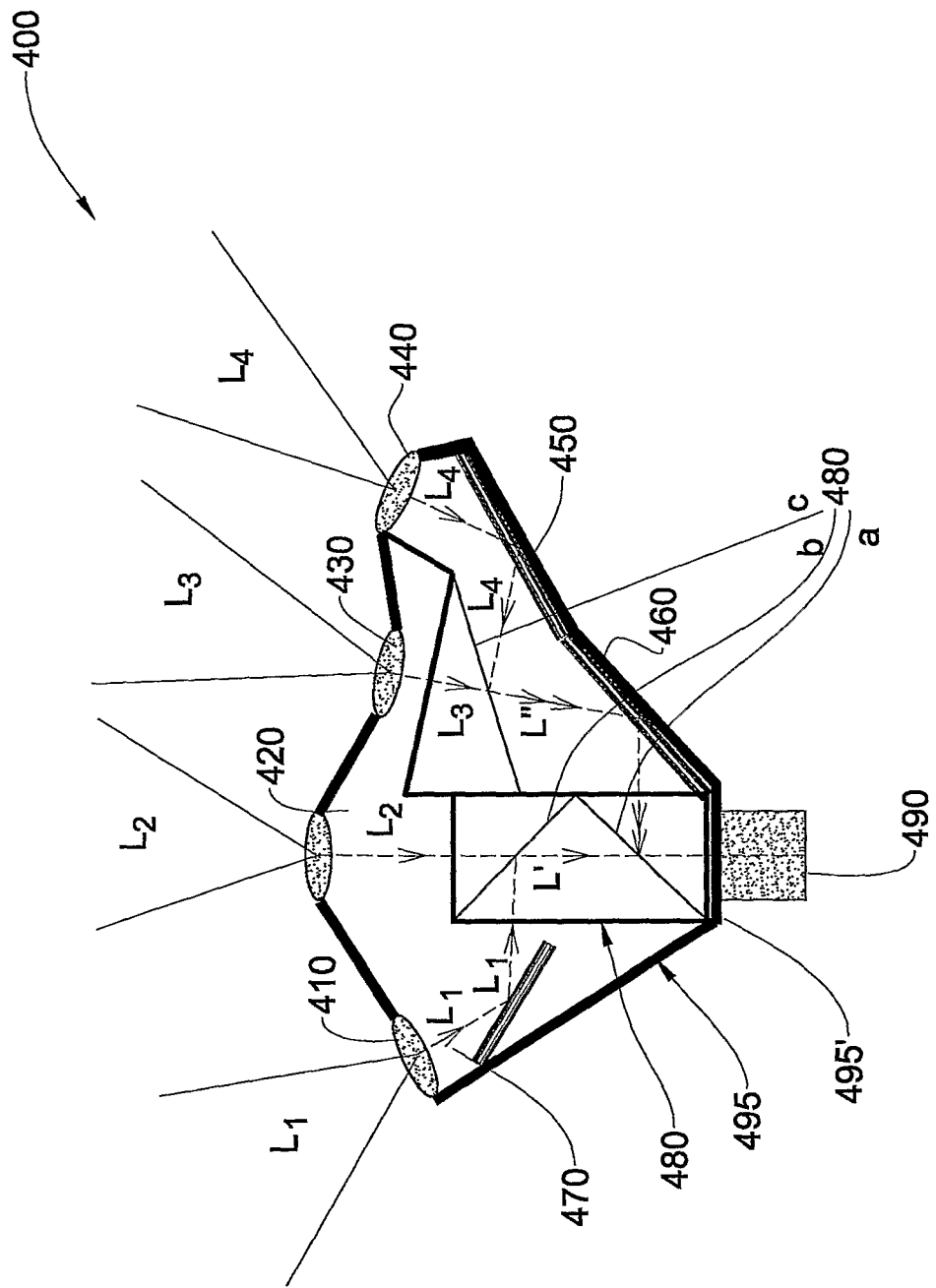
FIG. 4 is an example of the optical system suitable to be used in the monitoring system of the present invention, where four light components are collected and combined by a single-stage light combining arrangement.

FIG. 4 shows an optical system, generally designated 400, configured for combining light from four zones (FOVs) of a field of regard represented by light components $L_1$-$L_4$. The optical system is incorporated in a housing 495, which is formed with apertures (openings or generally optical windows). A light collection arrangement is formed by four collection/focusing units (objective lenses) 410, 420, 430 and 440 mounted in the optical windows made in the housing 495. Parts 450 and 460 of an inner surface of the housing 495 are reflective. This can be implemented by providing reflective coatings or mounting reflectors on said parts of the inner surface of the housing. These reflectors/reflective coatings are elements of light directing and combining arrangements. Such light directing and combining arrangements include also a reflector 470 and beam combining mirrors 480a, 480b and 480c (semi-transparent mirrors). A light detection unit 490 (e.g. including its associated optics such as objective and/or relay lens(es)) is appropriately accommodated proximate an outer surface of a facet/part 495' of the housing 495 being in an optical path of the combined light beam The detector may be mounted in an aperture made in the housing, or may be optically coupled to an optical window (e.g. aperture, transparent surface) made in the housing.

The system 400 operates as follows: Light components $L_1$-$L_4$ are collected by lenses 410, 420, 430, 440, with certain numerical aperture of collection and preferably with partial overlap between their FOVs. The collected light components are directed so as to be combined between them in groups (multi-stage combining): Light components $L_1$ is collected by lens 410 towards reflector 470 which reflects it towards a light combining layer 480b of a beam combiner element 480. Layer 480 is half (or partially) transmissive and half (or partially) reflective for light impinging on each side thereof thus combining such reflected and transmitted light components. It should be understood that generally such beam combining results in a beam L' which can be expressed as ($aL_1+bL_2$), where (a+b=1). The constants a, b may be typically 0.5 and 0.5 thus resulting in ($L_1+L_2$)/2 beam, however different values may be selected so as to enable various arithmetic expressions of the summed beams. Light component $L_2$ is collected by lens 420 and directed onto light combining layer 480b so as to be transmitted thereby. The so-combined first-group light beam L' is directed onto another light combining layer 480a of the light combiner element 480 configured similar to layer 480b and oriented at 90° with respect to layer 480b. Light component $L_3$ directly propagates from its respective collecting lens 430 to a partially transmitting and partially reflecting surface of a further light combining layer 480c. Light component $L_4$ propagates from lens 440 to reflector 450 which reflects it onto the opposite partially reflective and partially transmissive surface of light combining layer 480c. Thus, the second-group combined light beam L" which may be expressed as (($L_3+L_4$)/2) is provided and is then reflected by reflector 460 towards the reflective surface of combining later 480, where this beam is combined with beam L', resulting in a final combined light beam $L_{com}$.

It should be noted that the arrangement of the above optical elements is preferably such that light components collected by all the lenses are partially reflected and partially transmitted through the beam combining layers, such that all the light components undergo the same reduced proportion of flux. In the example of FIG. 4, each flux is effectively divided by four, (($L_1+L_2$)/2+($L3+L_4$)/2)/2)=($L_1+L_2+L_3+L_4$)/4, and as they are all summed together, the finally combined light beam $L_{com}$ retains the average flux collected from all their respective FOVs. Accordingly, when all light components are projected onto the same detector element, they all contribute the same relative flux. The reflective surfaces used in the above-described system are preferably fully reflective. The lenses optionally have the same effective focal lengths, although back focal lengths may vary as a function of the optical distance covered between the respective lens and the relay lens or detector.

Figure 5:
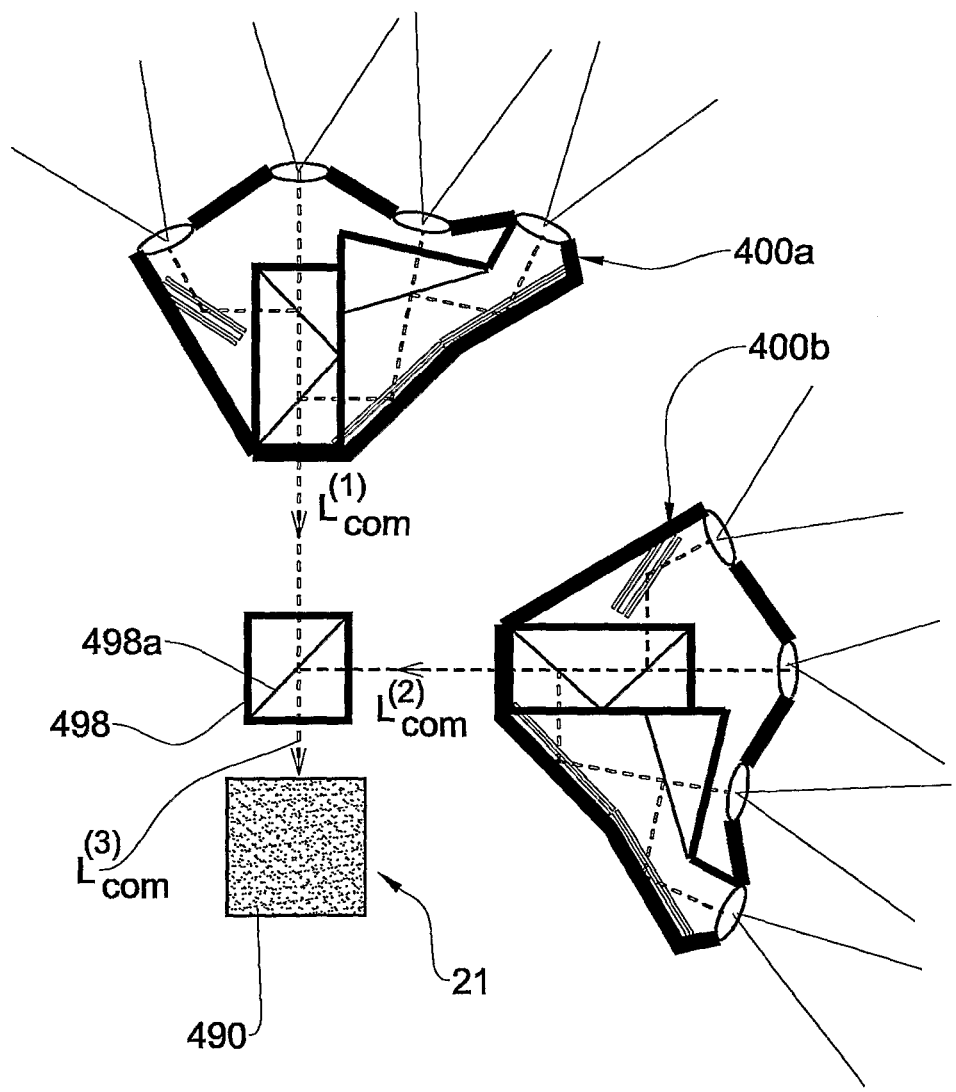
FIG. 5 is another example of the optical system suitable to be used in the monitoring system of the present invention, where two groups of four light components are combined using a two-stage light combining arrangement.

FIG. 5 shows an optical system 496 which is a two-part system with a common light detection unit 490. Each of these two parts 400a and 400b of the optical system carries a combination of the optical elements described above with respect to example of FIG. 4, and thus produces a combined light beam, $L^{(1)}_{com}$, $L^{(2)}_{com}$. A further beam combiner 498 is used for combining these two beams $L^{(1)}_{com}$ and $L^{(2)}_{com}$ into a final combined beam $L^{(3)}_{com}$ propagating to the detector. The beam combiner 498 includes a light combining layer 498a (semi-transparent mirror) configured to half transmit and half reflect the beam $L^{(1)}_{com}$ and half transmit and half reflect beam $L^{(2)}_{com}$. By such a two-part optical system image information coming from an even larger field of regard can be collected and processed. If the respective angular segments (FOVs) of the fields of regard, from which light is collected by the two parts of the optical systems, overlap, then a complete imaging of an angular segment of larger field of regard can be achieved. In the present example, as shown in the figure, the fields of regard collectable by two part of the optical system provide for imaging a 180° angular segment.

It should be understood that although the illustration in FIG. 5 exemplifies two optical systems 400a and 400b accommodated so as to image the two parts of a field of regard spaced from each other in the same plane, the same principles can be utilized when imaging the two parts located in different (e.g. parallel) planes. This can for example be implemented by locating the optical system parts 400a and 400b one on top of the other, by utilizing a mirror-based periscopic relay that provides for the difference of elevation of the first unit from the second unit. Thus, a combination of two (or more) optical systems (associated with a common combiner and detector) provides modularity in optical field of regard coverage.

Figure 6A:
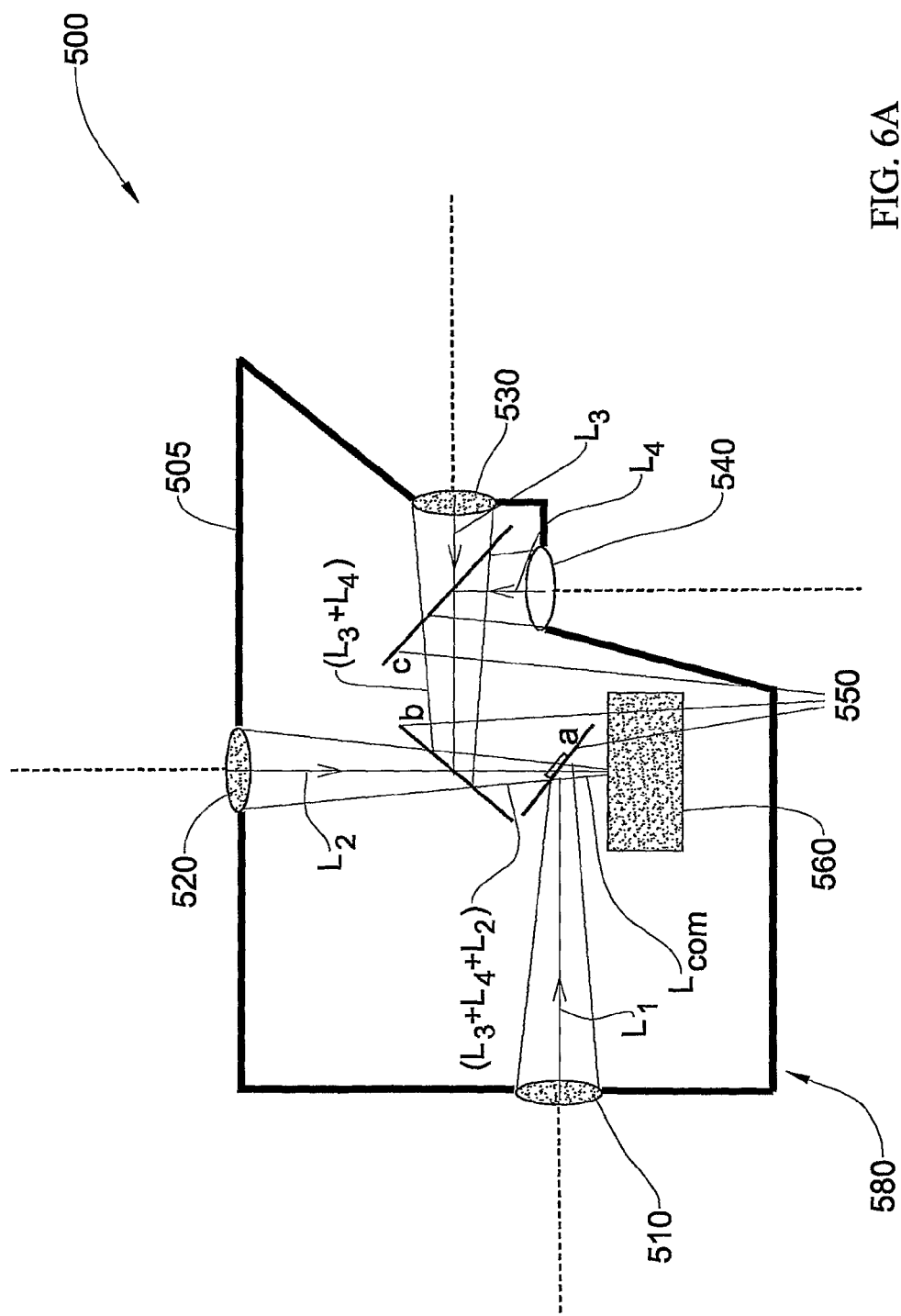
FIG. 6A is an example of the configuration of the optical system for collecting and combining four light components in a manner enabling monitoring of a panoramic field of regard.
Figure 6B:
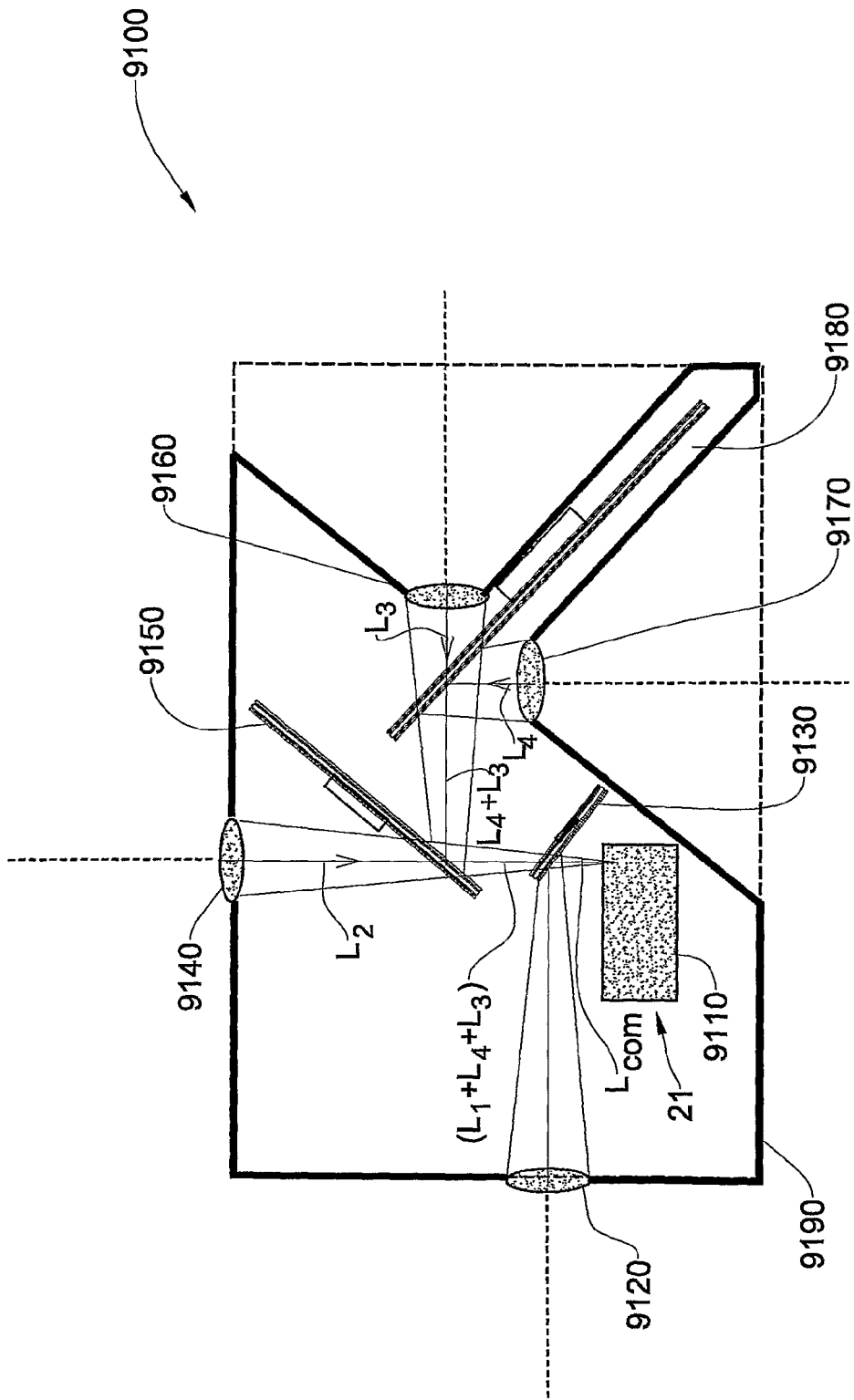
FIG. 6B is another example of the configuration of the optical system for collecting and combining four light components in a manner enabling monitoring of a panoramic field of regard, and enabling selective imaging of each of the light components.

Reference is made to FIGS. 6A and 6B showing two more examples of the optical system configuration, which enables panoramic imaging from a 360° field of regard. Such system configurations may be used in medical applications, by incorporating them for example in an endoscope or catheter.

In the example of FIG. 6A, an optical system 500 is shown, which includes a light collection arrangement including four different collection units (lenses) 510, 520, 530 and 540 that operate to collect image data being representative of four different fields of view. Further, the system includes a light combining arrangement formed by three light combining units 550a, 550b and 550c, each having a light combining layer in the form of a semi-transparent mirror as described above. Light components $L_3$ and $L_4$ are directed onto a combiner 550c, resulting in a light beam ($L_3+L_4$); this combined beam ($L_3+L_4$) is combined with a light component $L_2$ by combiner 550b resulting in a combined beam ($L_3+L_4+L_2$). The latter is then combined with a light component $L_1$ by combiner 550a, resulting in a final combined beam $L_{com}$. The combined light beam is directed onto a light detector 560. Thus, light components collected by all the light collection units are sequentially combined by multiple light combining elements. The light sensitive surface of the detector 560 is located at a respective focal distance from each of the collection units, whereby in some applications it may be preferred that the distances are equal. The optical elements in the optical paths of light beams $L_1$ and $L_4$ may also be designed so as to provide equivalent effective focal lengths, but with varying back focal lengths, thereby accommodating different physical distances for each optical path. The length of the optical path is defined by a distance between the optical collection unit (lens) and a number of the respective beam combining elements in said optical path, and further between the last beam combining element and the light detection unit.

In this embodiment, the angle between two fields of view collected by two adjacent light collecting units is substantially 90°. By this, image data indicative of parts of a 360° space field of regard can be collected concurrently. Moreover, the entire 360° space can also be imaged by scanning the field of regard, by rotating the optical system in the plane of the figure.

It should be understood that the beam combiners may also be configured as optical switches (e.g. spatial light modulator) or shutters (mechanical switches). This enables selective participation of the FOV imaged by a selective collection unit in the combined image of the field of regard, as well as enables, when needed, sequential imaging of separate fields of view (zones) on the same detector with the highest resolution.

FIG. 6B exemplifies such an optical system 9100. Here, similar to the above-described example of FIG. 6A, four light collecting units 9120, 9140, 9160 and 9170 are used for collecting light components $L_1$-$L_4$ respectively. Three beam combining elements 9180, 9150 and 9130 are appropriately accommodated for combining light components $L_1$ and $L_2$ resulting in a light beam L' which may for example be $(L_1+L_2)/2$, combining the light beam L' with light component $L_3$ resulting in a light beam L" for example being $((L_1+L_2)/2+L_3)/2$, and combining the light beam L" with light component $L_4$ resulting in a finally combined beam $L_{com}$, for example being $(((L_1+L_2)/2+L_3)/2+L_4)/2$. Here, each of the beam combining elements is either mechanically switcheable between operative and inoperative positions thereof to be respectively in and out of the optical path (e.g. using a revolving plate or a foldable mirror) or preferably electronically switcheable between its operative and inoperative states while being stationary in the optical path (e.g. using a spatial light modulator). It should be understood that elements 9180, 9150 and 9130 may also be segmented reflective surfaces appropriately accommodated for sequentially switching between light components $L_1$-$L_4$.

The approach taken here is the use of multiple optical switching/combining elements to provide high rate switching of multiple FOVs onto a single detector, whereby the different optical switches are located at different positions along the back focal axis of the respective lenses thereby requiring different radii for each optical switch depending on the radius of the converging light ray cone.

Figure 6C:
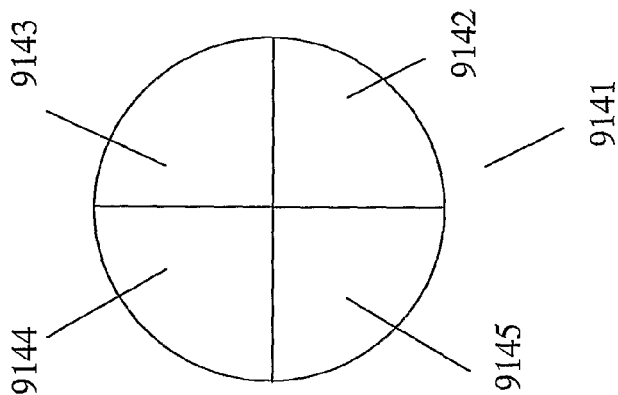
FIG. 6C exemplifies configurations for an optical switch used in the system of FIG. 6B.
Figure 6C:
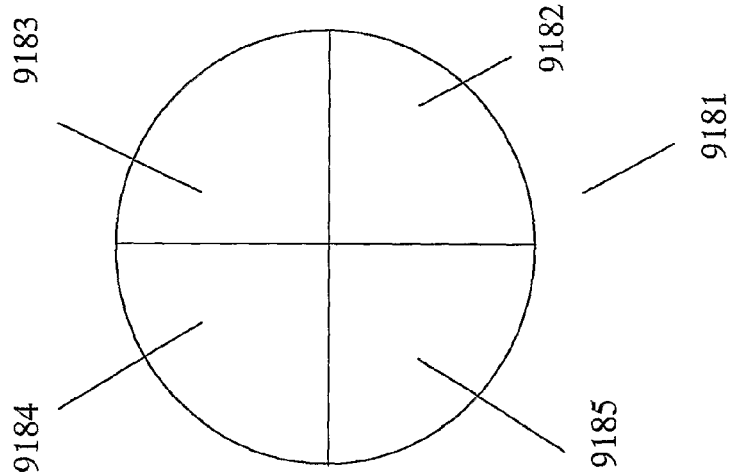
Figure 6C:
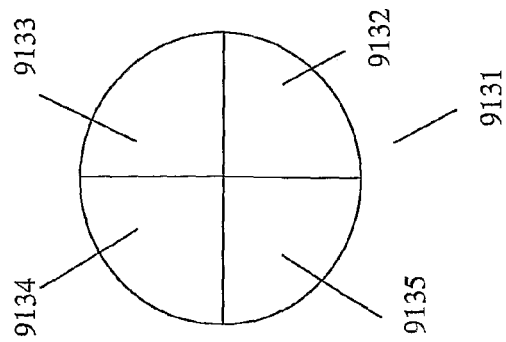

FIG. 6C shows several examples of the implementation of the optical switching/combining element. Elements 9131, 9141, 9181 depict exemplary sectioned layouts of the optical switches 9130, 9140, 9180, respectively in the system of FIG. 6B. The sections of various optical switches may be constructed as mirrors or transparent (or clear aperture). For the case of four FOVs, in order to achieve an imaging sequence of lenses 9120, 9140, 9160 and 9170, for example, the following mirror or clear aperture segment selection may be used: (1) 9134—mirror, 9133—clear aperture, 9132—clear aperture, 9135—clear aperture; (2) 9144—clear aperture, 9143—clear aperture, 9142—mirror, 9145—mirror; (3) 9184—clear aperture, 9183—mirror, 9182—clear aperture, 9185—mirror. The optical switches are revolving synchronously thereby resulting in digitally switching between the different FOVs. Different quantities of optical switches and optical elements may be used in this manner to achieve varying field of regards, angular resolution and field of regard update rates.

A representative example of the above system may as follows: a 2D focal plane detector with 100 Hz frame rate is used, the four FOVs results in a panoramic field of regard optical update rate of 25 Hz. For sensors having integration or exposure times of several milliseconds, such configuration will suffice. The rate at which the optical switches are to revolve about their axes is 25 revolutions per second.

Such exemplary configuration generates typically a panoramic or wide planar field of regard, for example in the azimuthal horizontal plane. In order to achieve a hemispherical coverage, additional reflecting mirror elements may be positioned along the optical axis externally to the optical lenses, such that by tilting the respective reflecting mirror elements the field of regard will be extended vertically.

FIGS. 6D to 6K illustrate how the present invention may be used in medical applications, being incorporated in a capsule (imaging capsule) or flexible endoscope. FIGS. 6D-6G illustrate various examples of imaging capsule, generally at 1000, utilizing the principles of the current invention for imaging a region of interest (field of regard) with multiple FOVs.

As shown in FIG. 6D, two imaging detectors 21 and 21' are used for imaging two filed of view $FOV_1$ and $FOV_2$ through lenses 14A and 14A', respectively. Detectors 21 and 21' are located inside the capsule in the optical paths of light components collected by lenses 14A and 14A' located at opposite ends of the capsule. The lenses have large numerical aperture of light collection (i.e. "very wide" FOVs), about 160 degrees.

In the example of FIG. 6E, two "very wide" FOV lenses 14A and 14A' are used at opposite ends of the capsule being associated with two detectors 21 and 21', and a beam switching element 17. The latter is two sided mirror stationary mounted in optical paths of light components collected by lenses 14A and 14A', thus selectively reflecting either one of this light components to the respective detector.

FIG. 6F shows the setup using a single imaging detector 21 and a switching element 17 which is a two sided mirror and which is shiftable (movable) between its two positions. In one of its positions (shown by a solid line), the switching element 17 reflects light component from lens 14A' to detector 21, and in the other position (shown by a dashed line) reflects light component collected by lens 14A to detector 21.

In the example of FIG. 6G, capsule 1000 carriers four lenses, where lenses 14A, 14A' are arranged along one axis of the capsule and lens 14A" and the fourth one (not seen in the figure) are arranged along the other perpendicular axis of the capsule. Located inside the capsule are a single imaging detector 21 and a switching element 17. Switching element 17 is shiftable between different operative positions (revolving mirror) to selectively direct light components to detector 21. In this manner the field of regard can be covered quickly since the mirror mechanism can accelerate respective image exposures.

FIG. 6H shows the distal end 3000 of a flexible endoscope of the conventional configuration. As shown, the endoscope includes light directing elements 19 (optical fibers) guiding light from external light source(s), an imaging optics (objective lens) 14A, and a working channel 3001 (e.g. for mounting a treatment tool) as well as water and suction supply channels 3002 and 3003. FIG. 6I shows such a conventional endoscope equipped with a monitoring system 10 of the present invention. The system 10 is attached to the distal end of the endoscope, being secured to the working channel by an appropriate mechanical arrangement. System 10 includes lenses 14A, 14A', 14A" and 14A''' (e.g. each observing a 90 degrees FOV), as well as switching arrangement and imaging detectors which are not shown here. The system provides both a frontal viewing capability using a front end optic and imaging detector, and the other peripheral optics enabling switched peripheral observation using a second imaging detector. This is elaborated in FIGS. 6J and 6K, where the monitoring system is shown as being incorporated in a capsule, but is should be understood that this may also constitute a cylindrical housing attachable to the distal end of the endoscope.

As shown in FIG. 6J, lens 14A is located at the distal end of the capsule (endoscope), and lenses 14A', 14A", and 14A''' (and possibly more lenses) are arranged in a spaced-apart relationship along a circumference of the capsule (endoscope) in a plane perpendicular to the optical axis of lens 14A. FIG. 16K shows a capsule (endoscope) with a similar arrangement of lenses 14A, 14A', 14A", and 14A''', and also including a switching element 17 and two back to back imaging detectors 21 and 21', one imaging through the frontal optics, and the second switching through the different peripheral optics via revolving mirror mechanism 17 which can also be implemented by a MEMS technology device.

In the above described examples, the light collection arrangement was formed by multiple discrete light collecting units. However, the light collection arrangement may alternatively or additionally include a continuous curved surface of a light deflector, preferably mirror. This curved surface defines discrete light collecting regions, which collect light from different FOVs. This is exemplified in FIGS. 7A and 7B.

Figure 7A:
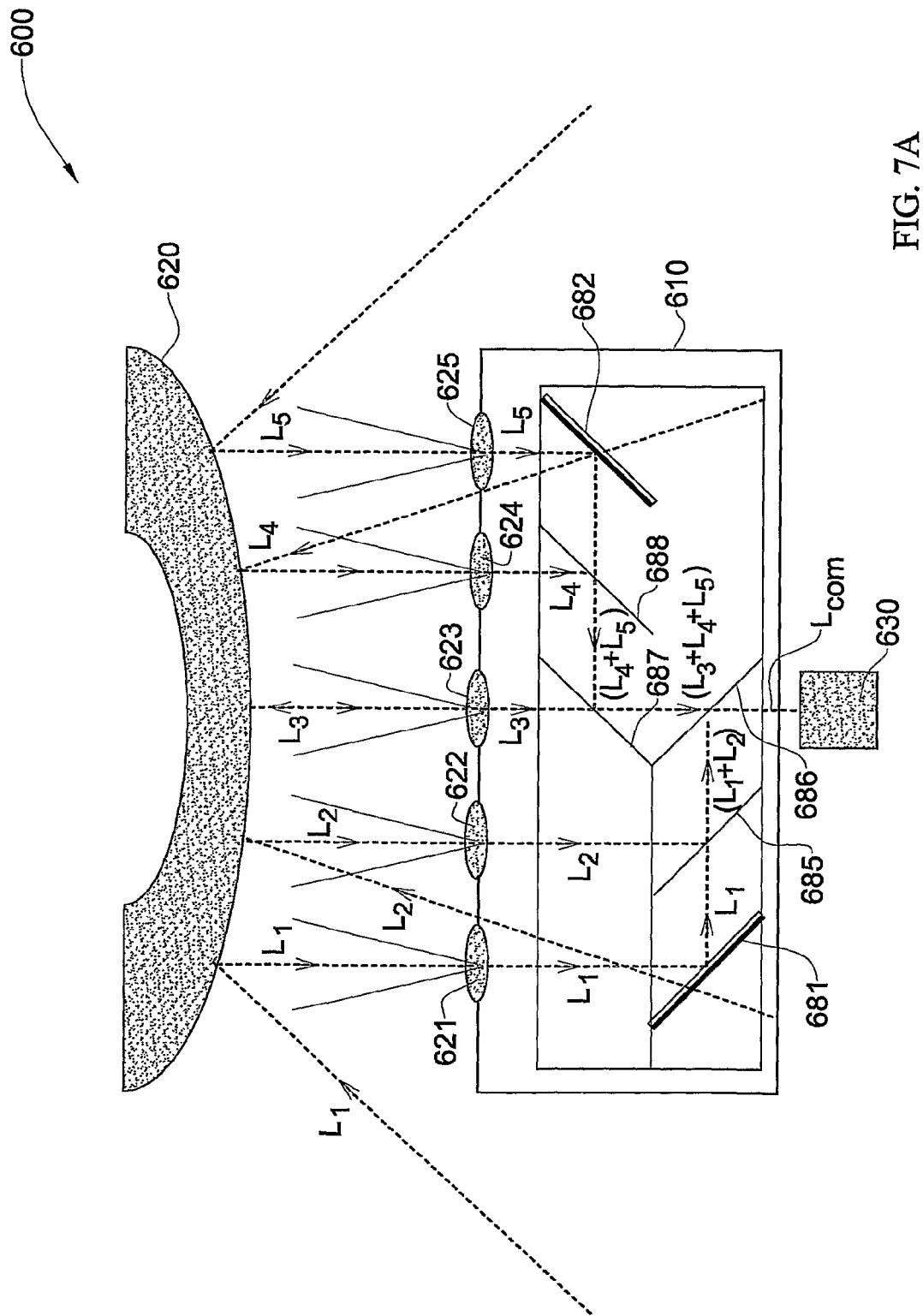
FIG. 7A shows an example of the optical system utilizing light collection from multiple zones by a common curved reflective surface and multiple substantially aligned lenses.

In the example of FIG. 7A, an optical system 600 is illustrated, comprising a light collection arrangement consisting of one parabolic mirror 620 and a plurality of light collection units (lenses) 621, 622, 623, 624 and 625. Further provided in system 600 is a combined light directing and light combining arrangement 680 including mirrors 681 and 682 and light combining elements 685, 686, 687 and 688. Light components coming from different zones of a field of regard impinge on different surface regions of the curved reflector 620 and are thus reflected by these regions to propagate along different optical paths. These light components are then collected by the units 621, 622, 623, 624 and 625 and propagate towards light directing and combining elements. The light propagation scheme is shown in the figure in a self-explanatory manner. The parabolic mirror (generally, curved reflecting surface) enables the optical system to cover a wide angular segment of the field of regard. It should be understood that the configuration may also be operable without the use of the curved reflector element 620, as such curved element is particularly useful in controlling the degree of spreading the FOV coverage of the adjoining FOVs.

Figure 7B:
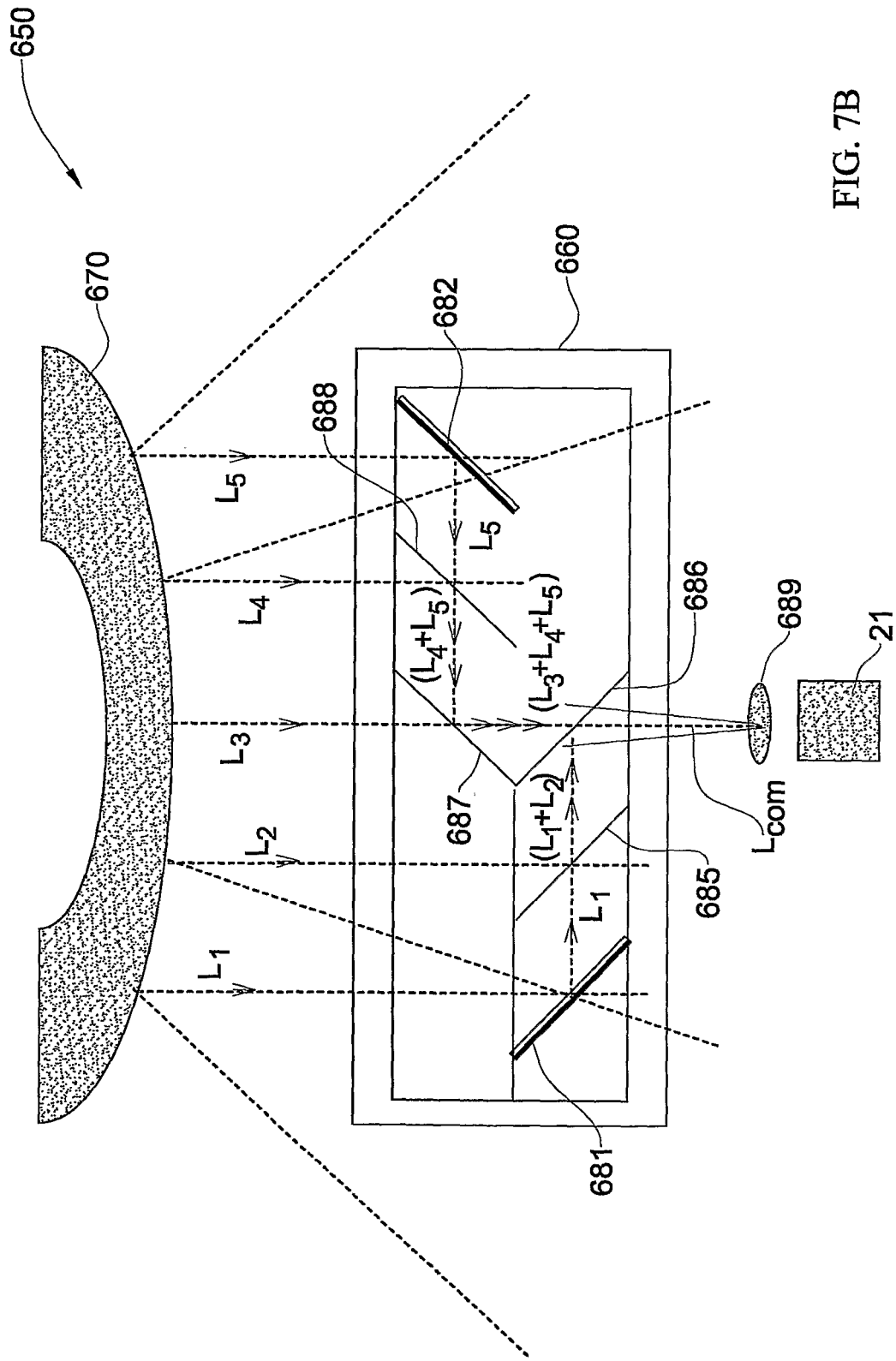
FIG. 7B shows an example of the optical system utilizing light collection from multiple zones by a common curved reflective surface reflecting the light component towards further light deflectors that combine them into a combined light beam, which is focused onto a light detector.

FIG. 7B shows an optical system 650, in which the light collection arrangement is constituted by a single curved reflector (parabolic mirror) 670. Light components $L_1$-$L_5$ are reflected from different surface regions of the reflector 670 towards appropriately accommodated light directing and combining elements, including mirrors 681, 682, and semi-transparent mirrors 685, 686, 687, 688. As shown in the figure in a self-explanatory manner, a final combined light beam $L_{com}$ is produced and is then focused by lens 689 onto a light detector 680. It should be understood that the configuration may also be operable without the use of the curved reflector element 670, as such curved element is particularly useful in controlling the degree of spreading the FOV coverage of the adjoining FOVs.

In the above examples of the invention, change detection solutions in a large field of regard were shown using a single light detector producing a combined image data. It should be understood that it might not be possible to determine the actual azimuth-elevation of the changing object in the field of regard because it may occur in any of the superimposed FOVs. In applications which require accurate determination of the location of the object that has generated the change in the combined image, it is possible, for example, to add another detector which covers the entire field of regard, albeit at a lower resolution, or which presents separate images of each of the FOVs (zones) either concurrently or sequentially thus at the same high resolution (or even higher) as that of the combined image. These examples will now be described with reference to FIGS. 8 and 9.

Figure 8:
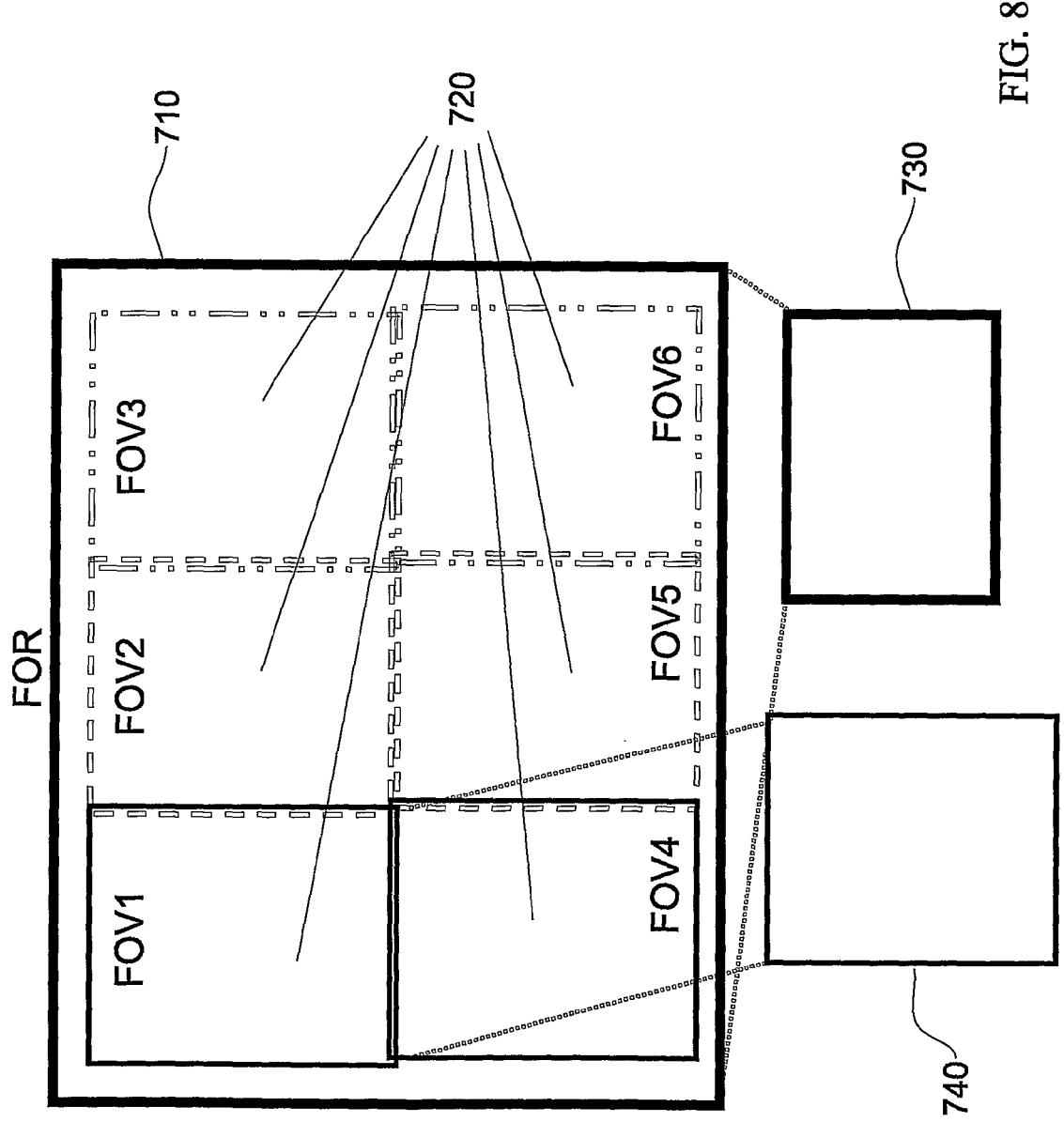
FIG. 8 exemplifies the technique of the present invention for independently imaging, onto two light detectors, the field of regard by combining light components collected from different zones thereof with a lower numerical aperture (higher resolution), and the entire field of regard with a higher numerical aperture of light collection (lower resolution)

FIG. 8 illustrates a method for observation of a given field of regard 710 formed by six zones (FOVs), and a light detection unit including two light detectors (two light sensitive surfaces) 730 and 740. This method allows determining one or more zones where certain condition/event (or effect) occurred within the field of regard. The field of regard 710 is observed by overlapping fields of view $FOV_1$, $FOV_2$, $FOV_3$, $FOV_4$, $FOV_5$, and $FOV_6$, associated with said six zones. The entire field of regard may first be examined by using a combined image data (as described above), and if needed by further observing each of the six zones sequentially (e.g. using the suitable optical system as described above, e.g. formed by two- or more parts located one on top of the other) on the light sensitive surface 740. Then, the entire field of regard can be imaged (using an additional optical system) with a certain numerical aperture of light collection (higher than that of the combined image) onto the entire light sensitive surface 730, with a resolution lower than that of each one of its zones.

Figure 9:
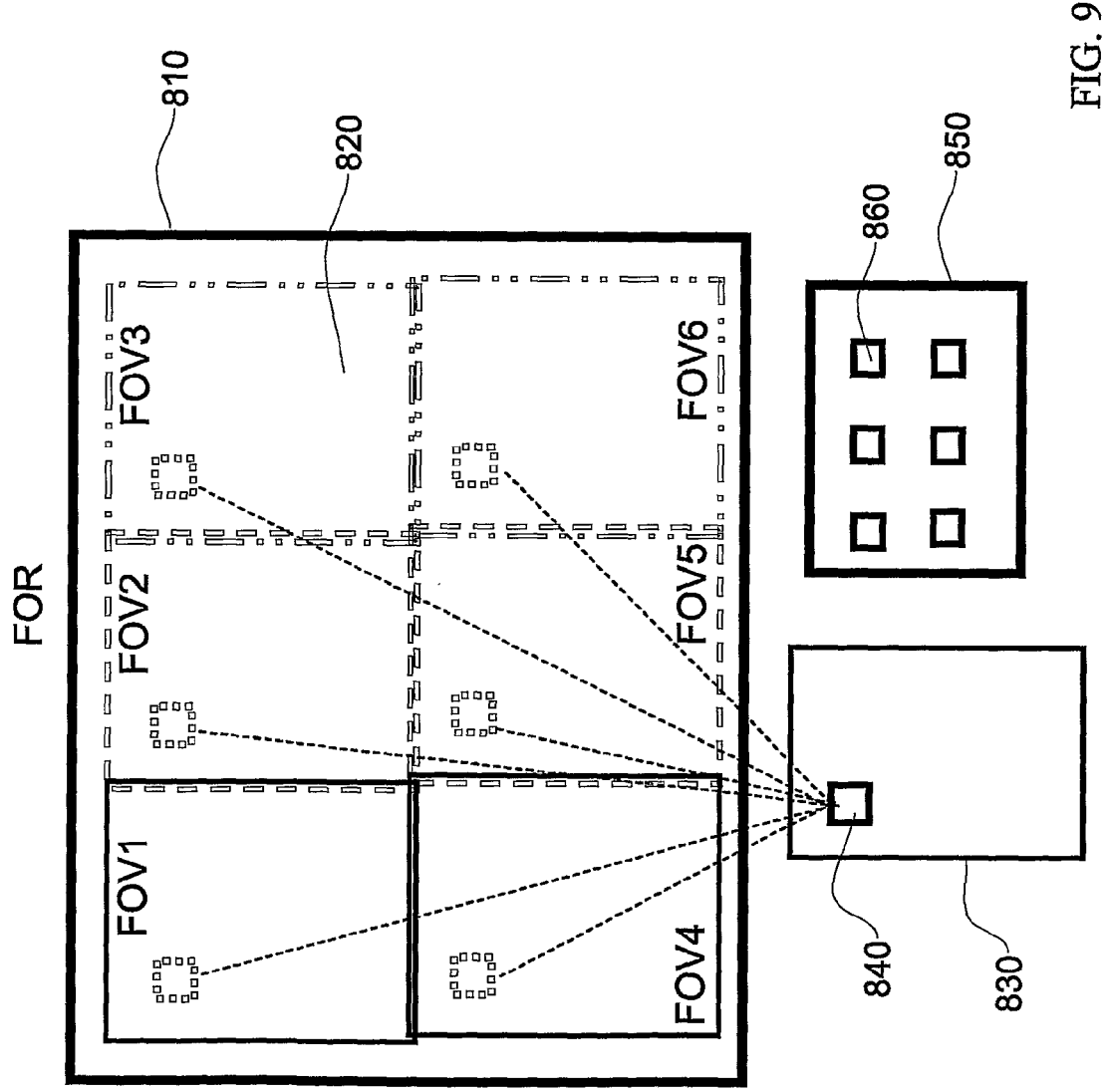
FIG. 9 exemplifies the technique of the present invention for concurrently imaging the field of regard by combining light components collected from different zones thereof, and if desired imaging the different zones separately.

FIG. 9 illustrates a process which uses the configuration in FIG. 8, whereby an automated detection process is applied to the combined image 830, for detecting localized events 840 in the combined image 830, and further associating them with localized windows which are subsequently opened and further processed for detection in the single field of regard image 850. In this example, all the light components are preferably collected by lens units having the same focal distance and the light sensitive surface is located in the focal planes of these lens units. If processing of the combined image data detects a certain condition/event and detects its location 840 within the combined image (e.g. left top corner within the FOV), another optical system 850 is operated to provide a single field of regard image (i.e. with a certain numerical aperture larger than that of the separate FOVs collection) whereby the detection processing is operable specifically in respective localized windows so as to determine where in the field of regard the event actually took place.

Thus, the combined field of regard image is used for detection of small objects or changes in localized areas 840 that are best detected using a relatively small FOV. As such detection does not provide the location of the object in the field of regard (e.g. it may have occurred in any of the respective locations 845 in the multiple FOVs 820), the single field of regard image 850 can be used for detection of larger objects or changes that may be or are best detected using a relatively large FOV. Small objects may not be detectable due to relatively large FOV and subsequently low resolution. When detecting small objects or changes by the combined field of regard image 840, respective localized windows 860 may be opened in the single field of regard image 850 so as to provide an improved localized detection capability in the single field of regard image, thereby providing a reconfirmation of the combined filed of regard detection and particularly the accurate location of the object or change in the single field of regard image. The ability to apply detection algorithms in designated localized windows of the single field of regard image improves the sensitivity of the detection process in the single field of regard image when contending with small and dim objects or changes in the field of regard. The above requires a geometric mapping from each pixel in the combined field of regard image to respective pixels in the multiple FOVs forming said combined field of regard image.

The use of both the combined field of regard and the single field of regard images provides for a field of regard coverage utilizing a gimbaled narrow field of view imager which may be slewed to the respective suspect localized windows 860 based on suspect detection based on the combined field of regard image, in a dynamical and sequential manner thereby providing a visual verification and detection provision with smaller FOV as compared to that of the combined field of regard.

Also, the use of both the combined field of regard and the single field of regard images provides for a field of regard coverage utilizing shutters/switches enabling observation of each FOV separately over time.

As indicated above, the light collection arrangement may be configured to image at least one of the multiple zones with an additional, lower numerical aperture. In other words, at least one of the light collecting units of the light collection arrangement may be configured to collect light from the entire zone and from a part thereof with, respectively, higher (wide FOV) and lower (narrow FOV) numerical apertures of light collection. For example, the optical system may operate as a target acquisition system comprising a rapid scanning of the field of regard with higher numerical aperture of light collection (wide FOV), followed by suspected detection processing of such images, and thereby slewing the narrow FOV imager to designated suspect azimuth and elevation coordinates for further investigation, acquiring said designated objects in a sequential manner and applying classification processing to each, and finally returning to the rapid wide FOV scanning mode. This can be implemented using a single imaging detector for sequentially acquiring the wide FOV and narrow FOV images and scanning using a minimal set of optical switching and scanning elements, whereby the rapid wide FOV scanning can be achieved using, for example, scanning solutions such as mirrors or turrets of dimensions which are suited for respective scanning rates and aperture dimensions which are determined, for example, by the nature and requirements of the given application. For example, the wide FOV scanning may be characterized by high rate scanning angular rates and large angular coverage while requiring only a relatively small optical aperture thereby resulting in relatively small scanner dimensions, while the narrow FOV slewing may require larger apertures albeit at significantly lower slew rates. Moreover, the invention provides for a rapid switching solution between the wide FOV and narrow FOV modes, thereby providing a minimal time loss in terms of field of regard coverage.

Reference is made to FIGS. 10A-10C showing schematically the principles of this aspect of the invention. As shown in FIG. 10A, an optical system 10 includes a light collection arrangement 14 and a detector 21. The light collection arrangement configured to selectively operate in a first light collection mode 14A to collect light from the entire zone or wide FOV (WFOV) with a relatively high numerical aperture of light collection, and in a second light collection mode 14B to collect light from a part of said zone or narrow FOV (NFOV) with a relatively low numerical aperture of light collection. The optical system is configured to selectively project the wide FOV or narrow FOV image onto the same detector 21. Sequential imaging of the entire zone with the light collection mode 14A and a part of the zone with the light collection mode 14B onto the same detector (i.e. with the same image resolution) can be achieved using a single optical setup (or single optical path configuration) with an internal FOV changing mechanism (FIG. 10B) or using a two-lens or two-optical path configuration whereby the respective lens and optical path is selected by an optical switch element which is positioned between the lenses and the detector (FIG. 10C).

Figure 10D:
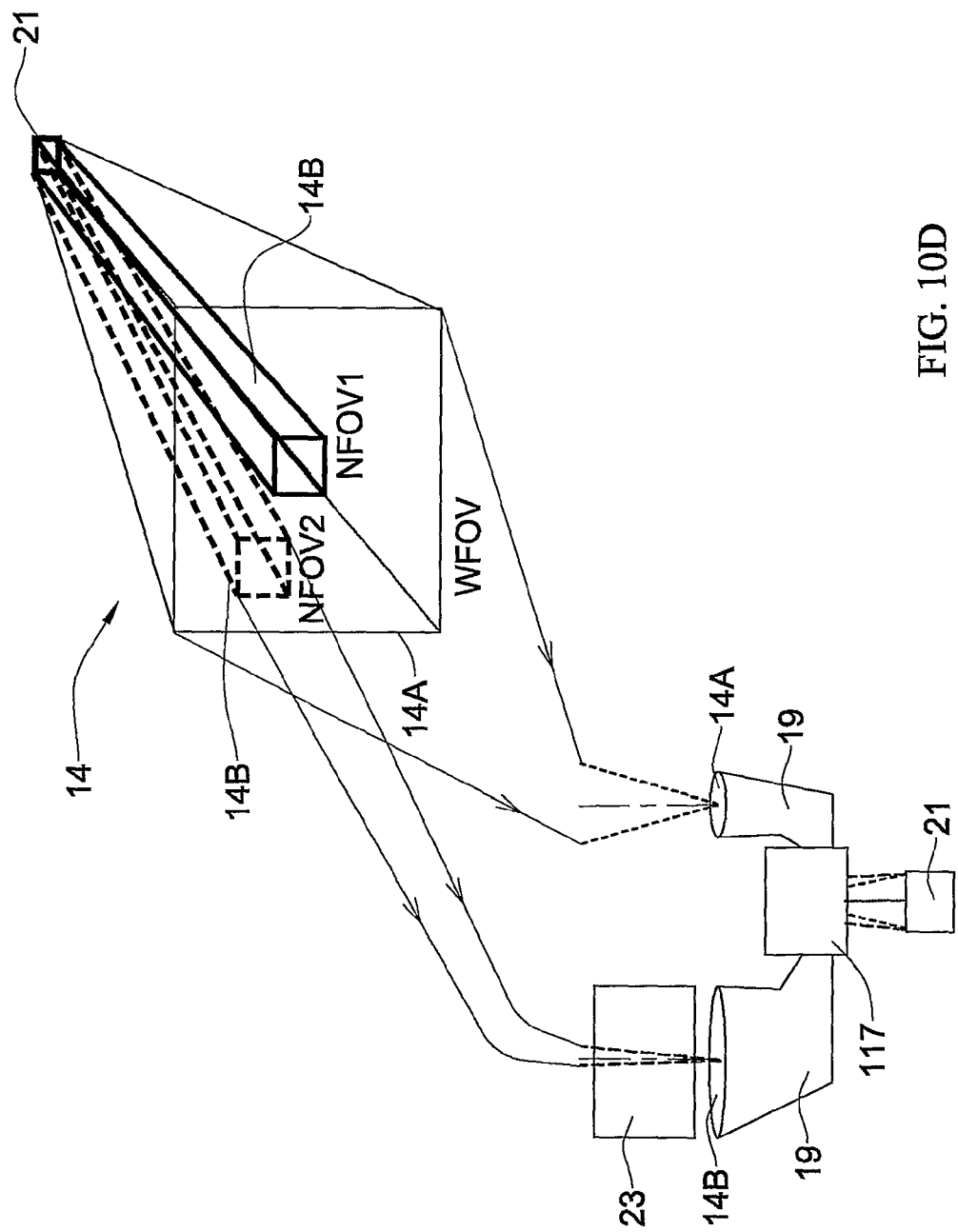
FIG. 10D is an example of the optical system of FIGS. 10A-10C further configured for narrow FOV scanning within said wide FOV.

FIG. 10D exemplifies the optical setup configured and operable to provide wide FOV and narrow FOV imaging using the same detector, where the narrow FOV is moved (scanned) within the wide FOV coverage area (zone). Such optical setup includes a light collecting unit 14 including two lens units 14A and 14B arranged for respectively high and low numerical aperture collection of light from a certain zone, light directing arrangement 19, beam splitting/combining arrangement 117, and a light detector 21. Also provided in this optical setup is a scanning mechanism 23 positioned in the front of the narrow FOV lens unit 14B. The lens unit and respective optical path from which light is to be directed to the detector may be selected by appropriately switching the beams splitter/combiner.

Figure 10E:
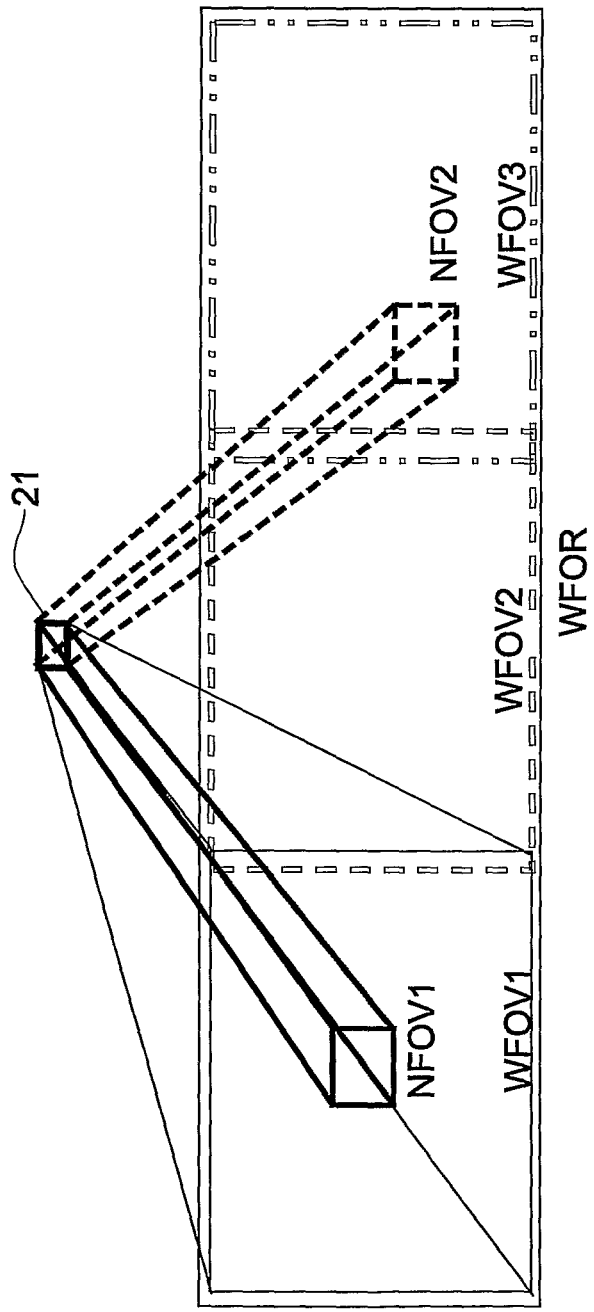
FIG. 10E is an example of the optical system of FIGS. 10A-10C further configured for both narrow FOV scanning and wide FOV scanning of the field of regard.
Figure 10E:
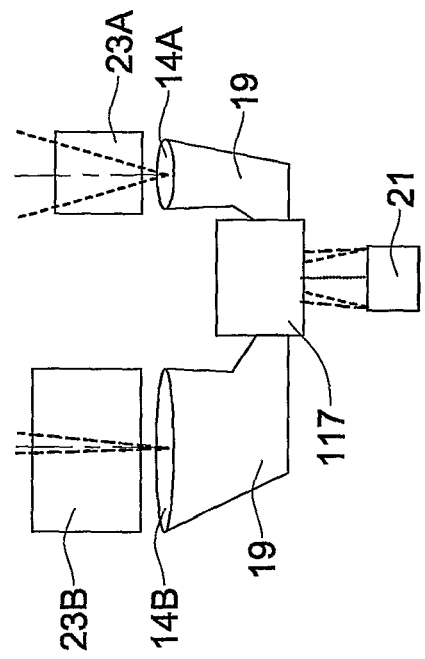

FIG. 10E shows a similar optical setup which is distinguished from that described above with reference to FIG. 10D in that here both the wide FOV and the narrow FOV are scanned to provide a wide field of regard. To this end, two scanning mechanisms 23A and 23B are provided being positioned in the front of the respective lens units 14A and 14B.

Figure 11A:
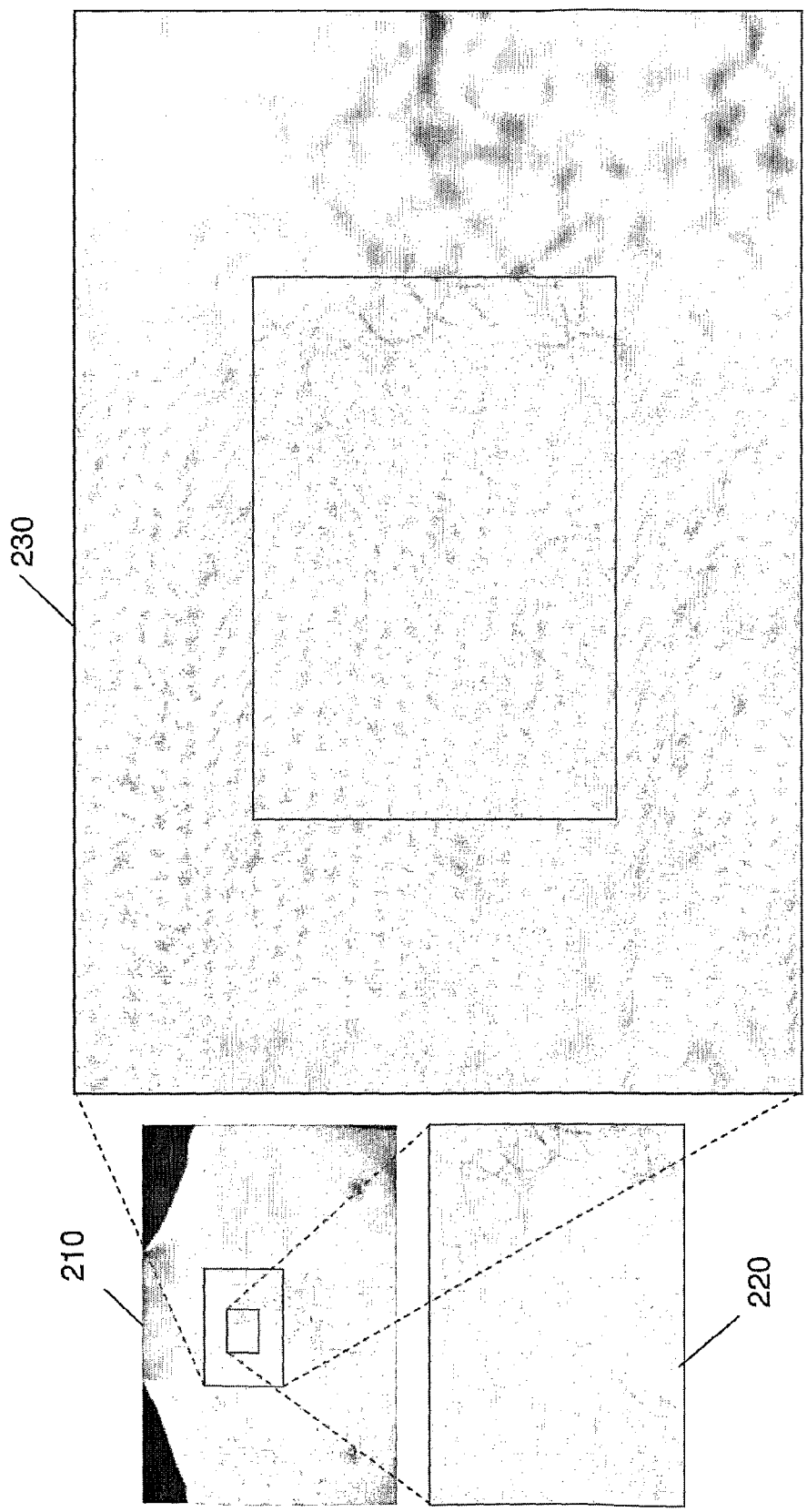
FIG. 11A shows experimental results obtainable with the system of the present invention for monitoring a body part (human male chest) while imaging it with wide FOV and displaying the image data via interpolation, and a narrow FOV investigation of a suspected lesion being displayed concurrently in the respective geometrical location.

FIG. 11A illustrates how the present invention is used in a medical application. Here, a human male chest is imaged by a wide FOV imager and displayed via interpolation, and a narrow FOV investigation of a suspected lesion is displayed concurrently in the respective geometrical location. A wide FOV image 210 covers the entire chest area (constituting a zone or a field of regard) at a low resolution which is sufficient to localize suspect lesions and irregularities, and a narrow FOV image 220 is the image of the suspected lesion. Image 230 combines these two images on a display, whereby the wide FOV image data is digitally interpolated in accordance with the magnification ratio between the narrow FOV and the wide FOV, and the narrow FOV image is correctly positioned in the wide FOV interpolated image. This enables the observer to maintain situational awareness of the wide FOV while observing the details of the narrow FOV image, simultaneously.

Figure 11B:
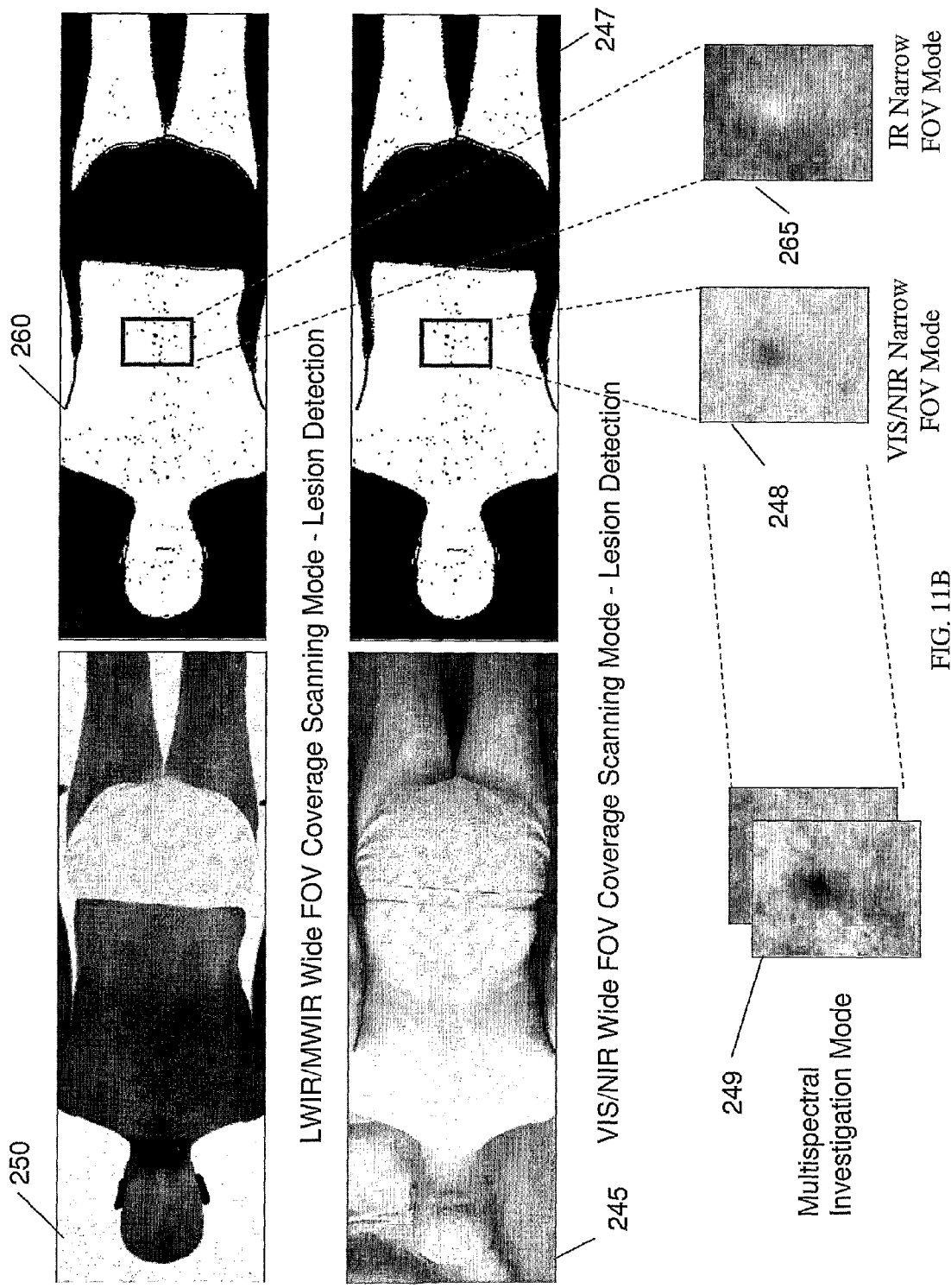
FIG. 11B exemplifies the use of the system of the present invention in a whole body medical scanning and imaging application, including a wide FOV scanning and a narrow FOV investigation, using multiple spectral bands.
Figure 11C:
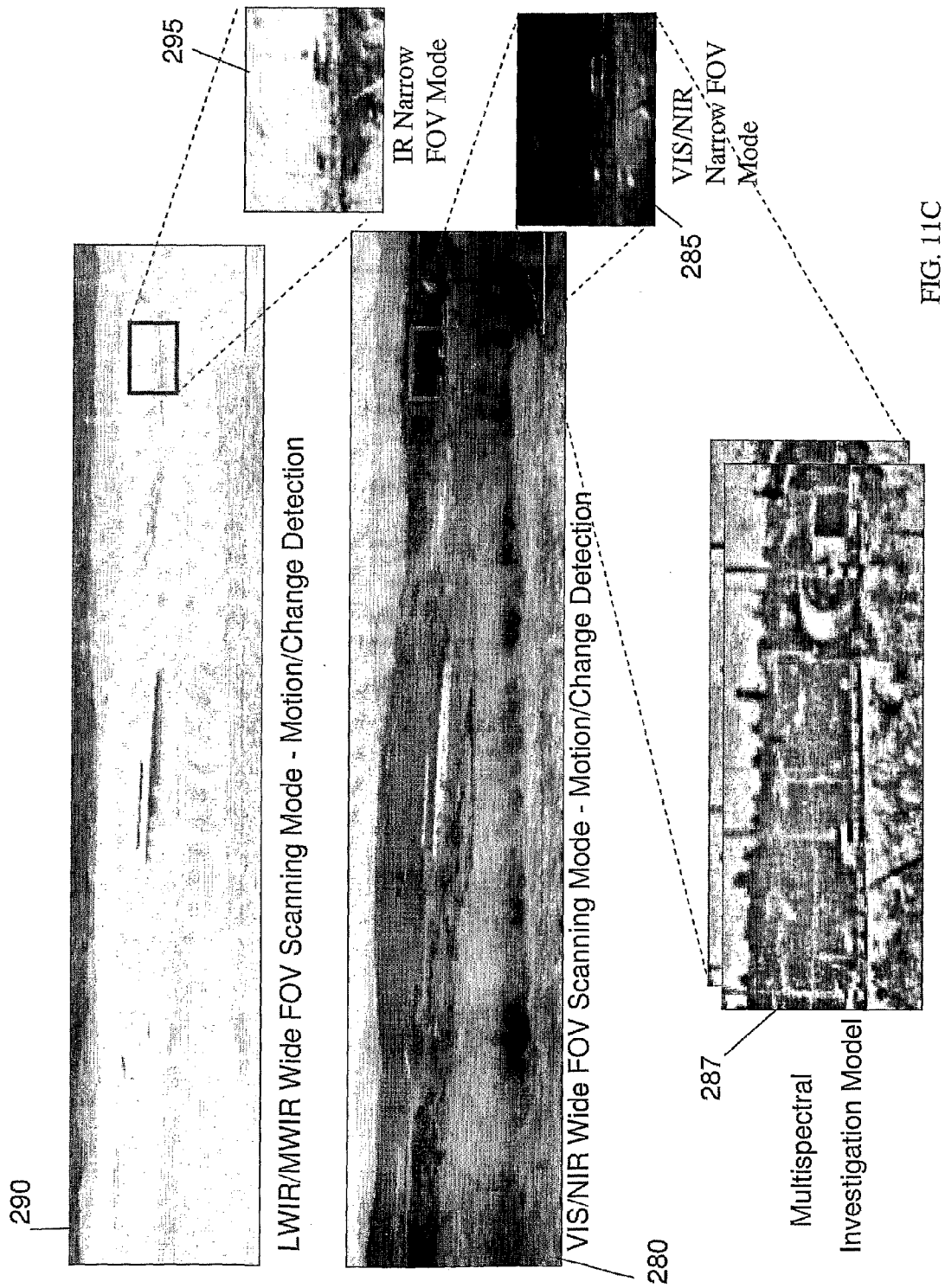
FIG. 11C is a pictorial description depicting a security surveillance application, including a wide FOV scanning and a narrow FOV investigation.

FIGS. 11B and 11C exemplify the use of the technique of the present invention for respectively the whole body medical scanning and imaging application and a security surveillance application, including a wide FOV scanning and a narrow FOV investigation.

In medical imaging, such as whole body scanning for screening of skin cancer (melanoma), there is a need for broad area coverage in low resolution for preliminary detection of suspected candidates of cancerous lesions and moles, followed by precise, high resolution magnified investigative imaging for the classification of such suspected detections. Either one or both stages may be achieved by using more than one spectral band, such as for example, visible band (VIS), near IR (NIR), short wave IR (SWIM, mid wave IR (MWIR) and long wave IR (LWIR). Such bands may also be split into smaller sub-bands for improved results, especially if the spectral signatures of the malignant lesions are known in advance. Such a case may include the patient positioned supine on a bed whereby the system is positioned above him, hence providing a rapid wide FOV scanning and narrow FOV investigation for detection and classification of suspect lesions and moles. Additional similar cases may be in a) surgery situations where there may be a relatively large area under surgery and some localized regions of clinical interest requiring considerably higher resolution for surveillance, and b) gastroenterology applications where mucosal tissue irregularities are first detected in lower resolution over a large field of view, and subsequently investigated locally using a higher resolution In security applications such as surveilling fences, borderlines, sea ports and rail roads, broad area coverage in low resolution is used for preliminary detection of suspected moving objects, followed by precise, high resolution magnified investigative imaging for the classification of such suspected detections. Either one or both stages may be achieved by using more than one spectral band, such as for example VIS, NIR, SWIR, MWIR and LWIR. Such bands may also be split into smaller sub-bands for improved results, especially if the spectral signatures of the objects are known in advance. Such a case may include the system positioned nearby a fence, borderline etc, thereby providing a rapid wide FOV scanning and narrow FOV investigation for detection and classification of suspect objects in the scene.

Another similar case may be in the surveillance and rapid assessment of environmental hazards such as explosion, fire, smoke and dust detection applications in large area forests, whereby broad area coverage in low resolution is used for preliminary detection of suspected areas, followed by precise, high resolution magnified investigative imaging for the classification of such environmental hazards.

As shown in FIG. 11B, image 245 in the VIS/NIR band (~0.5 um-1 um) and image 250 in the LWIR band (~8 um-12 um) are wide FOV scanned images of the entire zone (body part). The image of the entire body zone is processed for detecting suspect lesions (image 247 and 260) and a narrow FOV image (VIS/NIR image 248 and LWIR image 265) is directed to the area of interest for further investigation and analysis of the suspect lesion. The region of interest may also be investigated using multispectral mode (image 249).

In a similar manner, FIG. 11C shows similar wide FOV images 290 and 280 of the same zone obtained using different wavelength ranges, e.g. in the VIS/NIR band (~0.5 um-1 um) and the MWIR band (~3 um-5 um), and respective narrow FOV investigative images 295 and 285, where the narrow FOV images of a region of interest were obtained while scanning said zone using respectively MWIR and VIS/NIR wavelengths. Also, the so detected region of interest was observed with multi-spectral investigation mode (images 287).

Figure 12A:
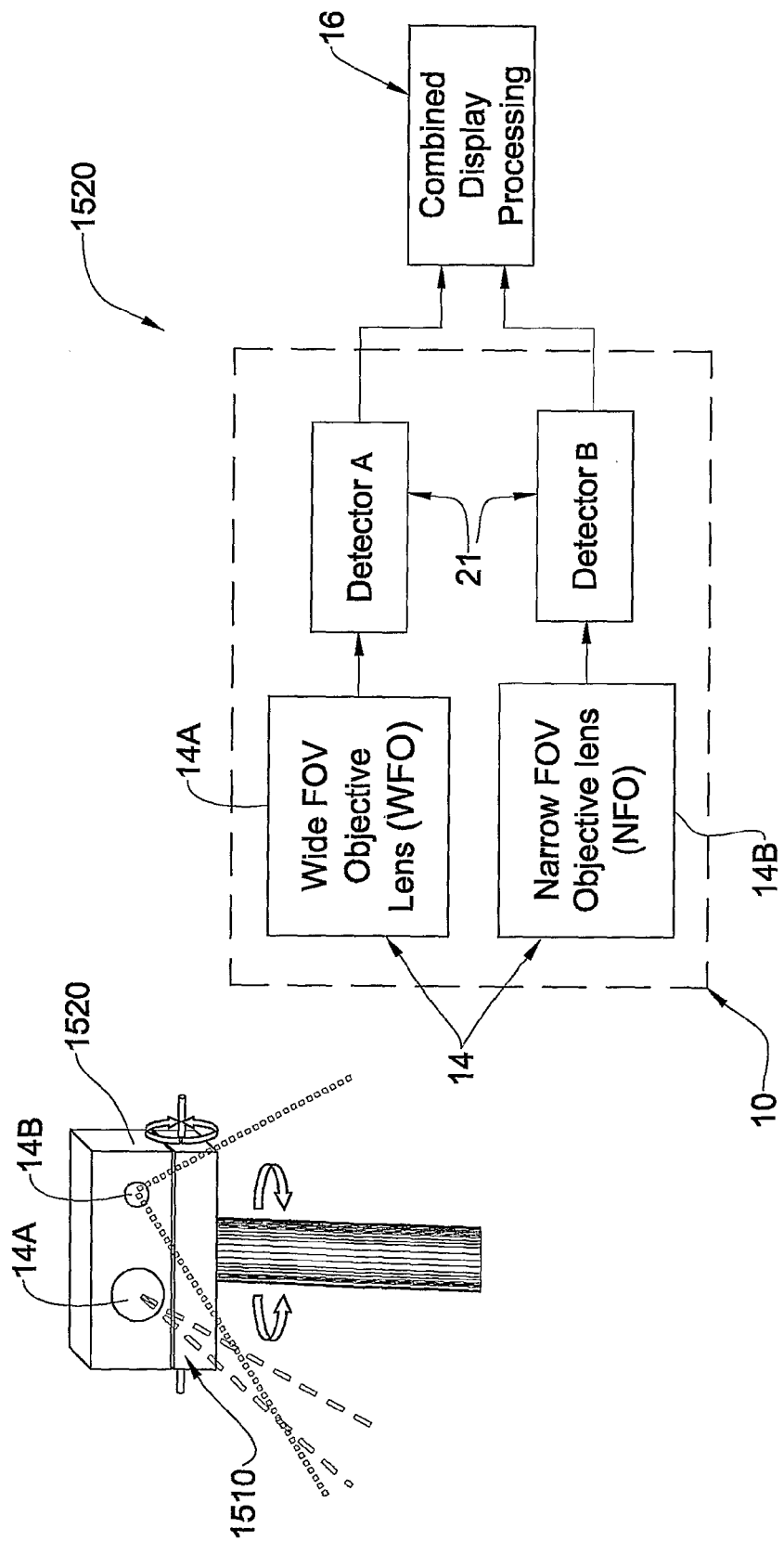
FIG. 12A is a block diagram of an example of the system of the present invention utilizing wide FOV and narrow FOV imaging while scanning a field of regard by wide FOV scan.

FIG. 12A illustrates, by way of a block diagram, a monitoring system 1520 including an optical system 10 and a control unit 16. The optical system 10 includes a light collection arrangement 14 and a detection unit 21. The light collection arrangement 14 includes wide FOV objective lens unit 14A collecting light with a relatively high numerical aperture and a narrow FOB objective lens unit 14B collecting light with a relative low numerical aperture. The detection unit 21 includes two light sensors A and B associated with lens units 14A and 14B respectively. The output of light sensors A and B are connectable to the control unit 16 to undergo combined display processing. As also shown in the figure, such monitoring system 1520 may be arranged as an imaging module mounted on a rotatable platform module 1510, thus enabling to scan a field of regard.

Figure 12B:
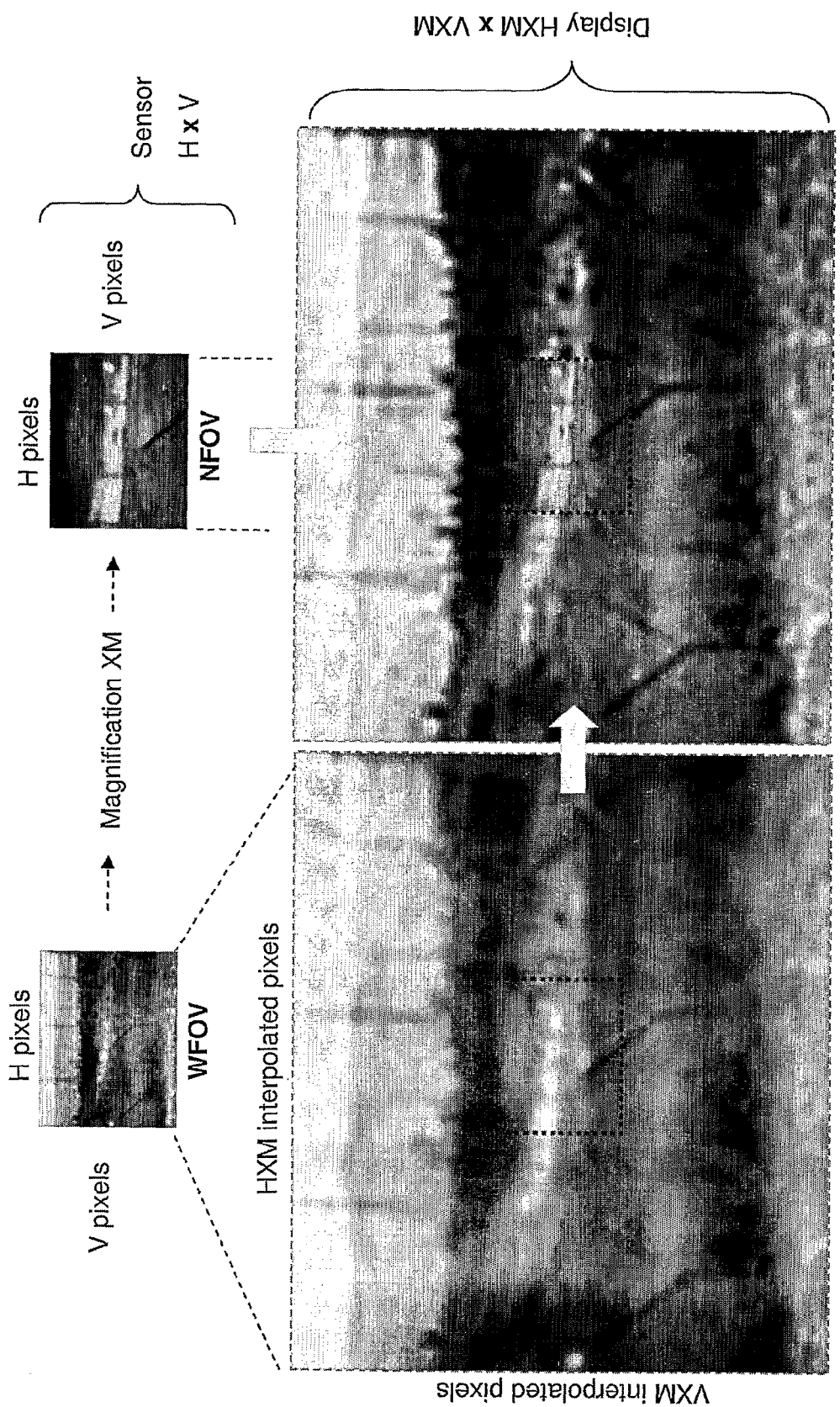
FIG. 12B shows experimental results of using the system of FIG. 12A.

Such multi FOV real time synchronous fusion approach combines the two images, as shown in FIG. 12B. The staring detectors comprise, for example, H×V pixels (H=horizontal, V=vertical), and the magnification factor between the WFOV and the NFOV is given by M. In one embodiment, image information from the two, preferably exposure synchronized imagers, having the same amount of pixels, is combined, where the image display comprises sufficient resolution (amount of pixels), and where the WFOV is enlarged via digital interpolation by a factor of M and displayed in the periphery of the display, and the NFOV is displayed in the central (foveal) part of the display. For example, for a display having 1024×800 pixels, a WFOV 2D detector having 256×200 pixels would be interpolated by a factor of M, and the center part of the interpolated image would be overwritten by the NFOV image at full resolution. Alternatively, the amount of pixels of the two imagers may be different, and the dimensional ratio of the NFOV to WFOV in the display may differ from the M factor.

Figure 13:
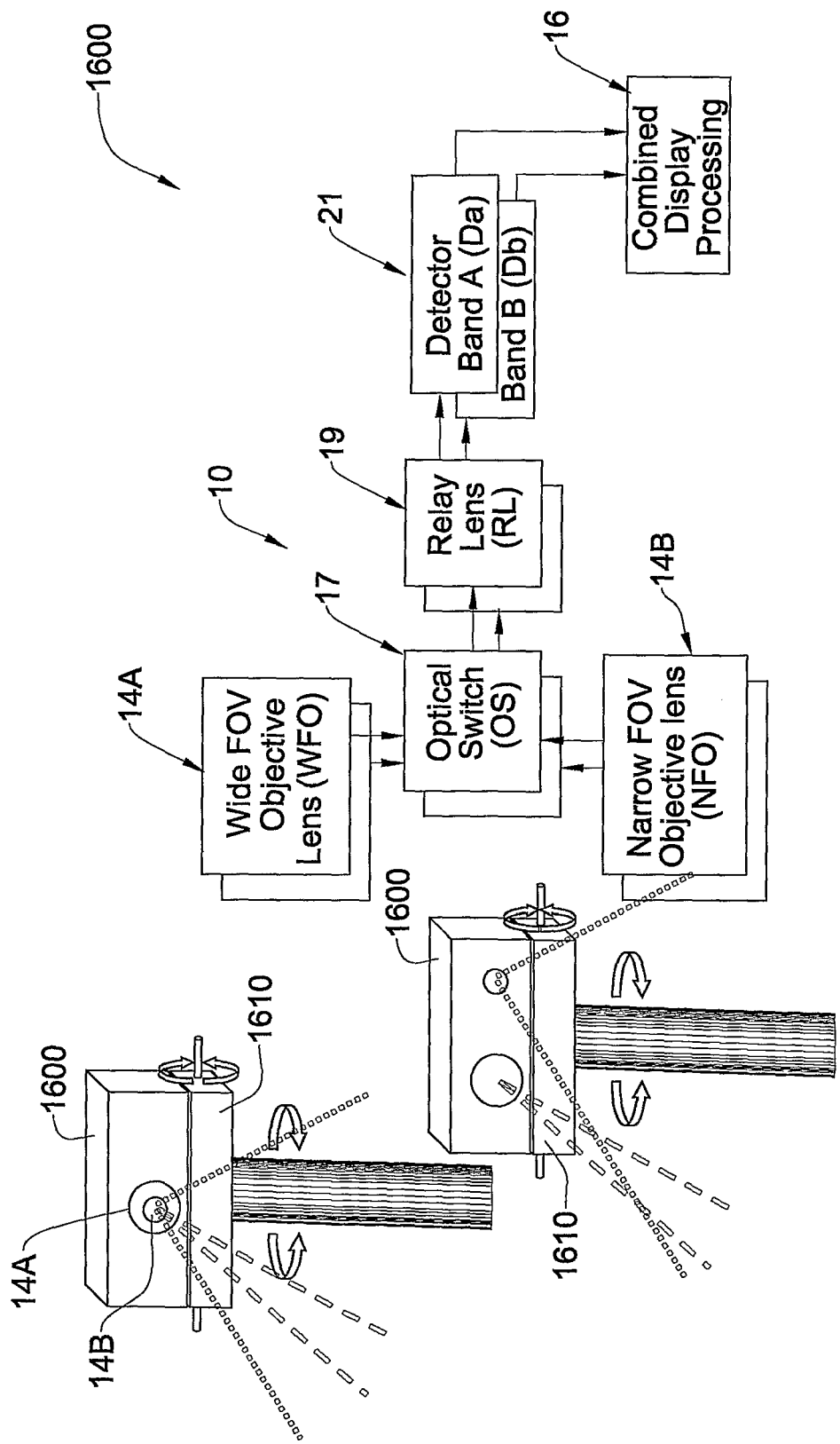
FIG. 13 is a block diagram of an example of the system of the present invention comprising one or more pairs of wide FOV and narrow FOV light collection units, each pair being associated with a common imaging detector for image acquisition with the same wavelength range.

FIG. 13 shows a specific but not limiting example of a monitoring system 1600 of the present invention including an optical system formed by two combined or separate, preferably boresighted, light collecting units 14A (wide FOV) and 14B (narrow FOV), optical switch arrangement 17 including two switches, a multi spectral light detection unit 21 and light directing arrangement 19 including a relay lens unit in front of the detection unit. The detection unit 21 includes two detectors (with their associated relay lenses 19, respectively). The respective wide FOV and narrow FOV images are temporally switched and projected onto the single detector by the optical switch, and the temporally switched multi-FOV images are digitally processed by a combined display processor onto a single display, for example in the manner described above with reference to FIG. 12B, but in a sequential manner rather than in a synchronized manner. The configuration may also be implemented in multiple spectral bands (including detector $D_a$ and detector $D_b$). As shown in the figure, the optical system 1600 may be mounted on a rotatable platform 1610, where the lens units 14A and 14B may be combined or be separate spaced-apart units.

Figure 14A:
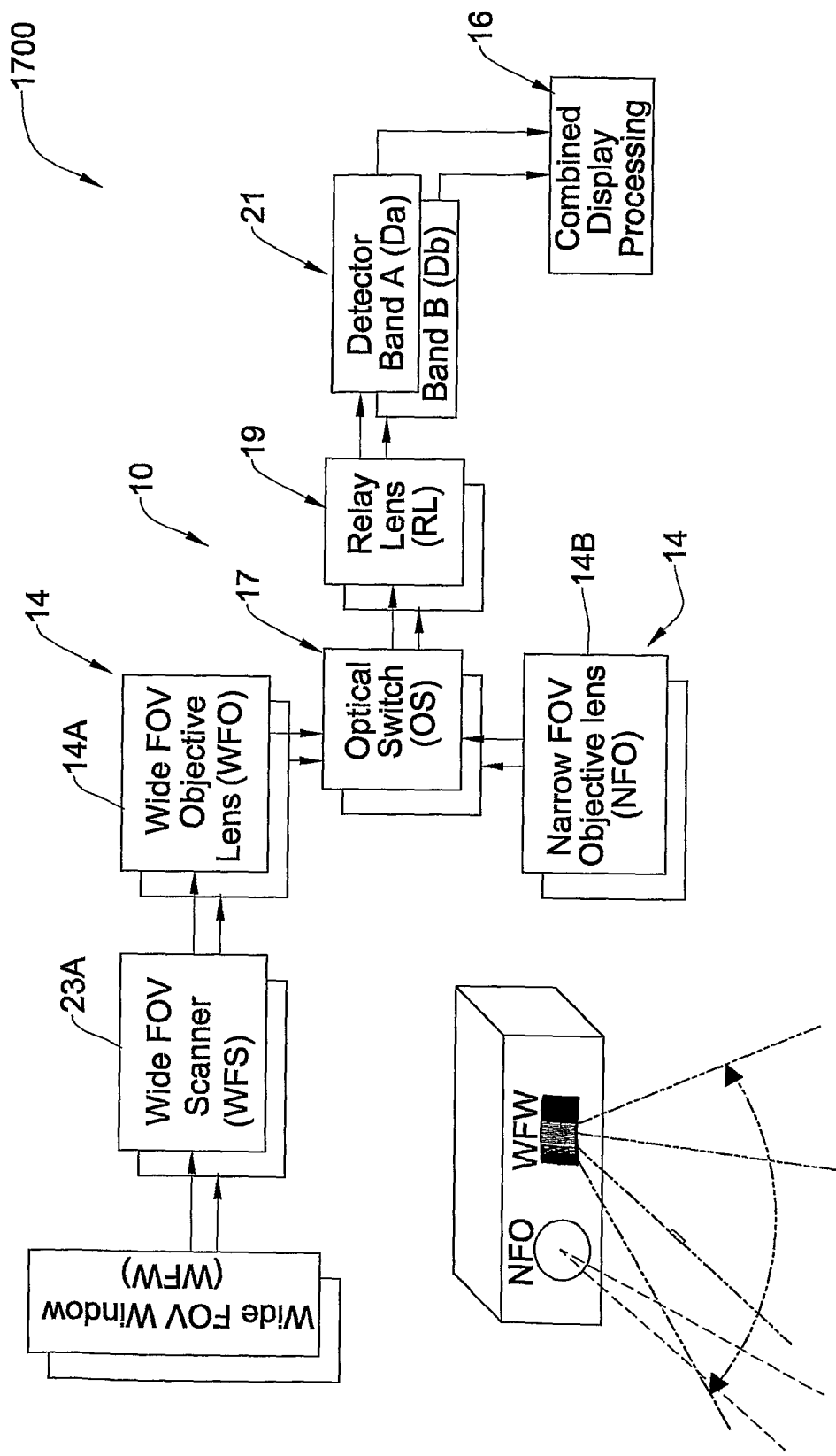
FIG. 14A is a block diagram of an example of the system of the present invention comprising two separate wide FOV and narrow FOV light collection units and a wide FOV scanning mechanism.

FIG. 14A exemplifies a monitoring system 1700 which is configured generally similar to the above-described system 1600 but includes also a scanning mechanism 23A associated with a wide FOV collection unit 14A. The optical switch 19 temporally switches discretely between the two FOVs, and the wide FOV scanner is operated (in slew or skip mode), thereby resulting in a wide field of regard. The switching action of the optical switch 19 provides rapid switching between such wide FOV and/or wide filed of regard and the narrow FOV, and rapid combinations thereof. Narrow FOV object investigation is achieved by slewing the whole unit.

Figure 14B:
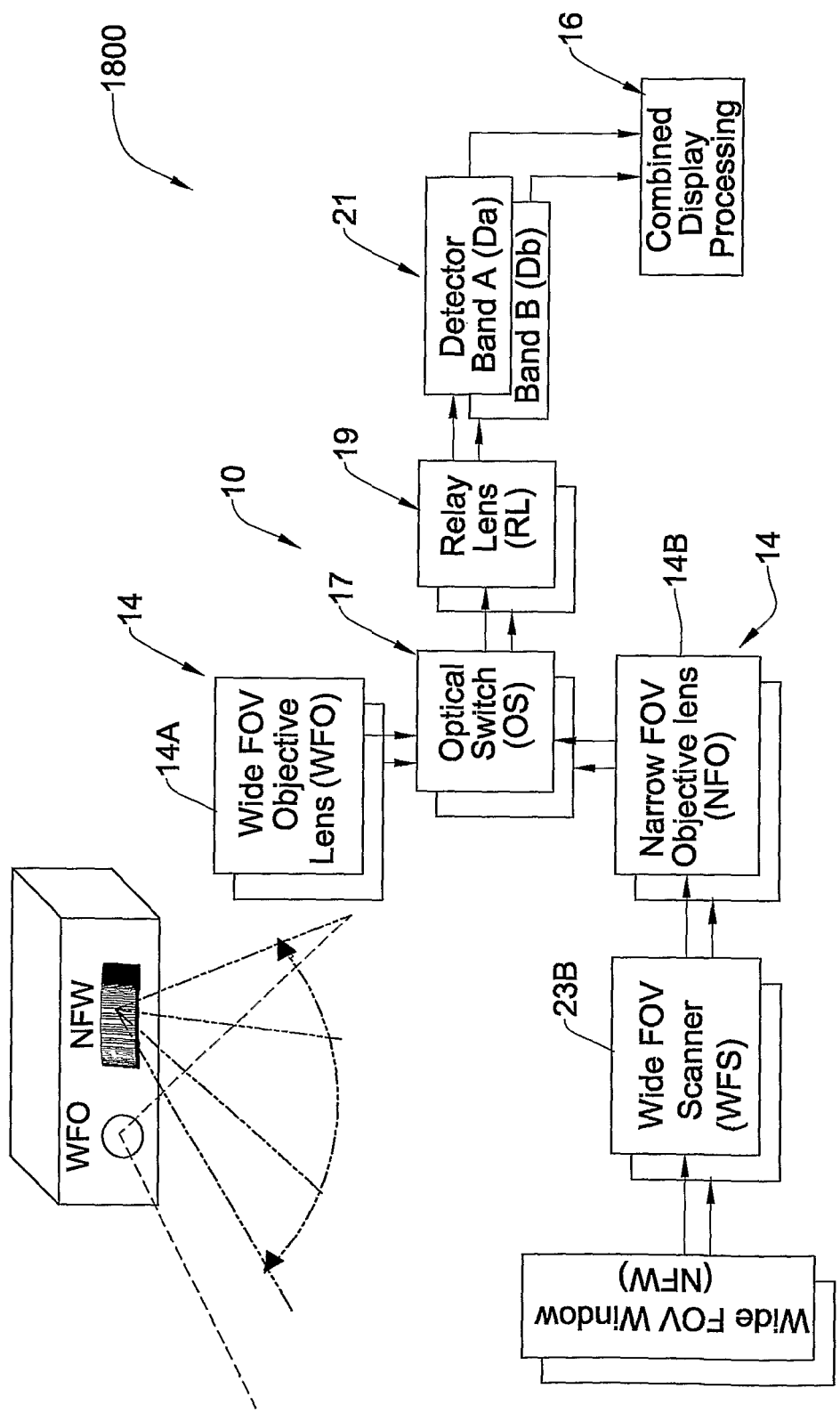
FIG. 14B is a block diagram of an example of the system of the present invention comprising two separate wide FOV and narrow FOV light collection units and narrow FOVs scanning mechanism.
Figure 14C:
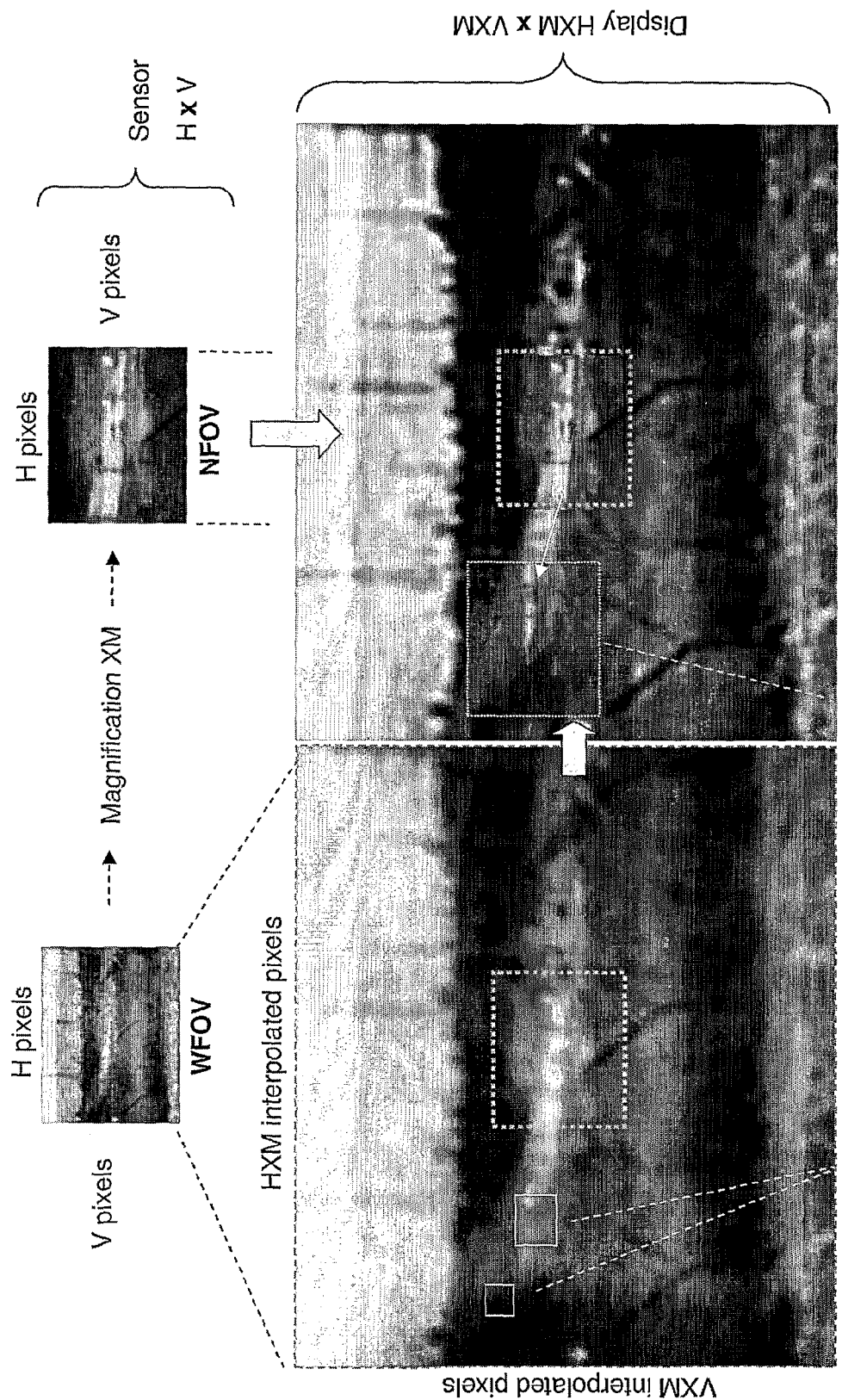
FIG. 14C shows experimental results of the operation of the system of FIG. 13.

FIG. 14B illustrates a monitoring system 1800, which distinguishes from the above-described system in that it includes a scanning mechanism associated with a narrow FOV lens unit 14B. The switching action of the optical switch 17 provides rapid switching between wide FOV the narrow FOV, and rapid combinations thereof. Narrow FOV object investigation is achieved by slewing the narrow FOV rather than slewing the entire system. This is further exemplified in FIG. 14C in a manner similar to the above-described FIG. 12B, but where the narrow FOV image can be moved and superimposed within the wide FOV image.

Figure 15:
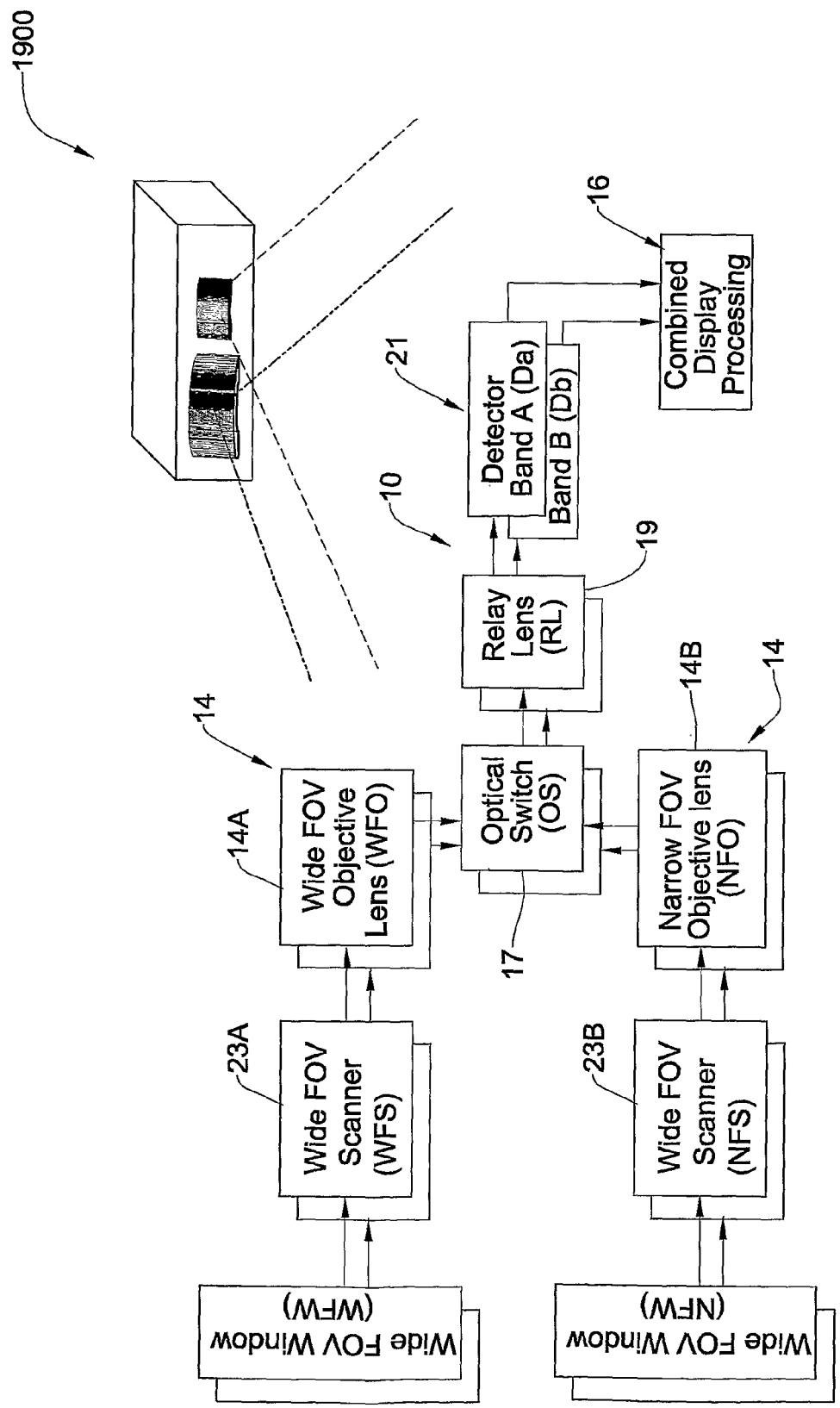
FIG. 15 is a block diagram of an example of the system of the present invention comprising two separate wide FOV and narrow FOV light collection units and wide and narrow FOVs scanning mechanisms.

FIG. 15 exemplifies a monitoring system 1900, which is different from the above two examples in that here two scanning mechanisms are provided 23A and 23B associated with respectively a wide FOV light collecting unit 14A and a narrow FOV light collecting unit 14B. The detector, relay lens and optical switch elements are shared between the two FOVs light channels, whereby the optical switch temporally switches discretely between the two (wide and narrow) FOVs, the wide FOV, narrow FOV, wide FOV scanner, narrow FOV scanner, wide FOV window and narrow FOV window are separate for each FOV, and the wide FOV scanner and narrow FOV scanner can be operated (in slew or skip mode) independently such that wide FOV, narrow FOV, wide field of regard, narrow fields of regard images may be generated and combined rapidly as determined by the optical switch state.

Figure 16A:
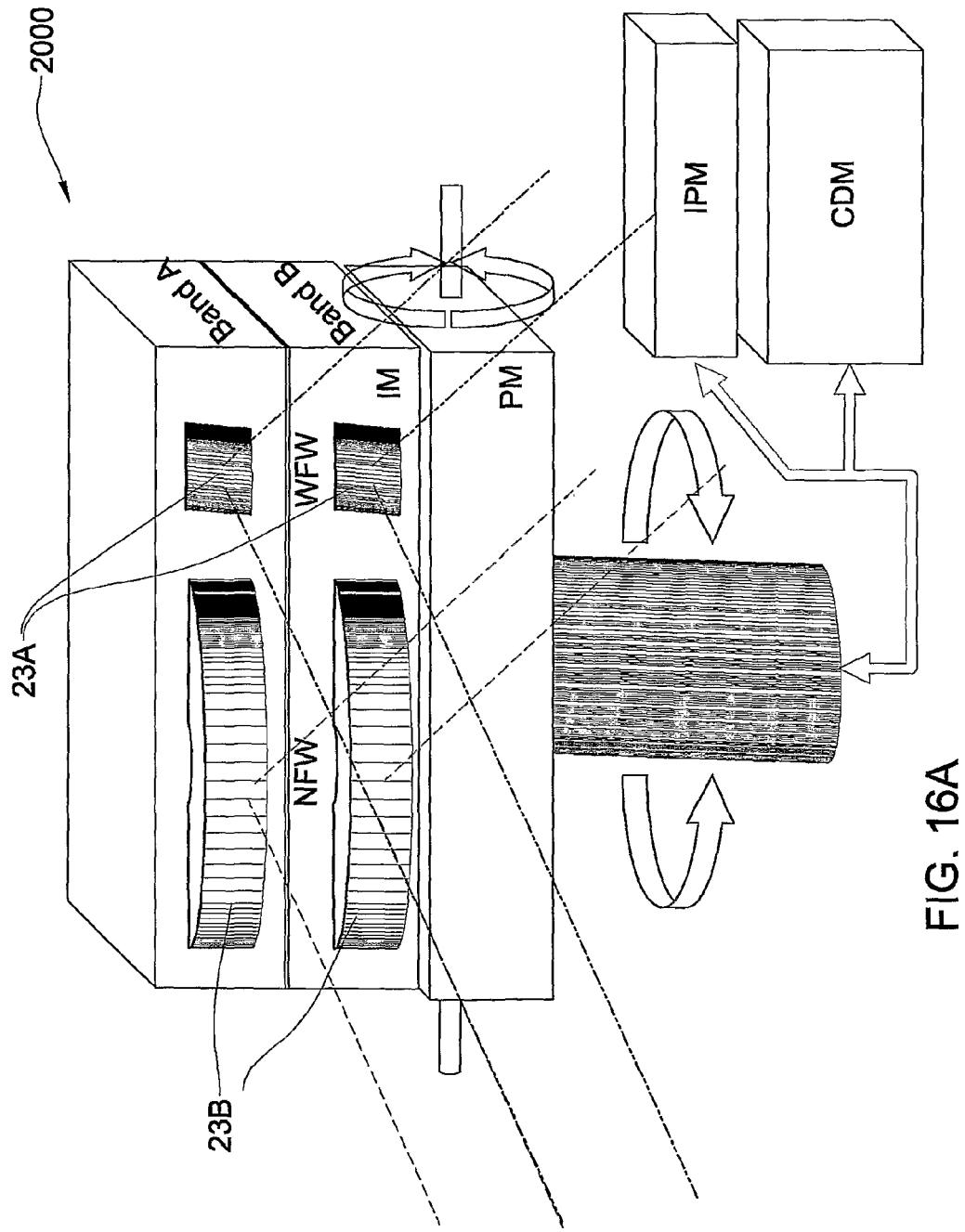
FIG. 16A exemplifies a stacked configuration of the system of FIG. 15.

FIG. 16A illustrates a monitoring system 2000 operable as a combined scanning and imaging system having a stacked configuration of imaging modules IMs (optical systems), a platform module PM, an image processing module IPM and a control and display module CDM. The stacked IMs are configured as optical system described above with reference to FIG. 15. The IMs are also designed for operation with different spectral bands, for example, one for the VIS/NIR band and the other for the MWIR or LWIR, depending on the specific application of interest. Moreover, in the stacked configuration, the stacking may be in the same azimuth direction, or in opposite azimuth directions, thereby doubling the angular azimuthal field of regard coverage capacity. Additional modular stacking may provide full panoramic coverage.

FIG. 16B describes a typical and exemplary system state transition matrix for applications where objects of interest are moving in a scene (field of regard). The state transition matrix describes the modes and states of the system. The system can operate in wide field imaging mode (WFIM), narrow field imaging mode (NFIM), wide field scan mode (WFSM), wide field track mode (WFTM), narrow field slew mode (NFSM), narrow field track mode (NFTM) and narrow field retarget mode (NFRM). Operation in WFIM and NFIM are selected, for example, by manual operator commands or transmitted commands from a central control station, thereby positioning the platform module PM in the respective position. A wide field scan command by the operator enters the system into the WFSM. In this mode, the wide FOV scanner is in operation and is scanning the field of regard using the wide FOV objective lens. In the wide field auto detect state, an auto detection processing algorithm is applied, for example based on motion detection and/or change detection in successive scans, object shape, object spectral signature etc, and upon such detection the system enters WFTM, whereby the object is tracked in the WFOV field of regard while still operating in the WFSM. In WFTM, the system enters into the wide field classify state, whereby the object is classified as an object of interest for further investigation by the NFOV, and the system enters the NFSM, whereby the NFOV is first slewed to the angular position of the object in question while the WFSM is still in operation, and only upon the narrow field objective lens line of sight being positioned in the estimated angular position of the object, the PM element is switched momentarily for the narrow field image capture for investigation, and subsequently the system returns to the WFSM thereby continuing the field of regard coverage. In this manner, the narrow field investigation is enabled at a minimal loss of temporal wide field coverage of the field of regard.

In some situations, the system may also elect, manually or automatically, to enter the NFTM for tracking the object in high resolution for enhanced classification purposes. Moreover, if the WFSM object cue has additional suspect objects to be investigated, then the system may enter the NFRM whereby the narrow field is slewed to the angular position of the next object in the cue for investigation, prior to returning to the WFSM.

Reference is made to FIGS. 17A-17H illustrating various specific but not limiting examples of the configuration of the optical system suitable to be used in the present invention.

Figure 17A:
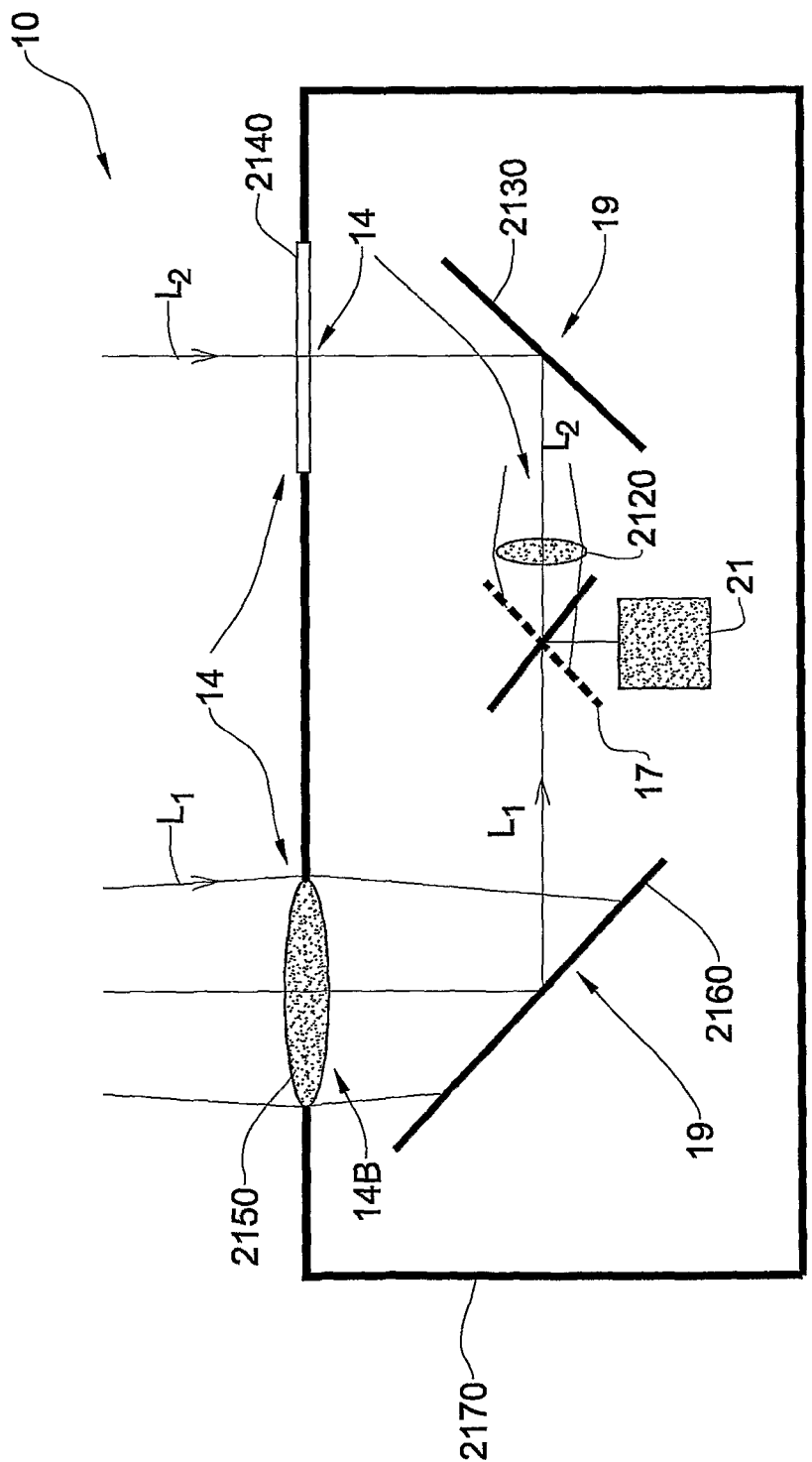
FIGS. 17A to 17C show three different examples of the configuration of the optical system of the present invention for selectively acquiring an image from the wide or narrow FOV light collection channel.

FIG. 17A shows an optical system 10 including a light collection arrangement 14 formed by a wide FOV light collecting unit 14A (high numerical aperture) and a narrow FOV light collecting unit 14B (low numerical aperture); a light directing arrangement 19 including reflectors 2160 and 2130, an optical switch (e.g. flipping mirror) 17, and an imaging detector 21 (with possibly an associated relay lens). All these elements of the optical system are located in a common housing 2170. Narrow FOV light collecting unit 14B includes a lens 2150 mounted in an aperture made in the housing; and wide FOV light collecting unit 14A includes a lens 2120 onto which light is directed through an optical window 2140 made in the housing. A light component $L_1$ collected by lens 2150, with a certain relatively low numerical aperture, impinges onto reflector 2160 and is directed towards optical switch 17. A light component $L_2$ that passed through optical window 2140 is reflected by reflector 2130 towards lens 2120, which collects light with relatively large numerical aperture and directs the collected light towards optical switch 17. Optical switch 17 is a flip mirror, which when being in its one operative position shown in the figure by a solid line is located in the optical path of light component $L_1$ so as to reflect it to detector 21, and when being in its other operative position, shown in the figure by a dashed line, in the optical path of light component $L_2$ so as to reflect it to detector 21. Thus, the respective images from wide FOV collecting unit 14A and narrow FOV collecting unit 14B are temporally switched by the optical switch 17 and reflected onto the single detector 21. The temporally switched multi-FOV images are digitally processed by a combined display processor onto a single display (which is not specifically shown here), for example in the manner in which the narrow FOV image is displayed together with an interpolated version of the wide FOV as described above. The configuration may also be implemented to support multiple spectral bands.

In FIG. 17A, the line of sight of the wide and narrow FOVs may be preferably boresighted and the optical switching element 17 may be implemented by a beam combiner. This configuration may be useful in target detection and tracking applications, whereby a target may be moving in the wide FOV, thereby appearing only in the wide FOV but not in the narrow FOV; hence in the combined image it will appear as a single object. After being detected and/or tracked in the combined image, the target will appear in the vicinity of the boresight of the combined image, and will thereafter appear twice and superimposed in the combined image, namely as a small object due to the wide FOV image, and a larger object due to the narrow FOV. This may be particularly useful in situations where the magnification ratio of the two optics is large, resulting in large dimensional variations between the two instances of the object in the combined image and enabling the differentiation of the two image instances using image processing and pattern recognition methods.

Figure 17B:
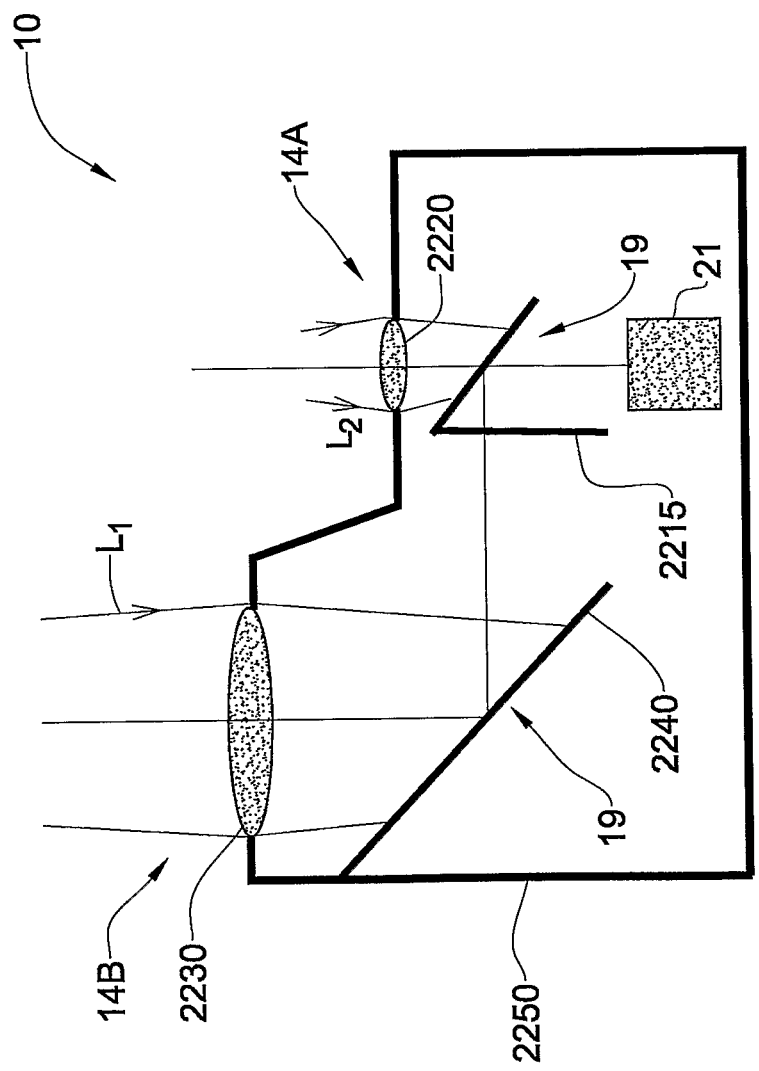

FIG. 17B shows optical system 10 configuration having a housing 2250 formed with two apertures (optical windows) in which lenses 2230 and 2220 of light collecting units 14B and 14A are mounted, respectively. Installed in the housing is a combined light directing and switching arrangement 19 formed by a reflector 2240 and a switcheable reflector 2215 implemented as a hinged mirror; and a detector 21 (with possibly an associated relay lens). In this example, the switcheable reflector is implemented as a hinged mirror. Light component $L_1$ collected by narrow FOV lens 2230 is reflected by reflector 2250 towards switcheable reflector, and light component $L_2$ collected by wide FOV lens 2220 is directed to switcheable element. The switcheable element can also be implemented such that it is movable along an axis, such that the narrow FOV image is either reflected by element 2215 onto the detector 21 or the element 2215 is removed from the wide FOV optical axis while obstructing the narrow FOV thus enabling the wide FOV image to project onto the detector element 21. Thus, images from narrow FOV lens 2230 and wide FOV lens 2220 are temporally switched by element 2215, and the temporally switched multi-FOV images are digitally processed by a combined display processor onto a single display, for example in the manner in which the narrow FOV image is displayed together with an interpolated version of the wide FOV as described above. The configuration may also be implemented to support multiple spectral bands.

Figure 17C:
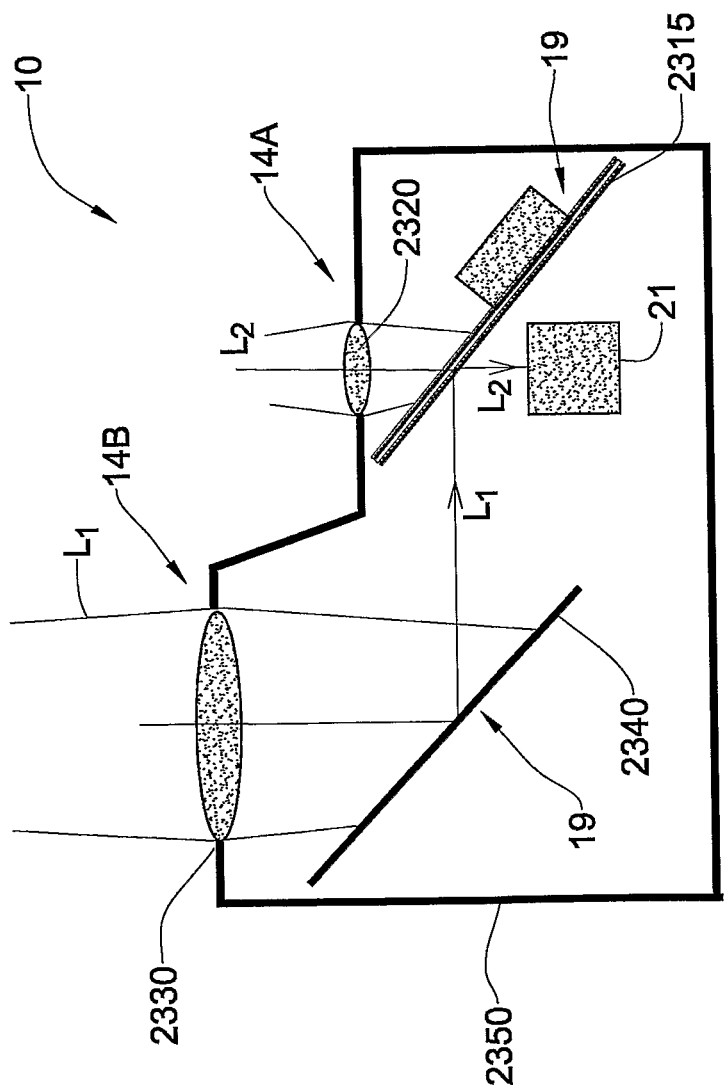

FIG. 17C shows an optical system 10 configuration where the elements of the optical system, such as reflectors 2340 and 2315 of a combined light directing and switching arrangement 19 and an imaging detector 21 (e.g. with an associated relay lens), are mounted in a housing 2150, and narrow FOV lens 2330 and wide FOV lens 2320 of light collection units 14B and 14A respectively are mounted in optical windows (aperture made in the housing). Reflector 2340 is stationary mounted in the optical path of light component $L_1$ collected by lens 2340. Reflector 2315 is switcheable between its two positions. For example, element 2315 may be rotatable between its operative position in which it reflects light component $L_1$ to detector 21 while blocks light component $L_2$ collected by lens 2320 (as shown in the figure) and its inoperative position in which it is out of optical paths of light components $L_1$ and $L_2$ thus allowing light component to directly propagate to detector 21. Preferably however element 2315 is implemented as a revolving circular flat plate having segmented reflective portions and transparent segments, such that light component $L_2$ from lens 2330 is either reflected by element 2315 onto the detector or a transparent portion of element 2315 enables light component $L_2$ to project onto the detector. Temporally switched multi-FOV images are digitally processed by a combined display processor onto a single display, for example in the manner in which the narrow FOV image is displayed together with an interpolated version of the wide FOV as described above.

Figure 17D:
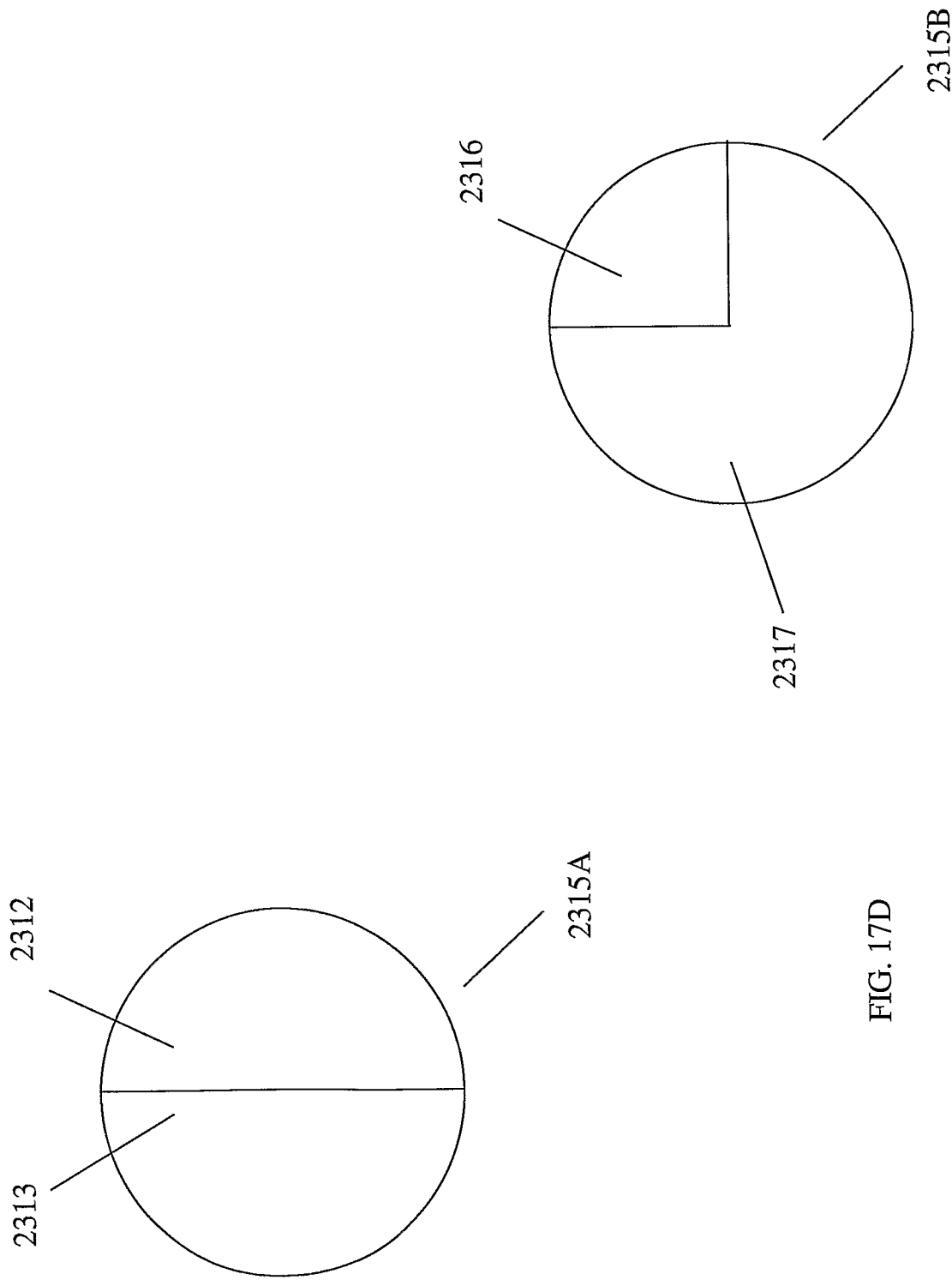
FIG. 17D shows two alternative examples for the configuration of an optical switching element suitable to be used in the system of FIG. 17C.

FIG. 17D shows exemplary preferred configurations of the above described switcheable element 2315. In the element configuration 2315A, the element is segmented into two equal halves, one being a reflective mirror 2312 and the other being a segment 2313. In the element configuration 2315B, one part 2316 is smaller than the other part 2317 thus enabling different temporal multiplexing ratios between the wide FOV and the narrow FOV. For example, if the wide FOV requires a higher image update rate, say for example by a factor of three, then the transparent portion 2317 of element 2315B will be three times larger than the narrow FOV related portion 2316 and vice versa. The configuration may also be implemented to support multiple spectral bands. One such preferred embodiment for multiple spectral bands is by providing different transmissive or reflective spectral filters as respective segments in element 2315A or 2315B.

Figure 17E:
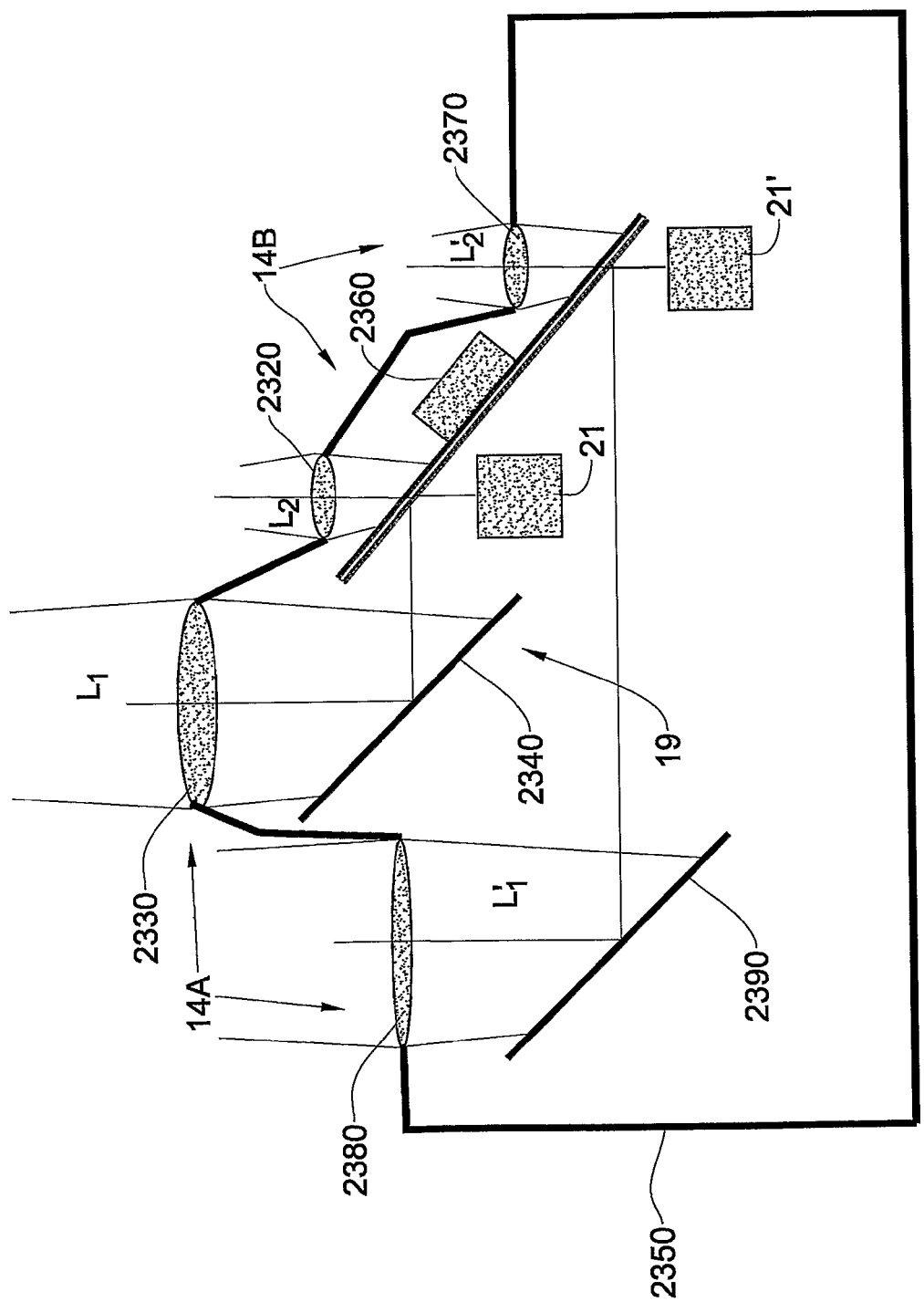
FIG. 17E exemplifies a multi-spectral configuration of the optical system of the present invention suitable for wide or narrow FOVs imaging.

FIG. 17E exemplifies a somewhat different optical system 10 configuration for a multi-spectral implementation based on the configuration descried above with reference to FIG. 17C. In the example of FIG. 17E, a housing 2350 contains elements of light directing and switching arrangement 19, namely reflectors 2390, 2340 and 2360, and light detectors 21 and 21'. Light collection arrangement includes a light collecting unit 14A for collecting light with relative large numerical aperture and a light collecting unit 14B for collecting light with relatively low numerical aperture. Light collection arrangement is a two part arrangement: light collecting unit 14B includes two lenses 2330 and 2380 for collecting light components $L_1$ and $L_1'$ of different wavelength ranges, and light collecting unit 14A includes two lenses 2320 and 2370 for collecting light components $L_2$ and $L_2'$ of different wavelength ranges similar to those of light components $L_1$ and $L_1'$, respectively. Lenses are mounted in apertures appropriately provided in the housing. Reflector 2360 is an optical switch, which is generally similar to switch 2315 of FIG. 17C, but in which reflective surfaces may be two sided so as to support two optical trains, one for each range of spectra. Thus, light components $L_1$ and $L_2$ of the same wavelength range and collected with respectively low and high numerical apertures are directed towards optical switch 2360, and concurrently light components $L_1'$ and $L_2'$ of the same wavelength range, different from that of light $L_1$, $L_2$, and collected with respectively low and high numerical apertures, are directed towards optical switch 2360. As shown, light components $L_1$ and $L_1'$ are directed to optical switch 2360 by reflection from reflectors 2340 and 2390 respectively. Optical switch 2360 is rotatable and has reflective and transmitting segments, such that in one of its operative positions it reflects components $L_1$ and $L_1'$ to detectors 21 and 21' respectively while blocking components $L_2$ and $L_2'$ and when in its another operative position allows light components $L_2$ and $L_2'$ to propagate to detectors 21 and 21'.

Figure 17F:
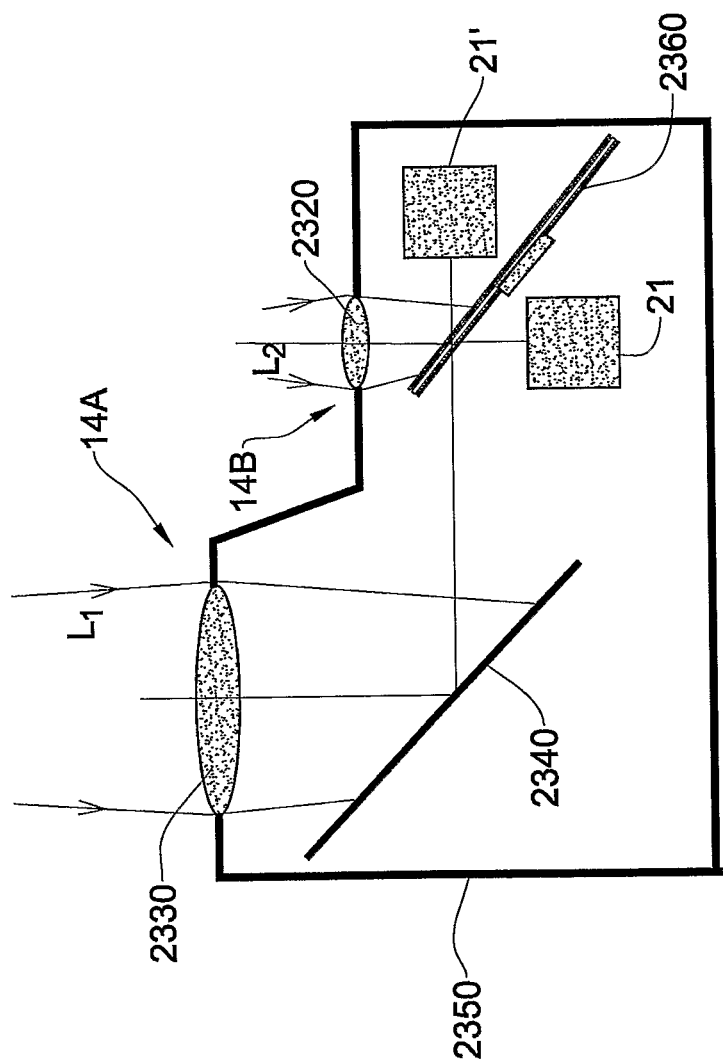
FIG. 17F shows another example of a multi-spectral configuration of the optical system of the present invention for selective or concurrent imaging of a wide FOV image of a field of regard and a narrow FOV image of a part thereof.

FIG. 17F shows yet another configuration for a multi-spectral implementation of the optical system based on the configuration described above in FIG. 17C. The same reference numbers are used for identifying components which are common in examples of FIGS. 17C and 17F. In the example of FIG. 17F, detection unit includes two detectors 21 and 21', and light collecting units 2320 and 2330 are operative in broad spectral bands. Optical switch 2360 is similar to switch 2315 of the FIG. 17C configuration, but its reflective/transmitting surfaces may be two sided so as to support two detector elements 21 and 21', which for example may be a mid wave IR (MWIR) detector and a visible band RGB detector. In this configuration, when light collected by the narrow FOV lens 2330 is reflected by one side of element 2360 onto detector 21, light collected by the wide FOV lens 2320 is reflected by the other side of element 2360 onto detector 21', simultaneously. Also, when the respective segment of element 2360 is transparent, then the narrow FOV light is projected onto detector 21', and the wide FOV light is projected onto detector 21, simultaneously.

Figure 17G:
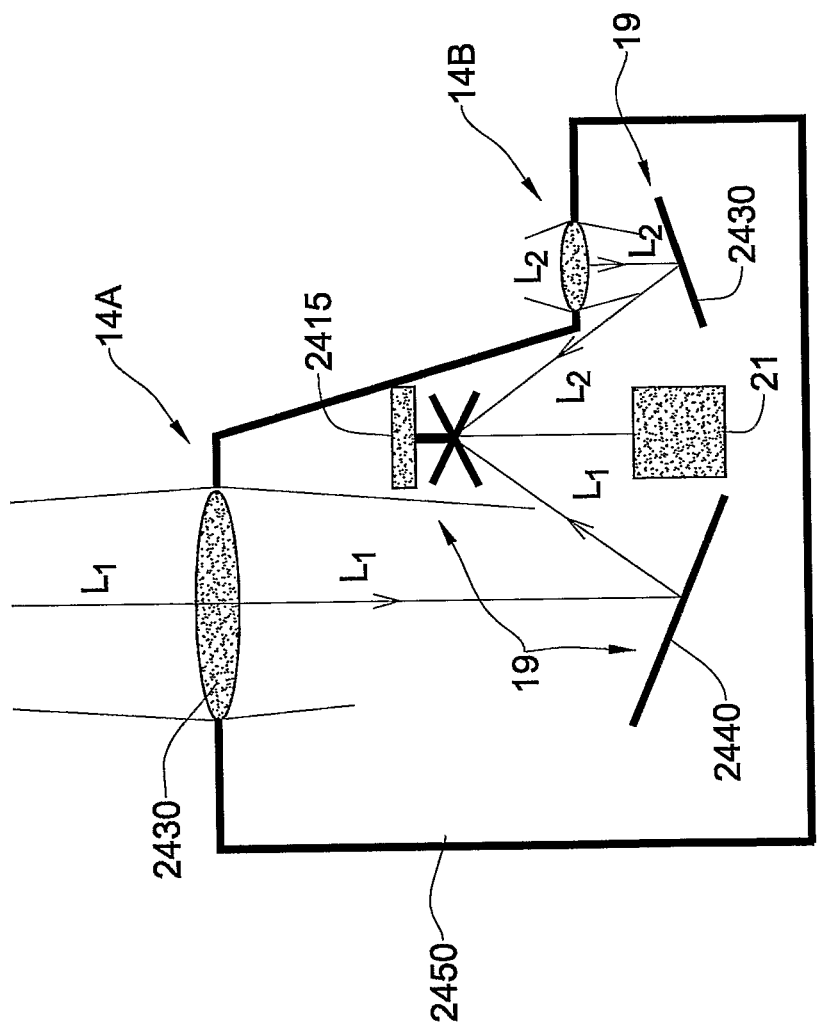
FIG. 17G shows an example of the optical system for wide and narrow FOV imaging using an optical switching element such as a MEMS micromirror device.

FIG. 17G shows yet another example of the optical system configuration, where a light collection arrangement includes two separate, preferably boresighted, light collecting units 14A and 14B with relatively high and low numerical apertures of light collection formed by respectively a wide FOV lens 2420 and narrow FOV lens 2430; a light directing and switching arrangement 19 includes reflectors 2440 and 2430 and an optical switch 2415; and a detection unit includes a single imaging detector 21 (e.g. with a relay lens). Reflectors 2440 and 2430 operate as respectively narrow and wide FOV track modules. Images created by light collected by wide FOV and narrow FOV lenses are temporally switched by element 2415 which is preferably implemented as a micro-mirror MEMS or galvanometer-driven element, such that the narrow FOV or the wide FOV light component is sequentially reflected onto detector 21. Temporally switched multi-FOV images are digitally processed by a combined display processor onto a single display, for example in the manner in which the narrow FOV image is displayed together with an interpolated version of the wide FOV as described above. The configuration may also be implemented to support multiple spectral bands.

Figure 17H:
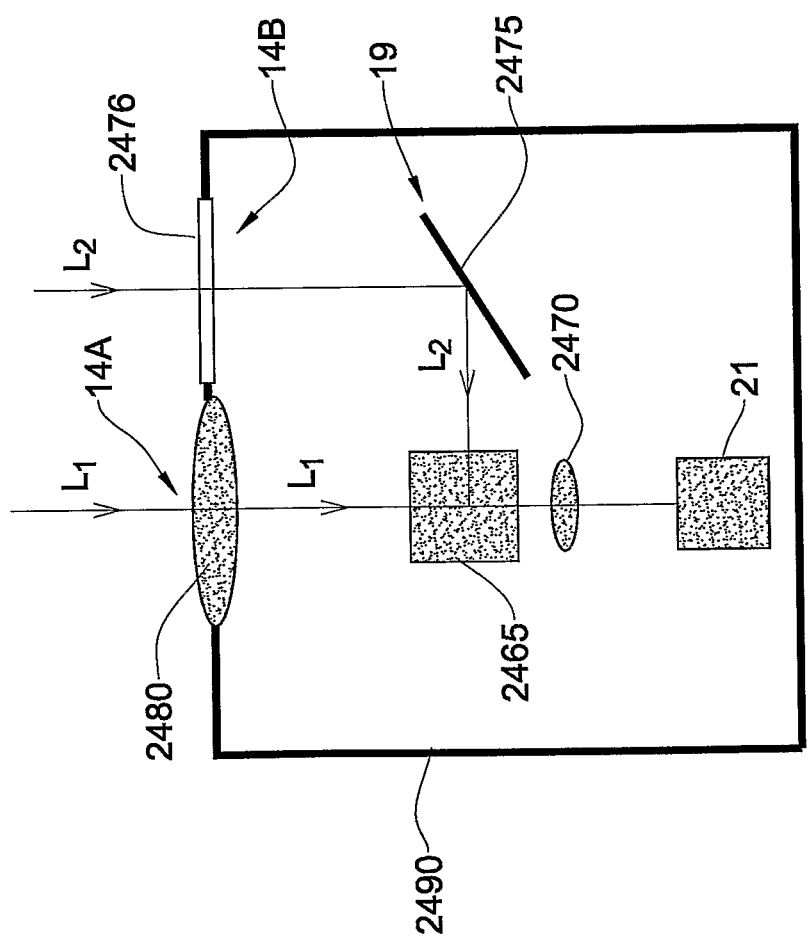
FIG. 17H shows an example of the optical system utilizing a combined wide and narrow FOV channel in the form of an imaging telescope.

FIG. 17H shows yet further examples of the configuration of the optical system, which is mounted in a housing 2490 and includes a light collection arrangement formed by a narrow FOV collection channel (defined by 2480) and a wide FOV lens collection channel (including lens 2470 and optical window 2476); a light directing and switching arrangement including an optical switching element 2465 and reflector 2475; and an imaging detector 21. Lenses 2480 and 2470 having respectively low and high numerical apertures of light collection are incorporated in a telescope arrangement with shared optical axis, lens 2480 being the objective and lens 2470 being the eyepiece of the imaging telescope. Optical switching element 2465 may be revolving optical chopping element or a hinged flip mirror element, and operates to divert light rays such that a narrow FOV image is created by the telescope arrangement utilizing both lenses 2480 and 2470, and the wide FOV image is created only by lens 2470.

Reference is made to FIGS. 18-26 illustrating various examples of the configuration of the optical system utilizing wide FOV and/or narrow FOV scanning.

Figure 18:
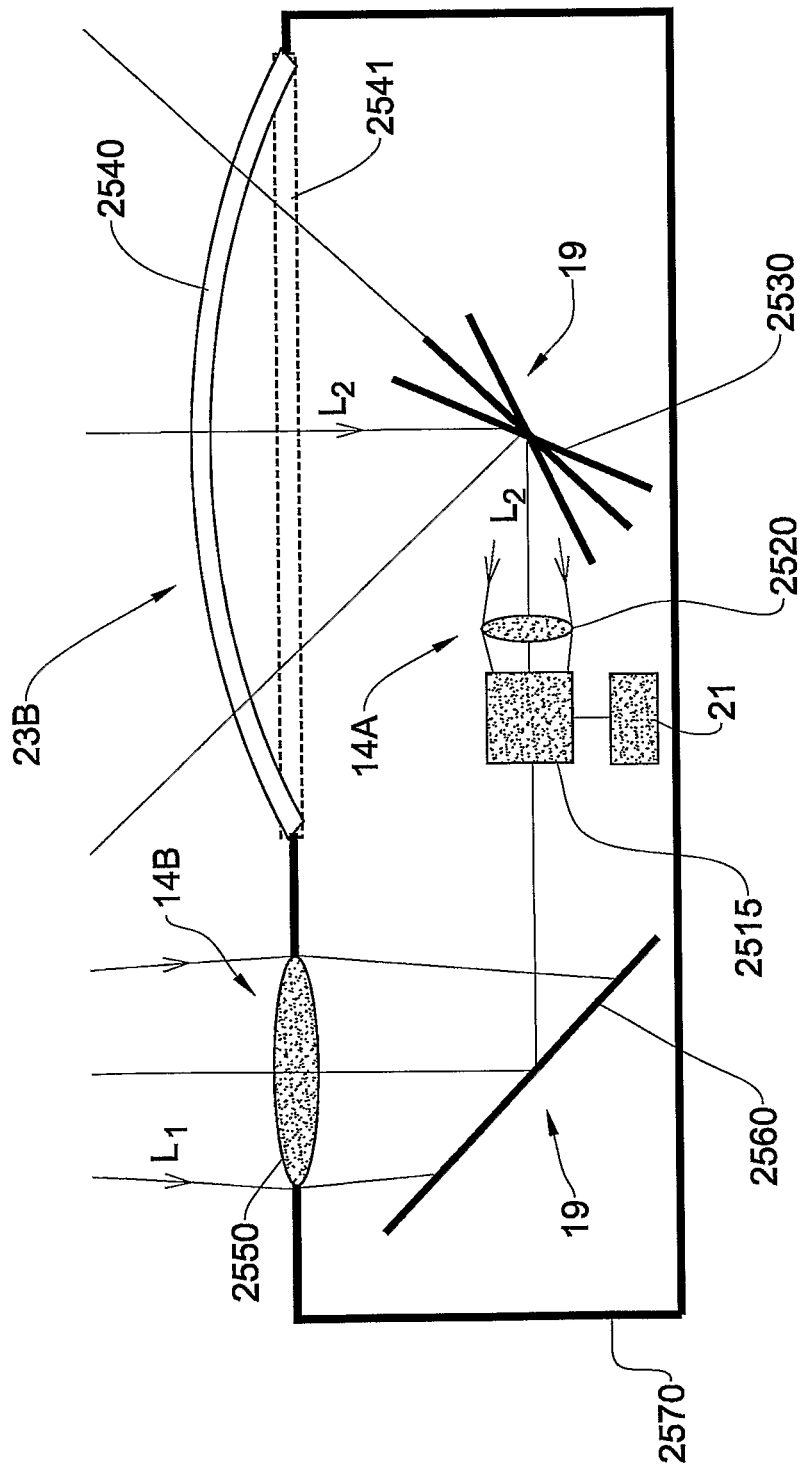
FIG. 18 exemplifies an optical system of the present invention utilizing wide and narrow FOV imaging of a field of regard and part thereof, while scanning the wide FOV.

FIG. 18 shows an optical system located in a housing 2570. The optical system includes a light collection arrangement including wide FOV and narrow FOV collecting units formed by respectively lenses 2520 and 2550 with low and high numerical apertures of light collection; a light directing and switching arrangement 19 including a stationary mounted reflector 2560, a rotatable reflector 2530 and an optical switch 2515; and an imaging detector 21. Also provided is a scanning mechanism 23B associated with the high numerical aperture collecting unit (lens 2520) and formed by a scan window which may be either a curved window 2540 or a flat window 2541 (being an optical window in the housing) and rotatable reflector 2530. Light component $L_1$ collected with relatively low numerical aperture by lens 2550 is reflected by element 2560 to the optical switch 2515; light component $L_2$ collected with high numerical aperture, defined by lens 2520, from successive angular segments defined by successive positions of rotatable mirror 2530, is reflected to optical switch 2515. The latter sequentially directs to detector with one of light components $L_1$ and $L_2$ or both of them as described above with reference to FIGS. 10A-10H, and FIG. 17A. The temporally switched or combined multi-FOV images are preferably digitally processed by a combined display processor onto a single display, for example in the manner in which the narrow FOV image is displayed together with an interpolated version of the wide FOV as described above. The narrow FOV scan enables the coverage of a broad narrow field of regard such that if an object is detected and requires further investigation in the wide FOV, then the narrow FOV can slew to the estimated position as determined from the wide FOV image such that the narrow FOV can observe the object. Typically in this case it may be desired that the narrow field of regard will be equivalent to the wide FOV such that it can investigate any object detected in the wide FOV. The wide FOV window element will increase in size as the wide field of regard increases. The system may be designed to scan along one axis, for example the horizontal axis, thereby requiring the whole system to scan the vertical dimension in order to cover the entire wide FOV, or alternatively be a two-axes scanning mirror to cover the two dimensions of the wide FOV. In the vertical scanning direction, and without optical derotation provisions, the wide FOV will turn about the optical axis during the scan. The wide FOV image may then be derotated electronically as a function of the measured vertical scanning position. The configuration may also be implemented to support multiple spectral bands.

Figure 19:
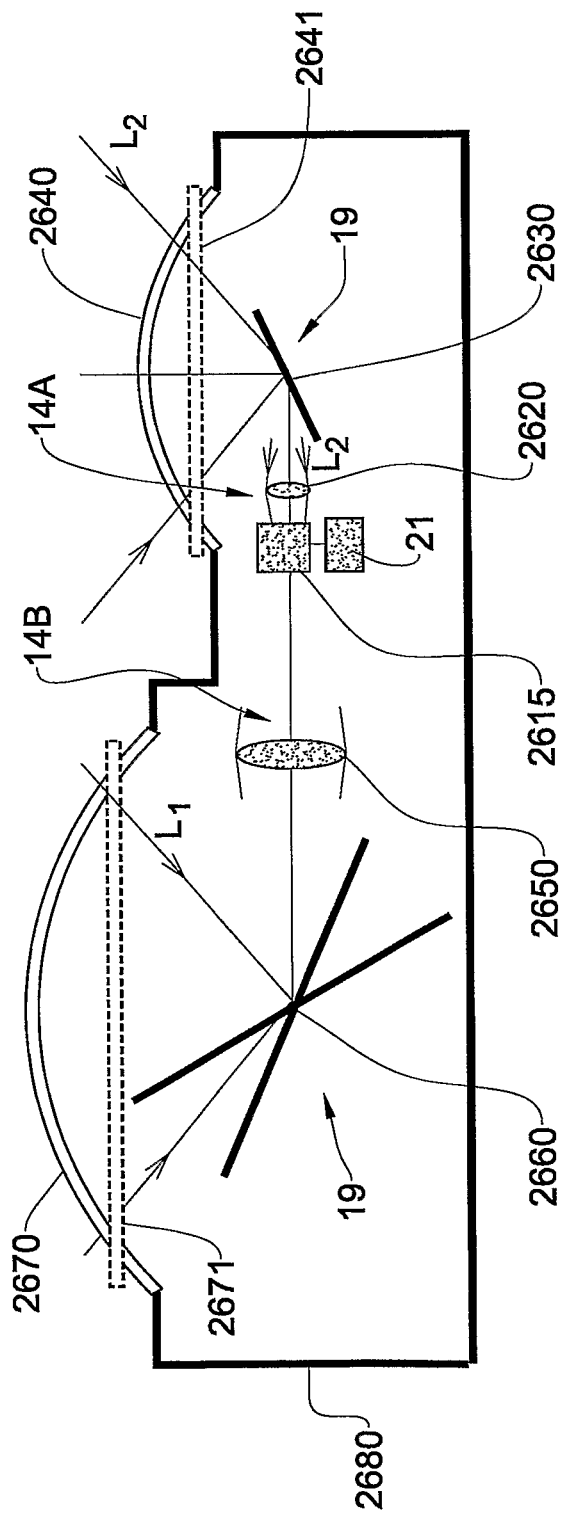
FIG. 19 exemplifies an optical system of the present invention utilizing wide and narrow FOV imaging of a field of regard and part thereof, while scanning the narrow FOV.

In the example of FIG. 19, an optical system incorporated in a housing 2680 includes wide FOV and narrow FOV light collecting units (lenses) 2620 and 2650, associated with stationary mounted and rotatable reflectors 2630 and 2660 respectively, and an optical switch 2615, and imaging detector 21. Here, a scanning mechanism 23B is associated with low numerical aperture collection channel, i.e. lens 2650. Optical windows which may be curved windows 2670 and 2640 or flat windows 2671 and 2641 are appropriately provided in the housing for directing light components $L_1$ and $L_2$ towards lenses 2650 and 2620. Optical switching element 2615 temporary switches or combines images from wide FOV lens and narrow FOV lens onto detector 21 in accordance with the above described methods, and the temporally switched or combined multi-FOV images are processed by a combined display processor onto a single display, for example in the manner in which the narrow FOV image is displayed together with an interpolated version of the wide FOV as described above. Rotation of mirror 2660 enables the coverage of wider region of a zone (or field of regard) such that if an object is detected in said zone (or field of regard) and requires further investigation, the mirror 2660 is revolved such that the narrow FOV can observe the object. The configuration may also be implemented to support multiple spectral bands.

Figure 20:
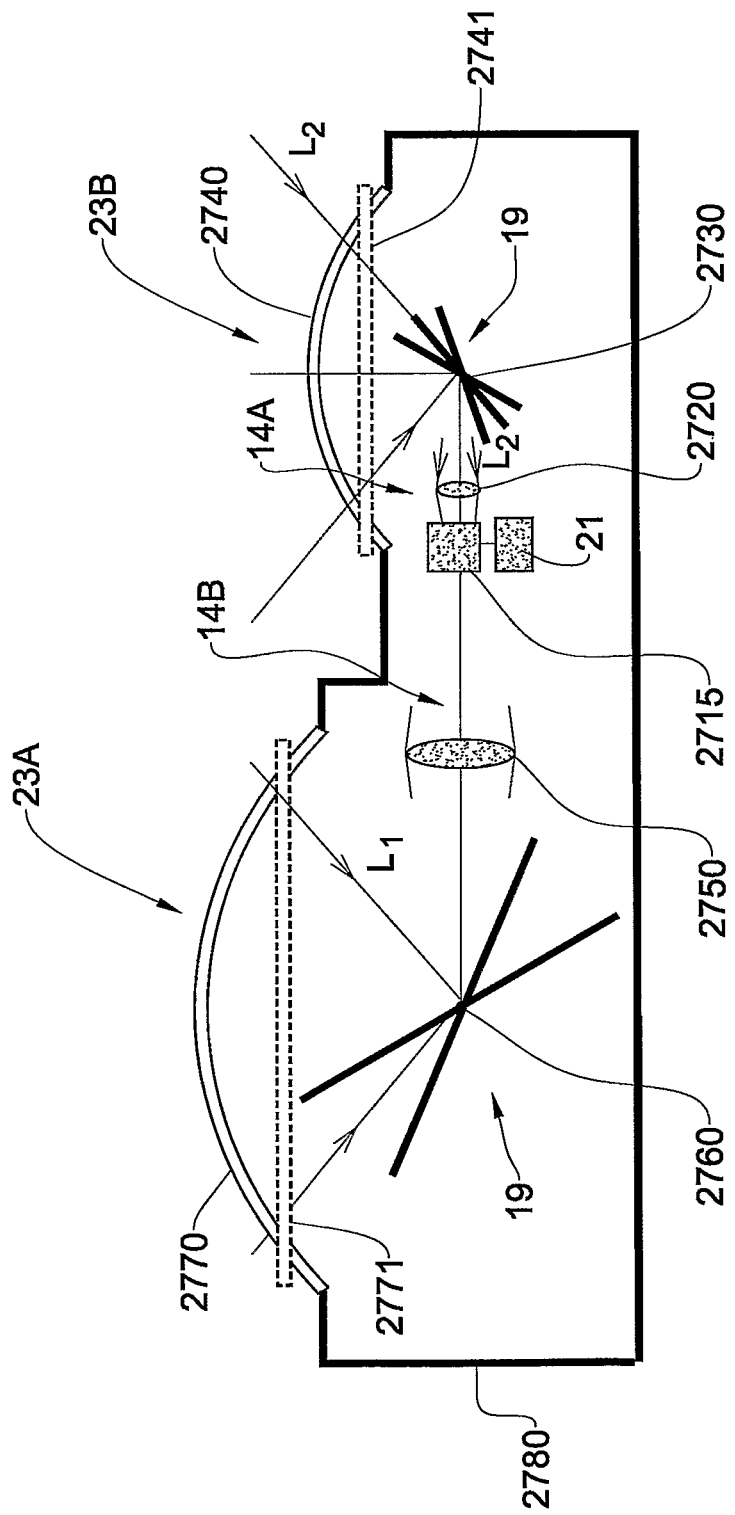
FIG. 20 exemplifies an optical system of the present invention utilizing wide and narrow FOV imaging of a field of regard and part thereof, while scanning both the narrow and wide FOV.

FIG. 20 exemplifies an optical system utilizing both the wide FOV scanning mechanism 23A and the narrow FOV scanning mechanism 23B. Thus, light components $L_1$ successively collected by lens 2750 during the wide FOV scan by means of rotating mirror 2760, and light components $L_2$ successively collected by lens 2720 during the wide FOV scan by means of a rotating mirror 2730, are selectively switched or combined to an imaging detector 21, depending on the operative position of an optical switch or beam combiner 2715. The wide FOV and narrow FOV scans enable the coverage of a broad wide field of regard and narrow field of regard such that if an object is detected and requires further investigation in the wide field of regard, then the narrow FOV scan can slew to the estimated position as determined from the wide field of regard image such that the narrow FOV can observe the object. Typically in this case it may be desired that the narrow field of regard will be equivalent to the wide FOV such that it can investigate any object detected in the wide FOV. The narrow and wide FOV scan windows will increase in size as the narrow and wide fields of regard increase. The scan may be along one axis, for example the horizontal axis, thereby requiring the whole system to scan the vertical dimension in order to cover the required angular coverage, or alternatively be two-axes scan to cover the two dimensions of the required coverage areas. In the vertical scanning direction and without optical derotation provisions, the narrow FOV and wide FOV images will turn about their respective optical axis. The narrow FOV and wide FOV image may then be derotated electronically as a function of the measured vertical scanning position. The configuration may also be implemented to support multiple spectral bands.

Figure 21:
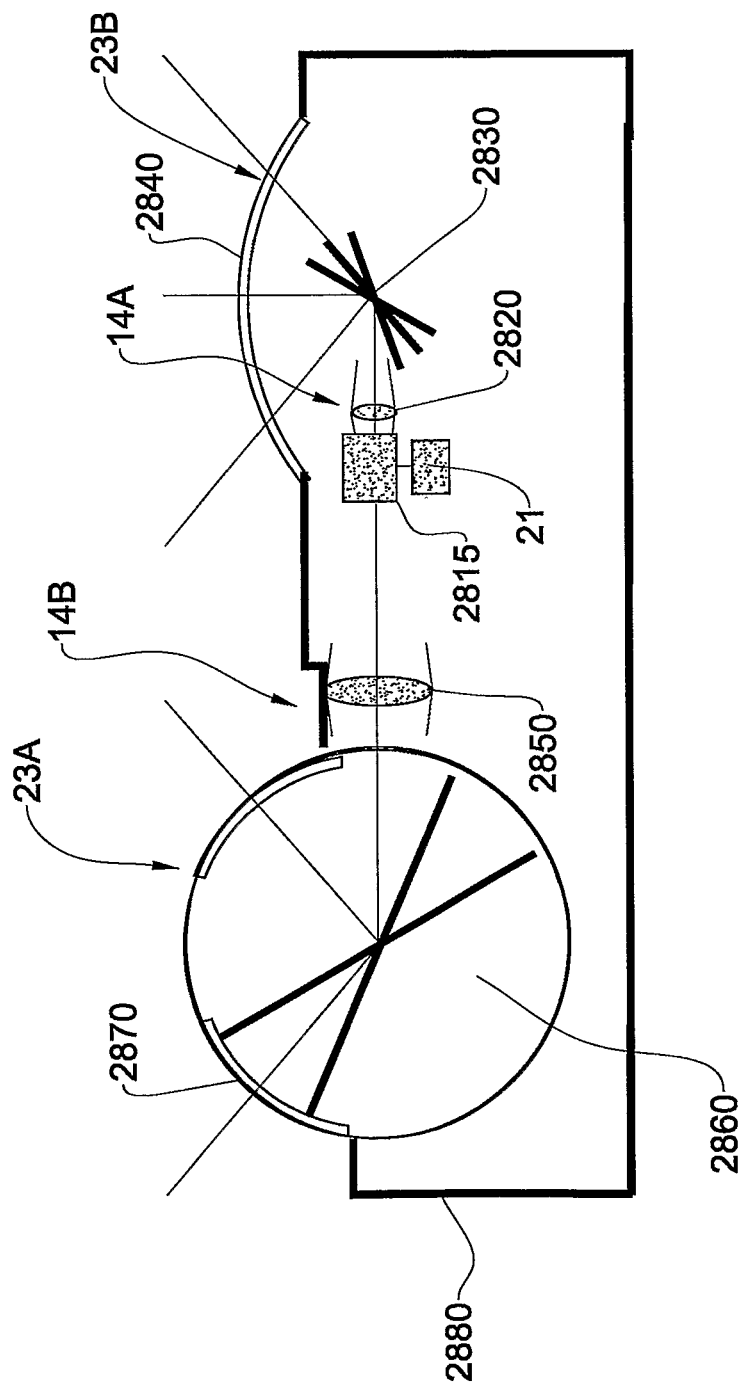
FIGS. 21-26 show six examples, respectively, of the implementation of an optical system of the present invention utilizing wide and narrow FOV imaging of a field of regard and part thereof, while scanning both the narrow and wide FOV, where the scanning mechanism utilizes a revolving turret.

FIG. 21 shows an optical system utilizing two scanning mechanisms 23A and 23B associated with respectively a wide FOV channel (defined by lens 2820 and rotatable mirror 2830) and a narrow FOV channel (defined by lens 2850 and rotatable mirror 2860). The optical system' elements are incorporated in a housing 2880 having appropriate aperture defining scan windows 2870 and 2840. Here, the narrow FOV scan window 2870 is constituted by a revolving turret configured such that the dimensions of this scan window remain small as they are moving together with the narrow scanning mirror and the narrow FOV.

Figure 22:
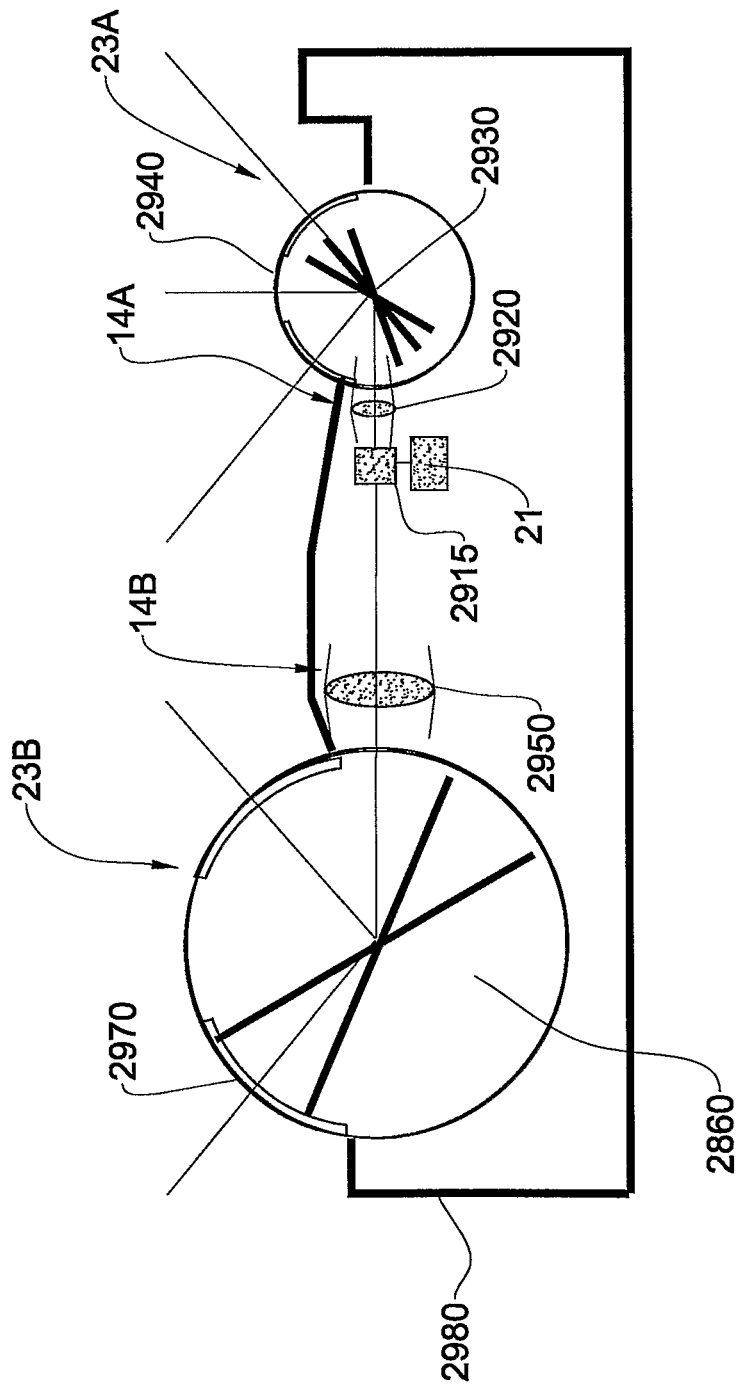

FIG. 22 exemplifies an optical system which is generally similar to the example of FIG. 21, but in which rotatable mirror 2930 and its associated scan window are also incorporated in a revolving turret 2940 such that the dimensions of this window reduce, albeit requiring it also to revolve with respect to element 2940 as it revolves.

Figure 23:
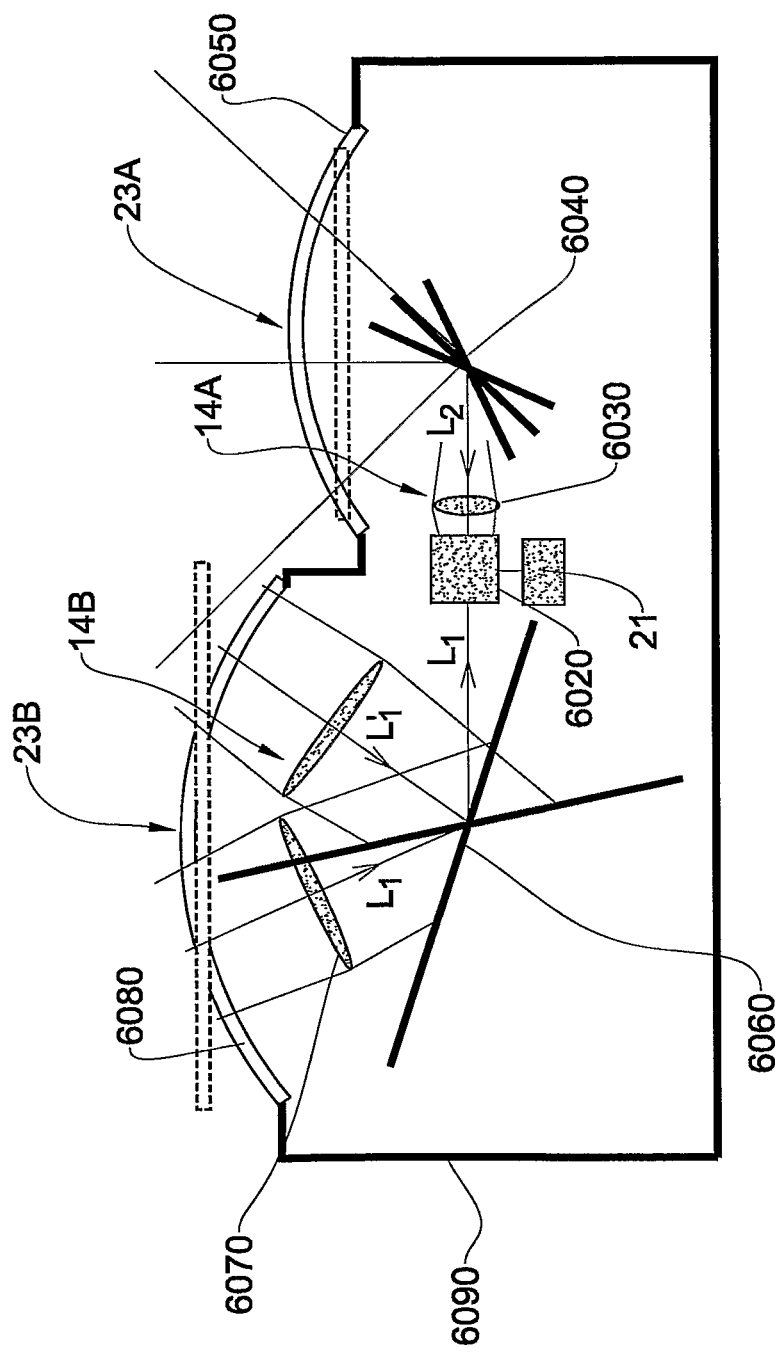

FIG. 23 illustrates an optical system of a configuration generally similar to that described above with reference to FIG. 20, namely including wide FOV and narrow FOV light collecting units 14A and 14B formed by respectively, lenses 6030 and 6070 associated with scanning mechanisms 23A and 23B, which include rotatable mirrors 6040 and 6060, and whereby the narrow FOV lens 6070 is positioned before the scanning mirror element 6060.

Figure 24:
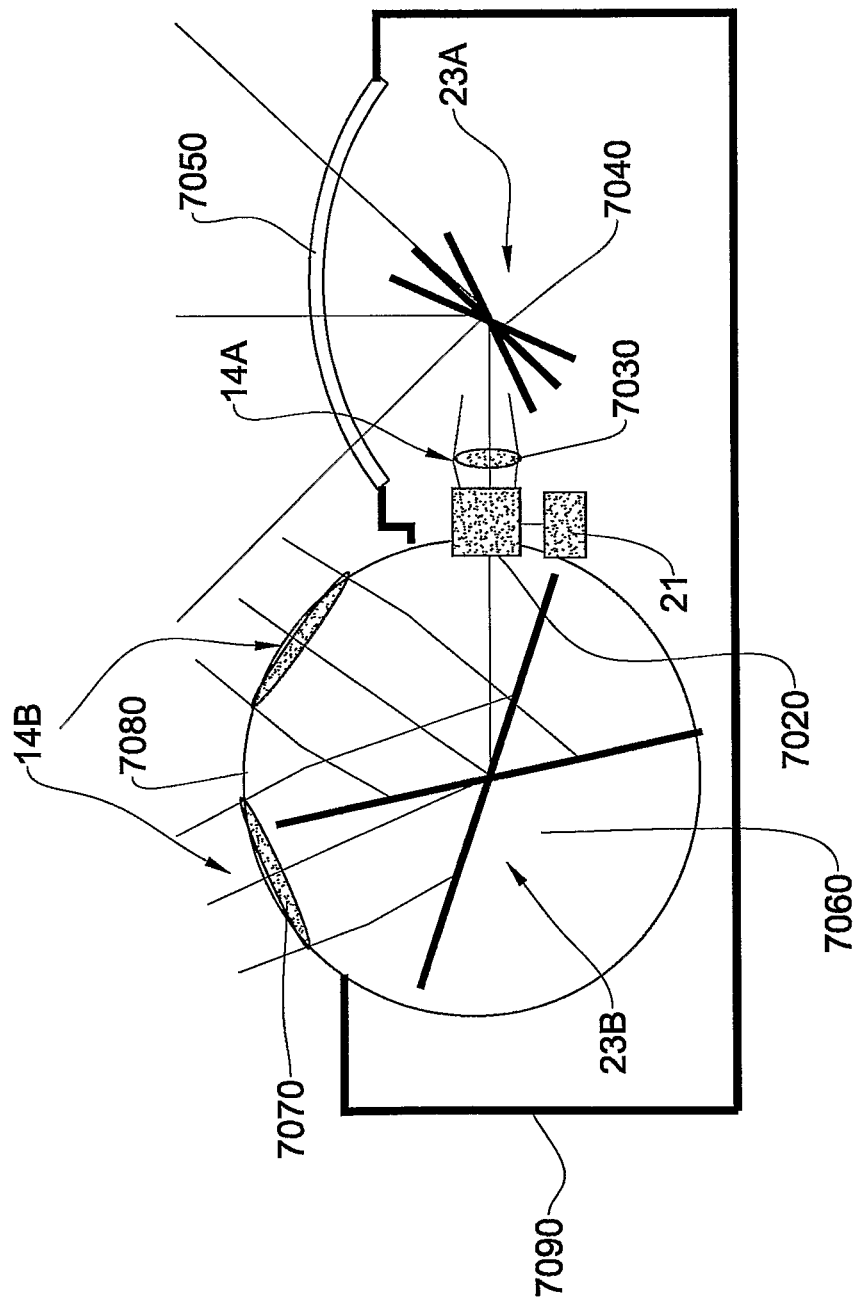

FIG. 24 shows an optical system, which is accommodated in a housing 7090 and which is configured generally similar to the system of FIG. 23 whereby narrow FOV lens 7070 is also the exit window of a turret 7080.

Figure 25:
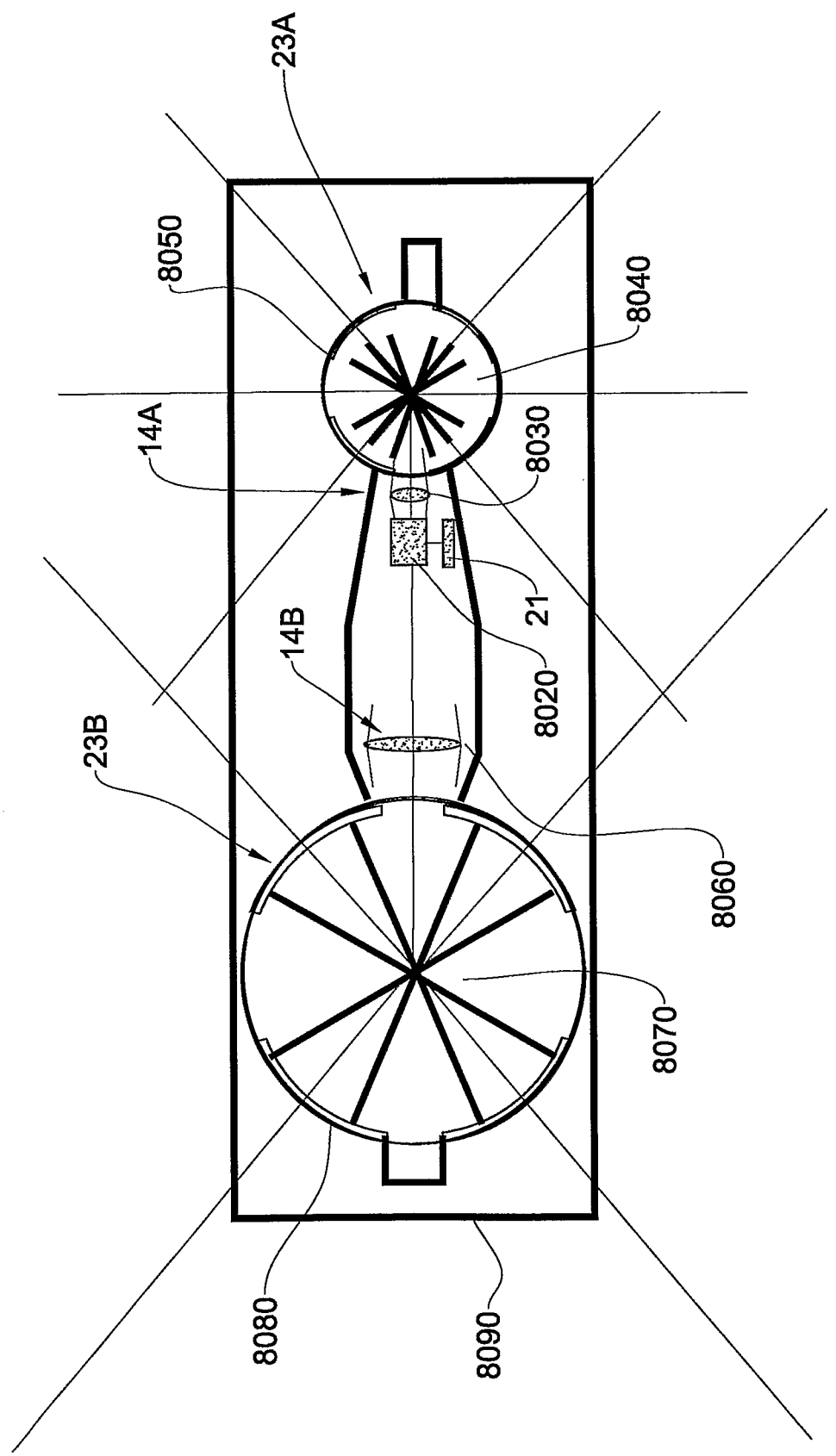

FIG. 25 illustrates an optical system mounted in a housing 8090 and including wide FOV and narrow FOV collecting units 14A and 14B formed by lenses 8030 and 8060; wide FOV and narrow FOV scanning mechanisms 23A and 23B formed by revolving turrets 8050 and 8080 carrying reflectors 8040 and 8070; an optical switch or combiner 8020; and an imaging detector 21. Here, reflectors 8070 and 8040 are two sided mirrors, which revolve in 360 degrees thereby covering the forward and backwards fields of regard, typically 90 degrees in the front and the back.

Figure 26:
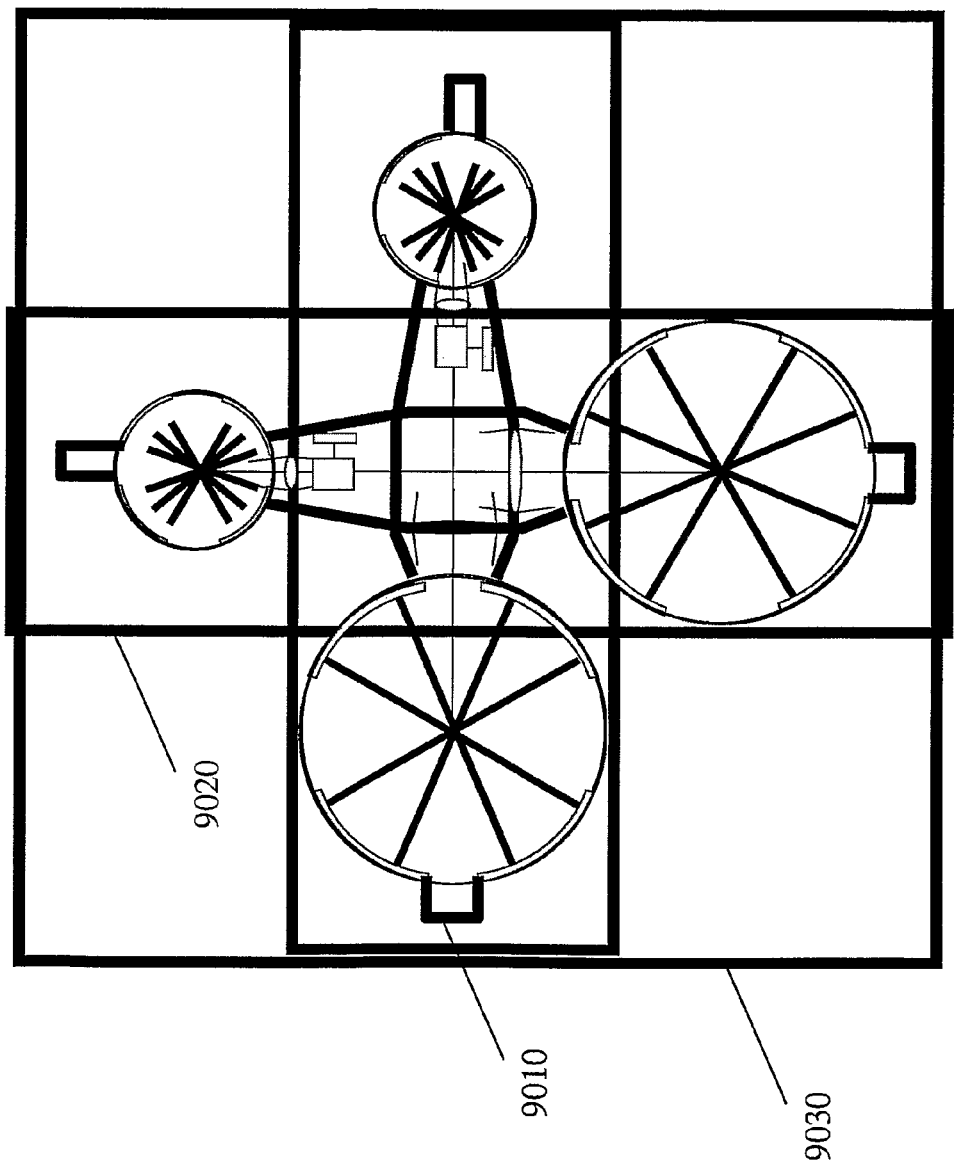

FIG. 26 exemplifies an optical system designed similar to that of FIG. 25, but in a stacked configuration thereby providing full panoramic coverage. For example, an upper system layer, e.g. layer 9030 may cover the front 90 degrees and back 90 degrees, and the lower system layer 9020 may cover the right 90 degrees and left 90 degrees.

While this invention has been described with an emphasis upon embodiments, it will be obvious to those of ordinary skill in the art that variations of the embodiments may be used and that it is intended that the invention may be practiced otherwise than as specifically described herein. Accordingly, this invention includes all modifications encompassed within the spirit and the scope of the invention as defined by the following claims.

The invention claimed is:

1. A method for monitoring a field of regard, the method comprising:

imaging at least a part of the field of regard by concurrently collecting a plurality of light components propagating along different optical paths from a plurality of different zones, respectively, located within the field of regard, said plurality of light components being concurrently collected by a corresponding plurality of light collecting units having a first numerical aperture of light collection being the same for each of the plurality of light collecting units;

superimposing a plurality of images of the plurality of said different zones of the field of regard, respectively, by concurrently projecting the plurality of light components collected from said plurality of different zones in an additive manner onto a common light sensitive surface of a same light detector to form a combined image that is made up of the plurality of the superimposed images of different zones, thereby obtaining flux averaging of said plurality of light components;

generating image data indicative of said combined image; and processing and analyzing the image data indicative of the combined image, and upon identifying existence of a certain condition or event in the image data, generating a corresponding control signal indicative of the existence of said condition or event in at least one of said plurality of different zones, thereby enabling to further scan at least some of the zones based on analysis of the image data of the combined image with said first numerical aperture or a different second numerical aperture.

2. A monitoring system comprising:
an optical system comprising:
a light collection arrangement comprising a plurality of light collecting units having a first numerical aperture of light collection being the same for all the light collecting units, the light collecting units being configured for collecting a plurality of light components propagating along different optical paths from a plurality of different zones, respectively, of a field of regard;
a light combiner arrangement configured to receive the light components collected along the different optical paths from said plurality of light collecting units for combining the collected light components of said plurality of different zones of the field of regard and producing a combined light, and directing said combined light along a combined optical path;
a light detection unit comprising a light sensitive surface accommodated in said combined optical path for receiving the combined light and generating image data indicative of the received combined light, said image data being therefore indicative of a plurality of superimposed images of the plurality of said different zones of the field of regard, respectively, concurrently projected onto the light sensitive surface in an additive manner, thereby obtaining flux averaging of said plurality of light components; and
a control unit connectable to the optical system, and configured and operable for receiving the image data indicative of the combined image, and processing and analyzing the image data so as to, upon detecting that the image data is indicative of existence of a certain condition or event in the at least part of the field of regard, generating a control signal, thereby enabling to selectively operate the optical system to scan at least some of the zones based on analysis of the image data of the combined image with said first numerical aperture or a different second numerical aperture.

3. The system according to claim 2, comprising a single light detector.

4. The system according to claim 3, wherein the control unit is configured and operable for using the control signal for operating the optical system to produce data indicative of one or more separate images of one or more of the zones, thereby enabling to identify one or more zones of the field of regard with which the condition or event is associated.

5. The system according to claim 4, comprising a display for visual representation of the one or more separate images.

6. The system according to claim 4, configured and operable for either concurrently producing the data indicative of the separate images of the zones, or sequentially producing the data indicative of the separate images of the zones until identifying the one or more of the zones with which the condition or event is associated.

7. The system according to claim 4, configured and operable for directing the collected light components onto a plurality of the light sensing regions of the light detector, thereby concurrently producing the data indicative of the separate images of the zones.

8. The system according to claim 4, comprising a light directing arrangement configured and operable for selectively allowing projection of at least one of the light components onto the light detector, while preventing detection of the other light components, thereby sequentially producing the data indicative of the separate images of the zones until identifying the one or more zones with which the condition or event is associated.

9. The system according to claim 2, wherein the optical system is configured and operable for imaging at least a part of at least one of the zones with a second numerical aperture of light collection different from a first numerical aperture of collection used for producing the combined light beam.

10. The system according to claim 9, wherein the optical system comprises at least one scanning mechanism for scanning at least one of the zones to collect light from successive parts of the field of regard with the second numerical aperture.

11. The system according to claim 9, wherein the control unit is configured and operable to selectively actuate the optical system for carrying out the imaging with the second numerical aperture of the light collection, upon identifying the certain condition or event in the image data indicative of the combined image.

12. The system according to claim 11, wherein the control unit is configured and operable to actuate the optical system for carrying out the imaging with the second numerical aperture of the at least one zone, that has been identified as that with which the condition or event is associated.

13. The system according to claim 9, wherein the light combining arrangement is configured and operable for selectively projecting the combined light beam corresponding to the first numerical aperture of light collection, and one or more light components collected with the second numerical aperture, onto the same light sensing surface.

14. The system according to claim 2, wherein the optical system is configured and operable for separately collecting and focusing each of the light components towards a common beam combiner of the light combining arrangement, and projecting the combined light beam onto the light detector.

15. The system according to claim 14, wherein the optical system is configured and operable for performing the separate collection and focusing concurrently for the plurality of light components.

16. The system according to claim 14, wherein the optical system is configured and operable for selectively performing the separate collection and focusing of the light component.

17. The system according to claim 2, wherein the light collection arrangement has one of the following configurations:
   (i) a curved light deflecting surface for deflecting the light components from multiple regions thereof, respectively, towards different optical paths, and multiple focusing lenses accommodated in the optical paths, respectively;
   (ii) a curved light deflecting surface for deflecting the light components from multiple regions thereof, respectively, towards different optical paths;
   (iii) is configured and operable for collecting the light components from different zones with overlapping solid angles of collection;
   (iv) is configured and operable for collecting light from the entire field of regard with a third numerical aperture of light collection higher than a first numerical aperture of light collection used for producing the combined light beam; and
   (v) is configured for collecting the plurality of light components with a first numerical aperture from different directions of light propagation associated with the zones of different angular segments of a 360° space of the field of regard.

18. The system according to claim 2, wherein the optical system is configured to provide the combined light beam containing the same relative flux for each of the light components being combined.

19. The system according to claim 2, wherein the light combining arrangement is configured for separately combining at least two groups of the light components, thereby producing at least two combined light portions, and combining the at least two light portions into the combined light beam.

20. The system according to claim 2, wherein the light collection arrangement is configured and operable for collecting light from the entire field of regard with a third numerical aperture of light collection higher than a first numerical aperture of light collection used for producing the combined light beam, the light detection unit-comprising two light sensitive surfaces, the control unit operating to actuate the optical system for imaging the multiple zones of the field of regard with the combined light beam and the imaging of the entire field of regard with higher numerical aperture onto the two different light sensitive surfaces, respectively.

21. The system according to claim 20, wherein the control unit is configured and operable to use the control signal indicative of the certain condition or event in the combined image to actuate image processing of the image of the entire field of regard to search for a zone therein with which the condition is associated.

22. The system according to claim 9, wherein the optical system has one of the following configurations: is configured and operable for sequentially acquiring first and second images with the first and second numerical apertures of light collection, the first image being the image of the zone and the second image being the image of a selected part of the zone; comprising a scanning mechanism operable for scanning the field of regard, each scan including a plurality of zones forming a part of the field of regard.

23. The system according to claim 9, wherein the optical system is configured and operable for sequentially acquiring first and second images with the first and second numerical apertures of light collection, the first image being the image of the zone and the second image being the image of a selected part of the zone, the control unit being configured and operable for displaying on the same display the first image of the zone and the second image of the part of the zone acquired with the respectively higher and lower numerical apertures of light collection and the same image resolution.

24. The system according to claim 23, wherein the control unit is configured and operable for concurrently displaying the first and second images being concurrently acquired by two different light detectors of the light detection unit.

25. The system according to claim 24, wherein the control unit is configured and operable for sequentially displaying the first and second images being sequentially acquired using the same light detector, the optical system comprising an optical switch operable for sequentially switching between first and second light collection paths of the different numerical apertures of light collection.

26. The system according to claim 9, wherein the optical system comprises a scanning mechanism operable for scanning the field of regard, each scan including a plurality of zones forming a part of the field of regard, and an optical switch being configured and operable for selectively deflecting the collected light to thereby either allow or prevent its propagation to the detector.

27. The system according to claim 2, wherein the light collection arrangement is configured for collecting the plurality of light components with a first numerical aperture from different directions of light propagation associated with the zones of different angular segments of a 360° space of the field of regard, the optical system comprising a scanning mechanism for scanning the field of regard, each scan including the plurality of the different angular segments.

28. The system according to claim 2, wherein the light collection arrangement is configured for collecting the plurality of light components with a first numerical aperture from different directions of light propagation associated with the zones of different angular segments of a 360° space of the field of regard, the optical system being configured and operable for imaging, for at least some of the zones, at least a part thereof with a second lower numerical aperture.

29. The system according to claim 28, wherein the optical system is configured and operable for selectively carrying out the imaging with the second numerical aperture, being actuated by the control unit upon identifying the certain condition or event in the first combined image data.

30. The system according to claim 2, mounted on an imaging capsule.

31. The system according to claim 2, carried by a housing configured to be mountable onto a distal end of an imaging endoscope.

32. The system according to claim 9, wherein said control unit is configured and operable for, upon identifying the existence of the condition or event in the image data indicative of the combined image, performing an additional processing and analyzing step on image data corresponding to the second numerical aperture for determining a precise location of said event in the field of regard.

33. An imaging capsule comprising an optical system comprising:
- a light collection arrangement comprising a plurality of light collecting units configured and operable for concurrently collecting a plurality of light components propagating along different optical paths from a plurality of different zones, respectively, of a field of regard, said light collection units having a first numerical aperture of light collection, being the same for the light collecting units;
- a light combiner arrangement configured to receive the light components collected along the different optical paths from said plurality of light collecting units for combining the collected light components of said plurality of different zones of the field of regard and producing a combined light beam, and directing the combined light beam along a combined optical path;
- a light detection unit comprising a light sensitive surface accommodated in the combined optical path for receiving the combined light beam and generating image data indicative of the combined light, the image data being indicative of a plurality of superimposed images of the plurality of said different zones of the field of regard, respectively, corresponding to the plurality of light components concurrently projected in an additive manner onto the light sensitive surface such that flux averaging of the plurality of light components is obtained, thereby enabling detection of an existence of a certain condition in one or more of the zones from analysis of the combined image.

34. The imaging capsule according to claim 33, wherein the light collection arrangement is configured for collecting the plurality of light components with a first numerical aperture from different directions of light propagation associated with the zones of different angular segments of a 360° space of the field of regard.

35. An endoscope comprising:
- a flexible member comprising a working channel and an optical system secured to the working channel, the optical system comprising:
  - a front optical arrangement at a distal end of the flexible member for collecting light propagating from a front zone of a field of regard;
  - a peripheral optical arrangement comprising light collection arrangement for concurrently collecting a plurality of light components coming from a plurality of different peripheral zones, respectively, of a field of regard, said peripheral optical arrangement being configured for collecting said plurality of light components from the plurality of different peripheral zones with a plurality of light collecting units, respectively, having a first numerical aperture of light collection, being the same for the plurality of light collecting units;
  - a light detection unit comprising a first imaging detector associated with the front optical arrangement, and a second imaging detector associated with the peripheral optics; and
  - a switching arrangement for selectively allowing light components from a selected one of the zones or a combined light from a predetermined number of the selected zones, to propagate to the detection unit, wherein the plurality of light components that are collected by the peripheral optical arrangement are projected in an additive manner onto a common region of the second detector to form a combined image in which the flux of said light components is substantially averaged, and wherein the combined image is made up of a plurality of superimposed images, and wherein each of the superimposed images corresponds to each one of the plurality of the different peripheral zones, respectively; and
- the endoscope thereby having a frontal viewing capability using the front end optical arrangement and the first imaging detector, and enabling switched peripheral observation using the peripheral optics and the second imaging detector.

* * * * *